Jan. 4, 1966 — F. A. MORRIS ET AL — 3,227,808
LOCAL AND REMOTE TOLL TICKETING
Filed Sept. 26, 1955 — 29 Sheets-Sheet 3

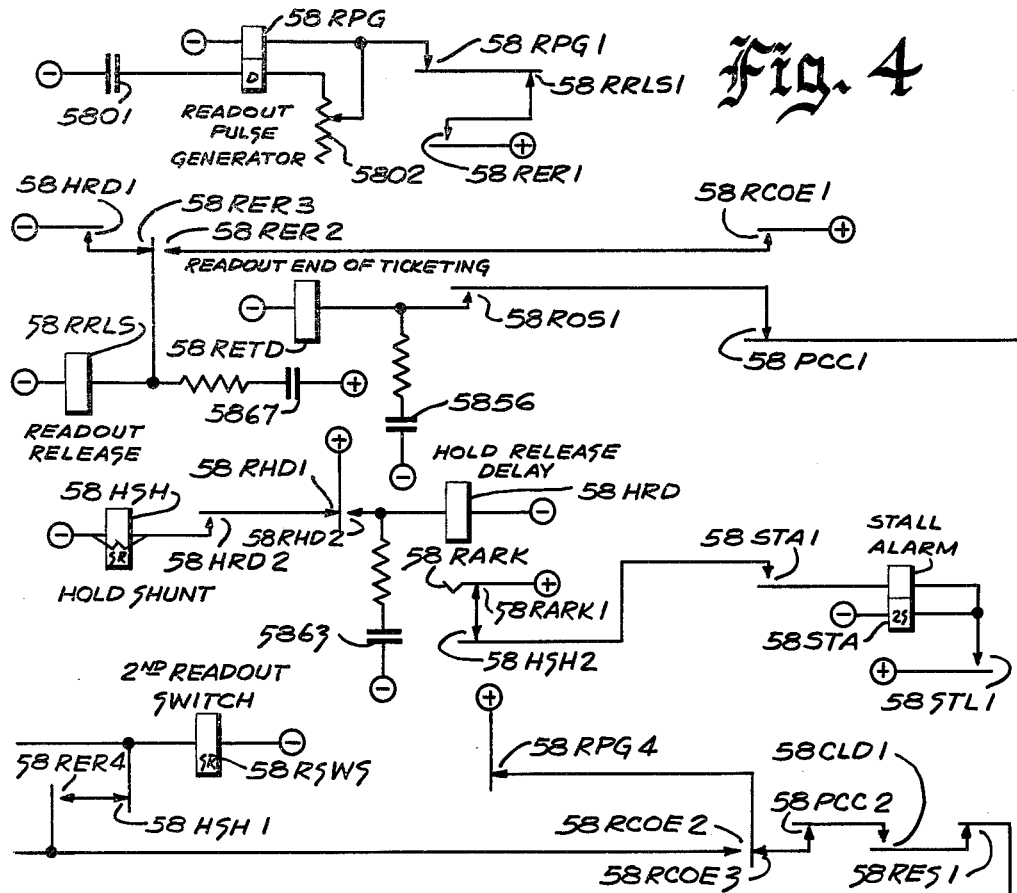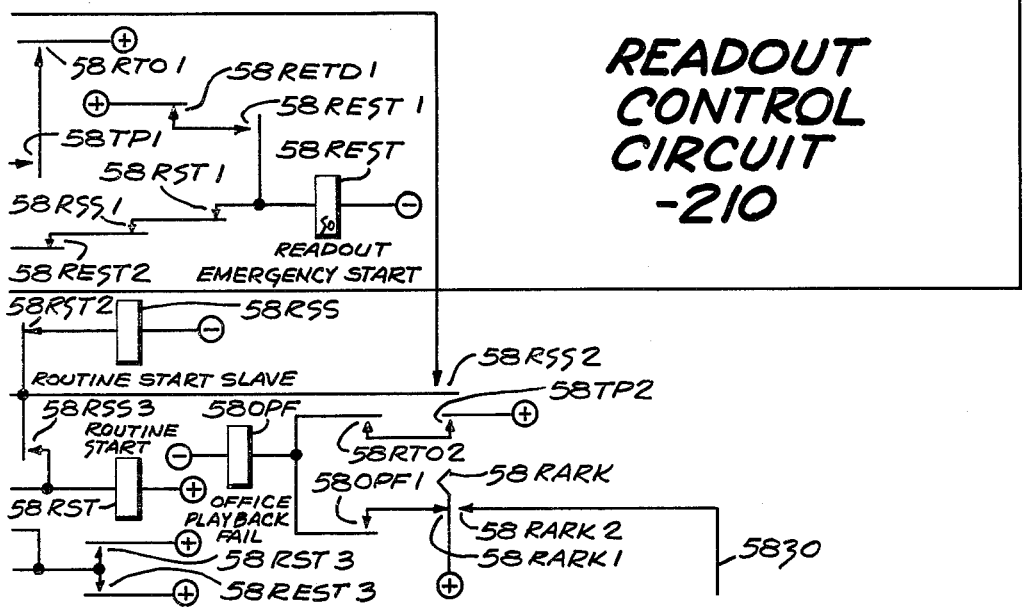

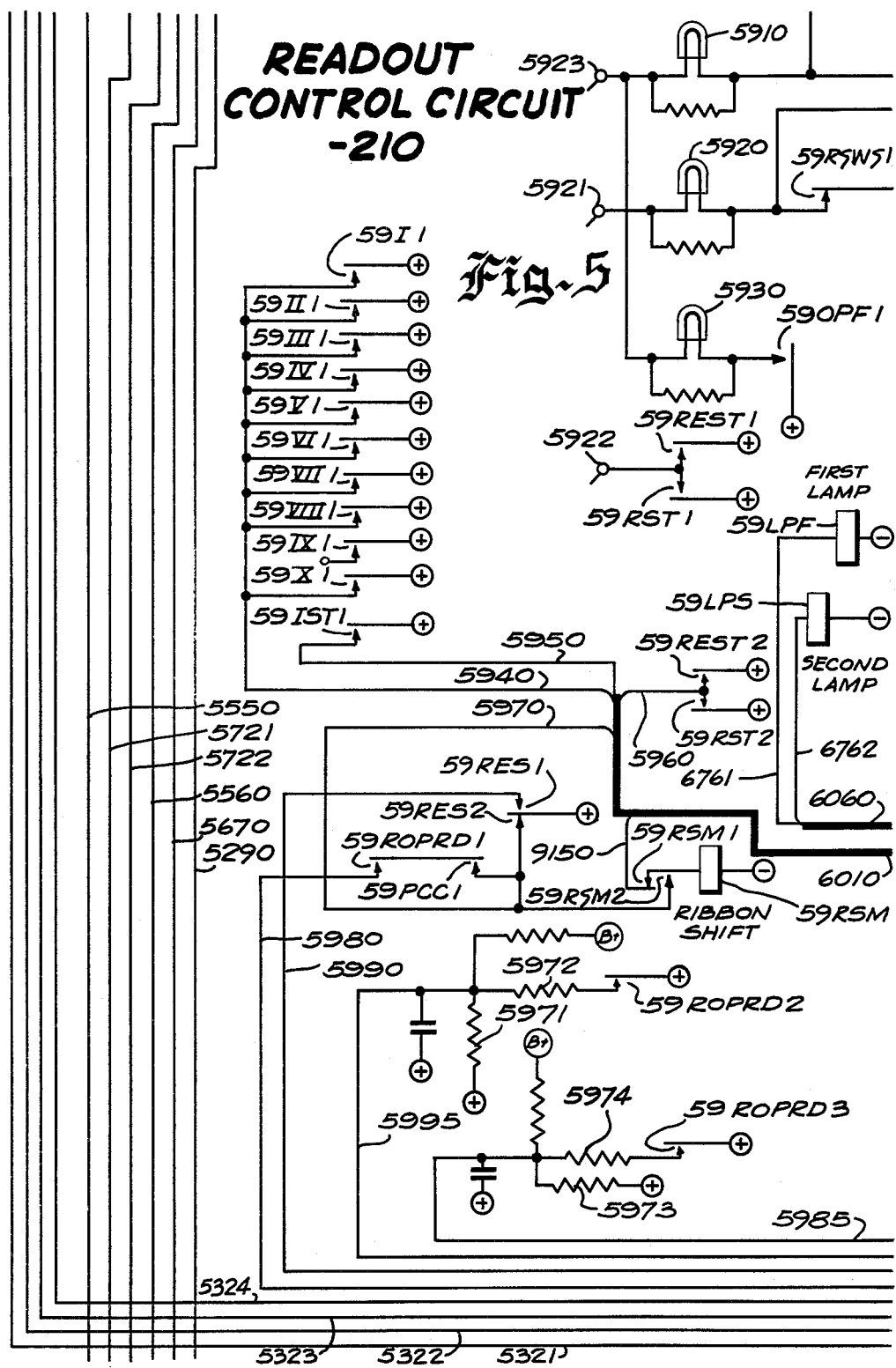

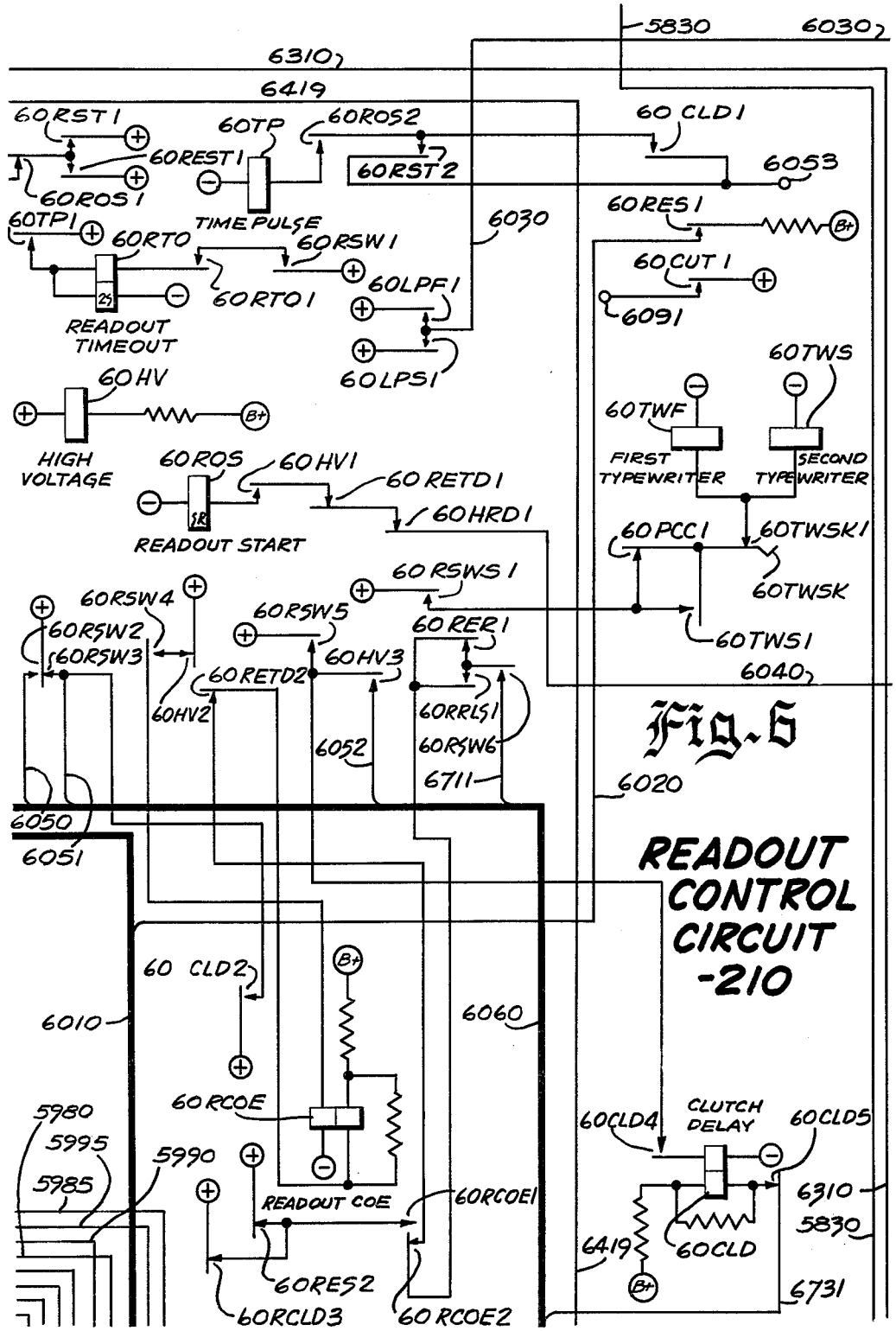

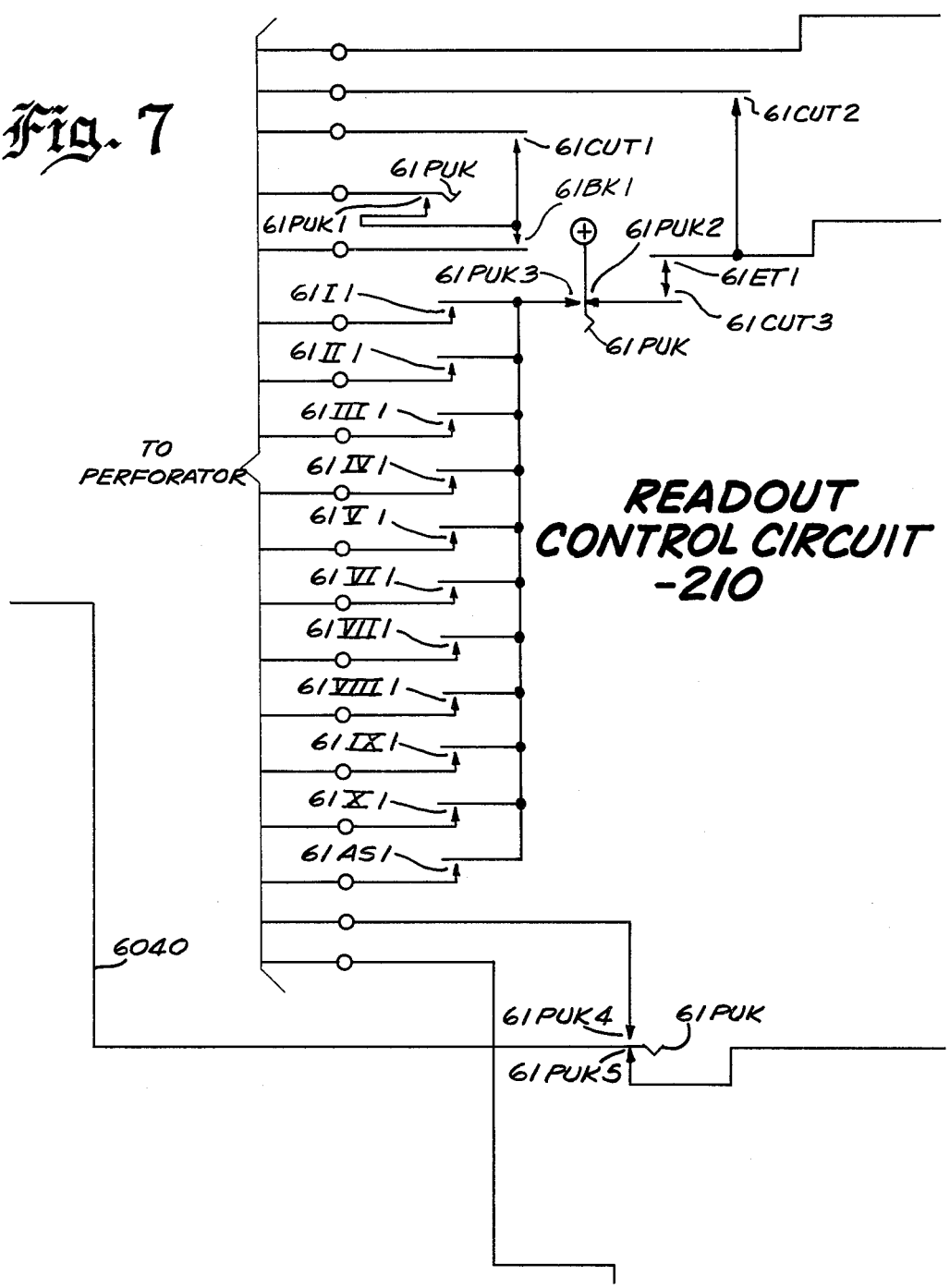

Jan. 4, 1966 — F. A. MORRIS ETAL — 3,227,808
LOCAL AND REMOTE TOLL TICKETING
Filed Sept. 26, 1955 — 29 Sheets-Sheet 8

Jan. 4, 1966  F. A. MORRIS ETAL  3,227,808
LOCAL AND REMOTE TOLL TICKETING
Filed Sept. 26, 1955  29 Sheets-Sheet 14

REMOTE PLAYBACK CONTROL CIRCUIT-235

ERASE MODULATOR - 10700

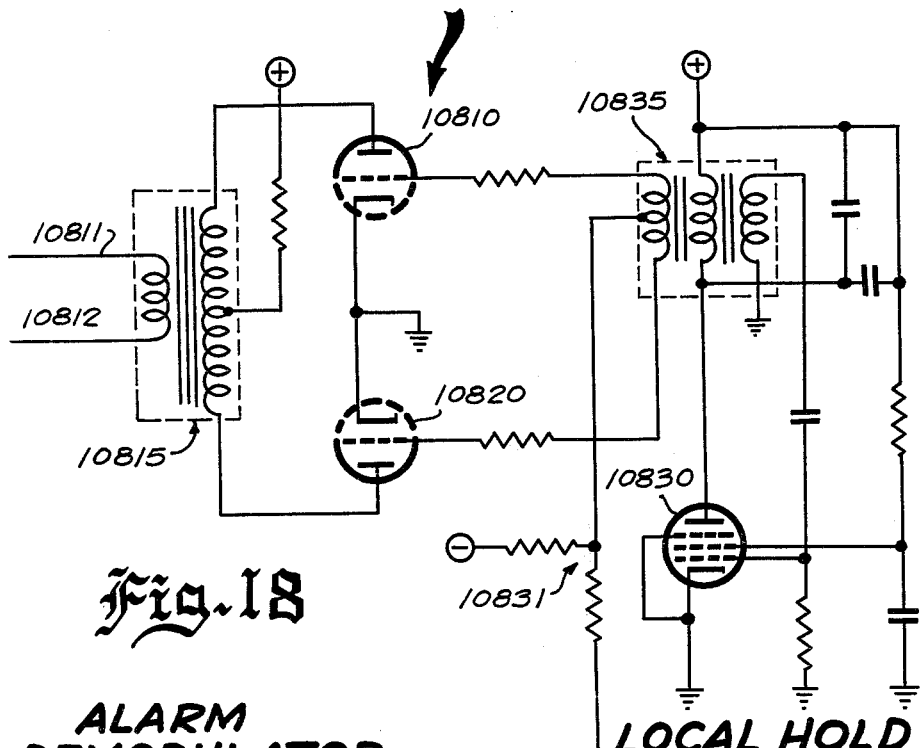
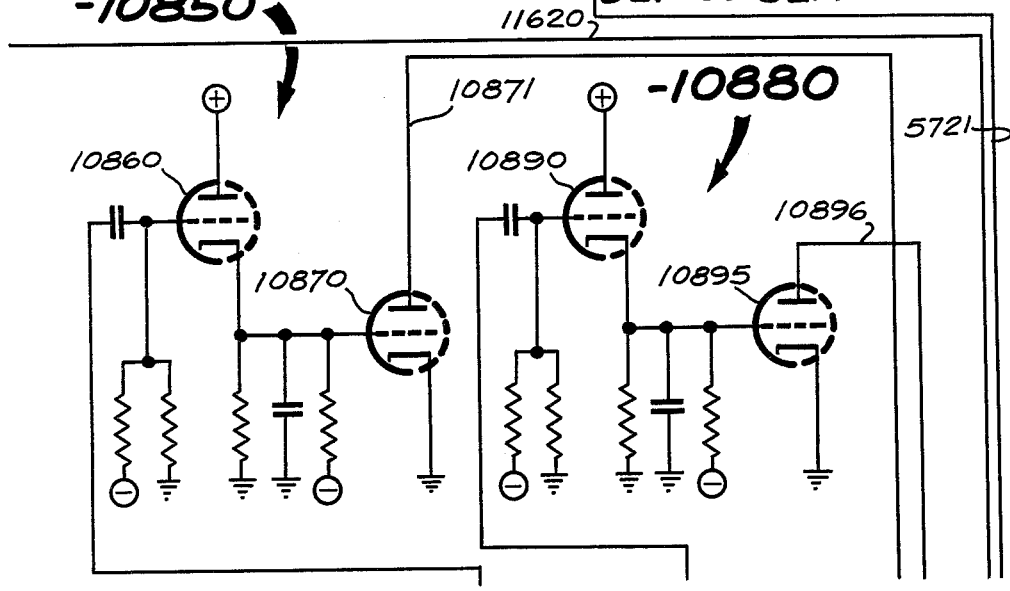
Fig-18

Jan. 4, 1966  F. A. MORRIS ETAL  3,227,808
LOCAL AND REMOTE TOLL TICKETING
Filed Sept. 26, 1955  29 Sheets-Sheet 19

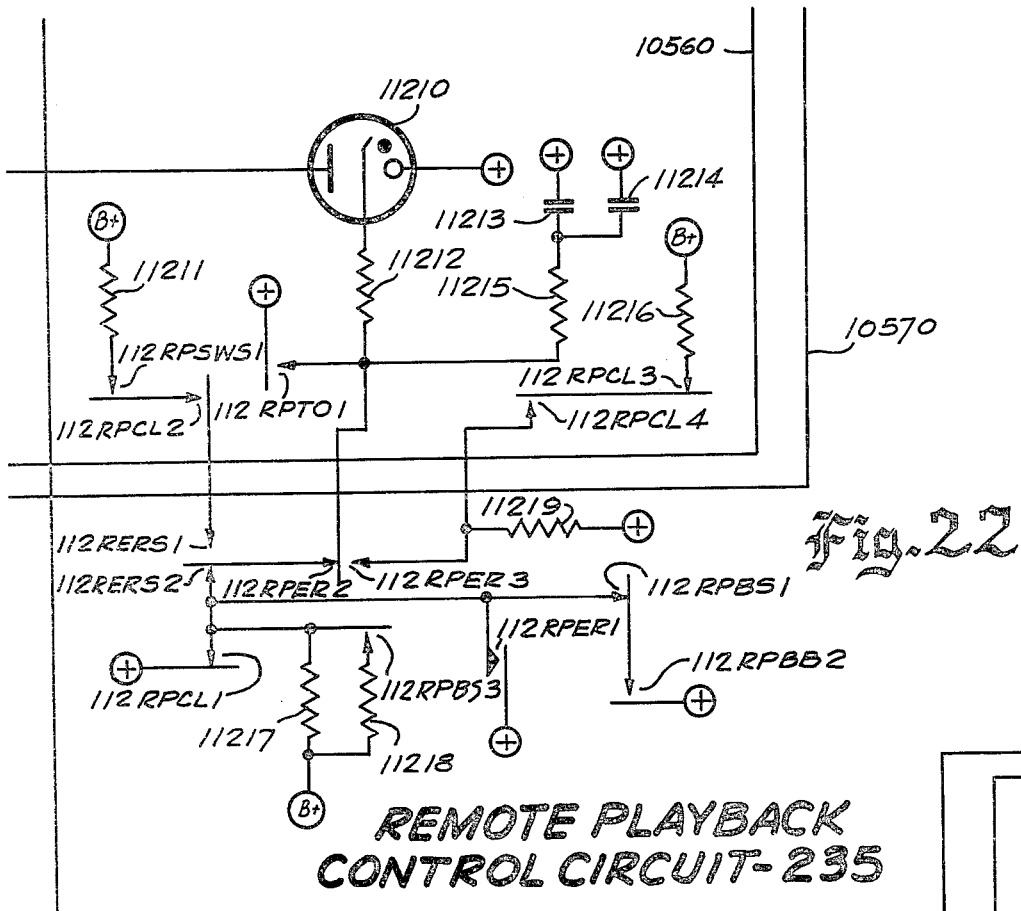
Fig. 22
REMOTE PLAYBACK CONTROL CIRCUIT-235
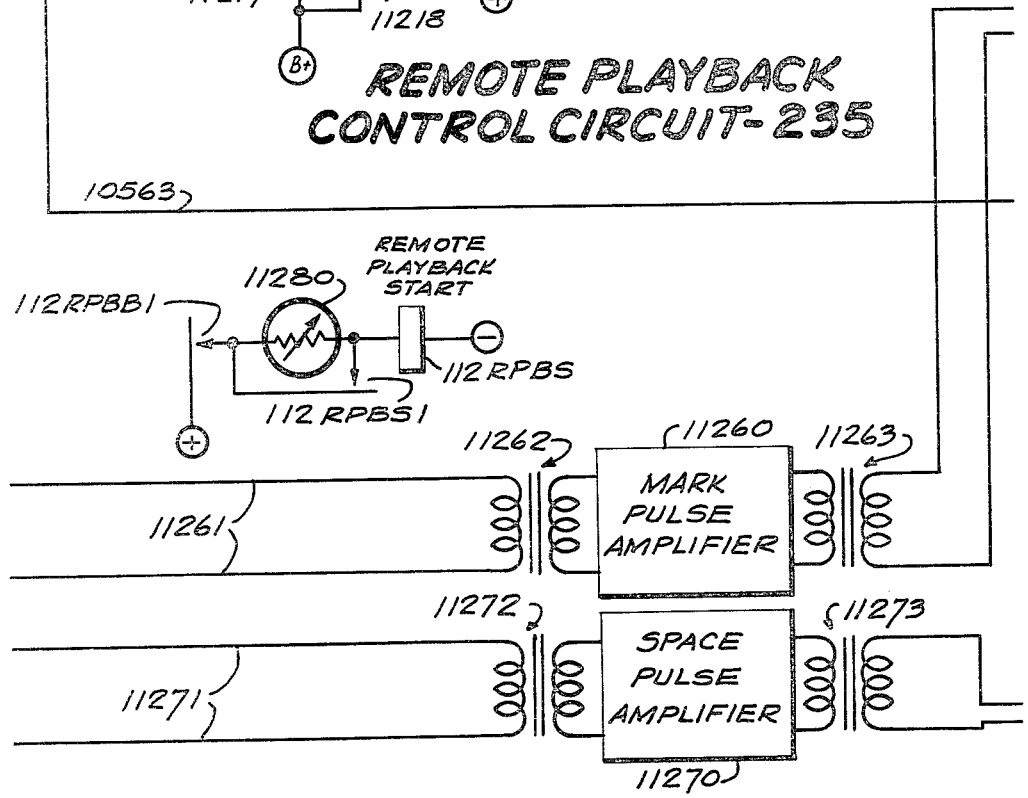

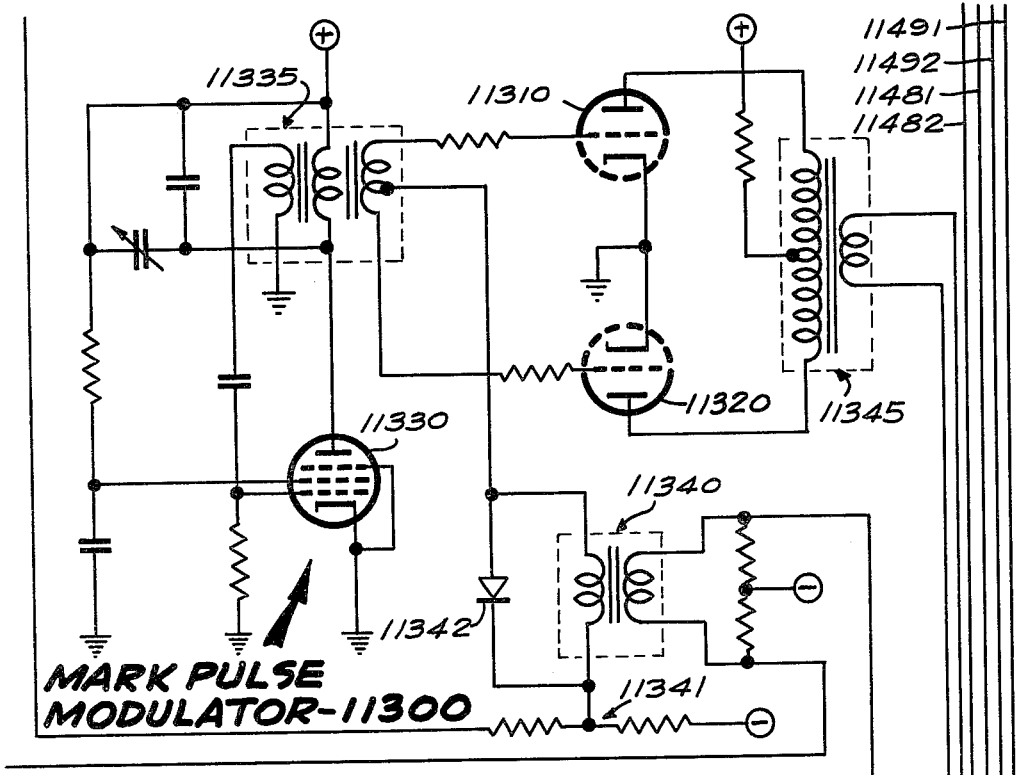
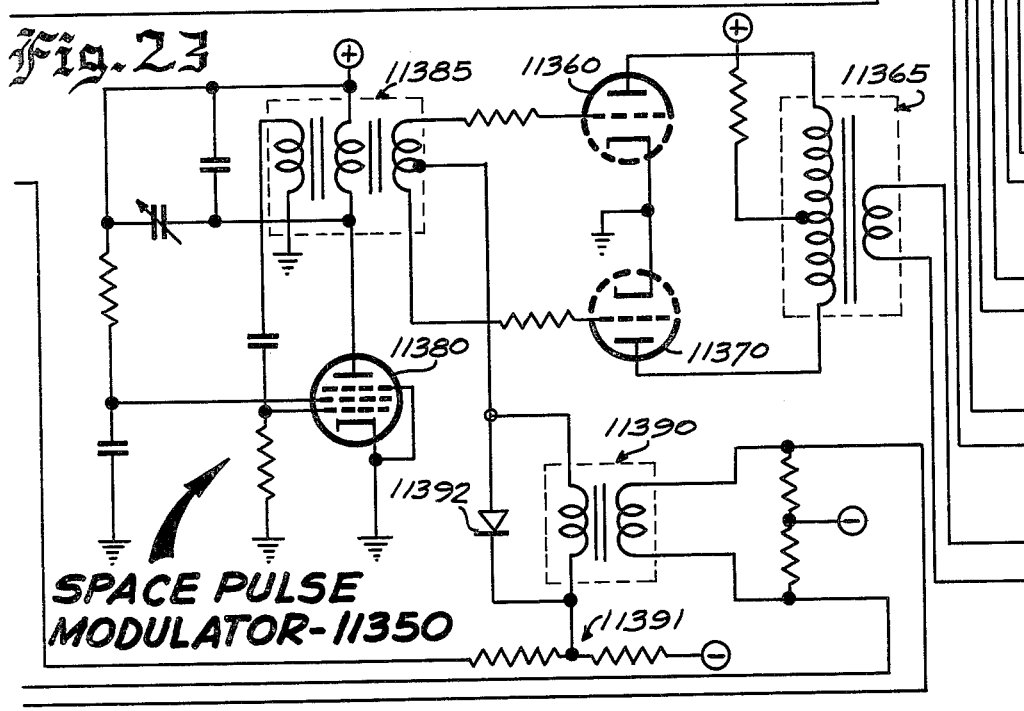
Fig. 23

Jan. 4, 1966  F. A. MORRIS ETAL  3,227,808
LOCAL AND REMOTE TOLL TICKETING
Filed Sept. 26, 1955  29 Sheets-Sheet 24
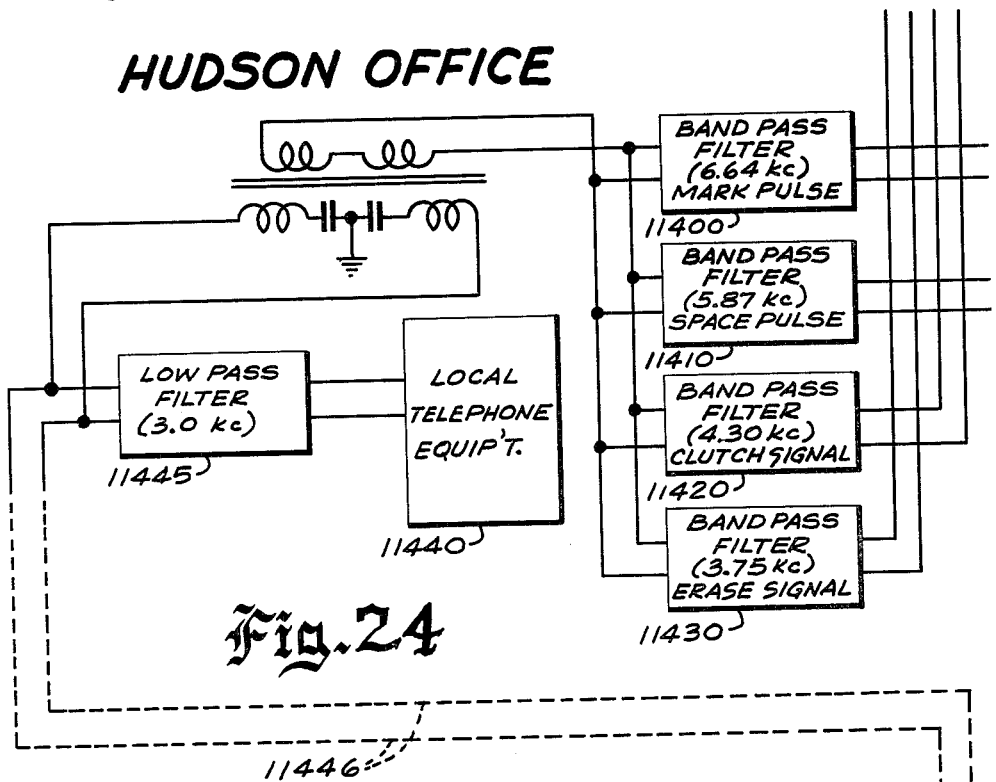
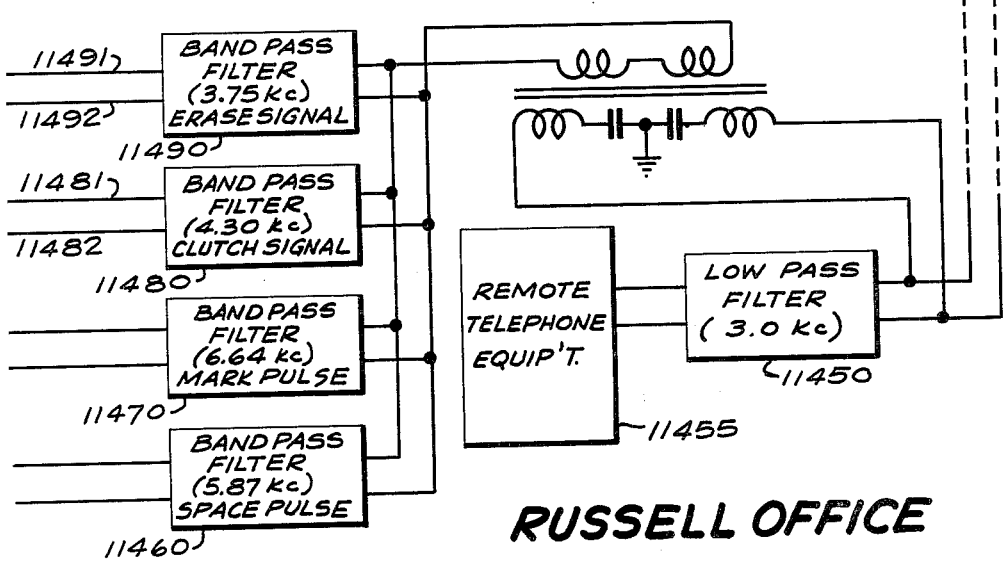
Fig. 24

LOCAL ADAPTER CIRCUIT-11600

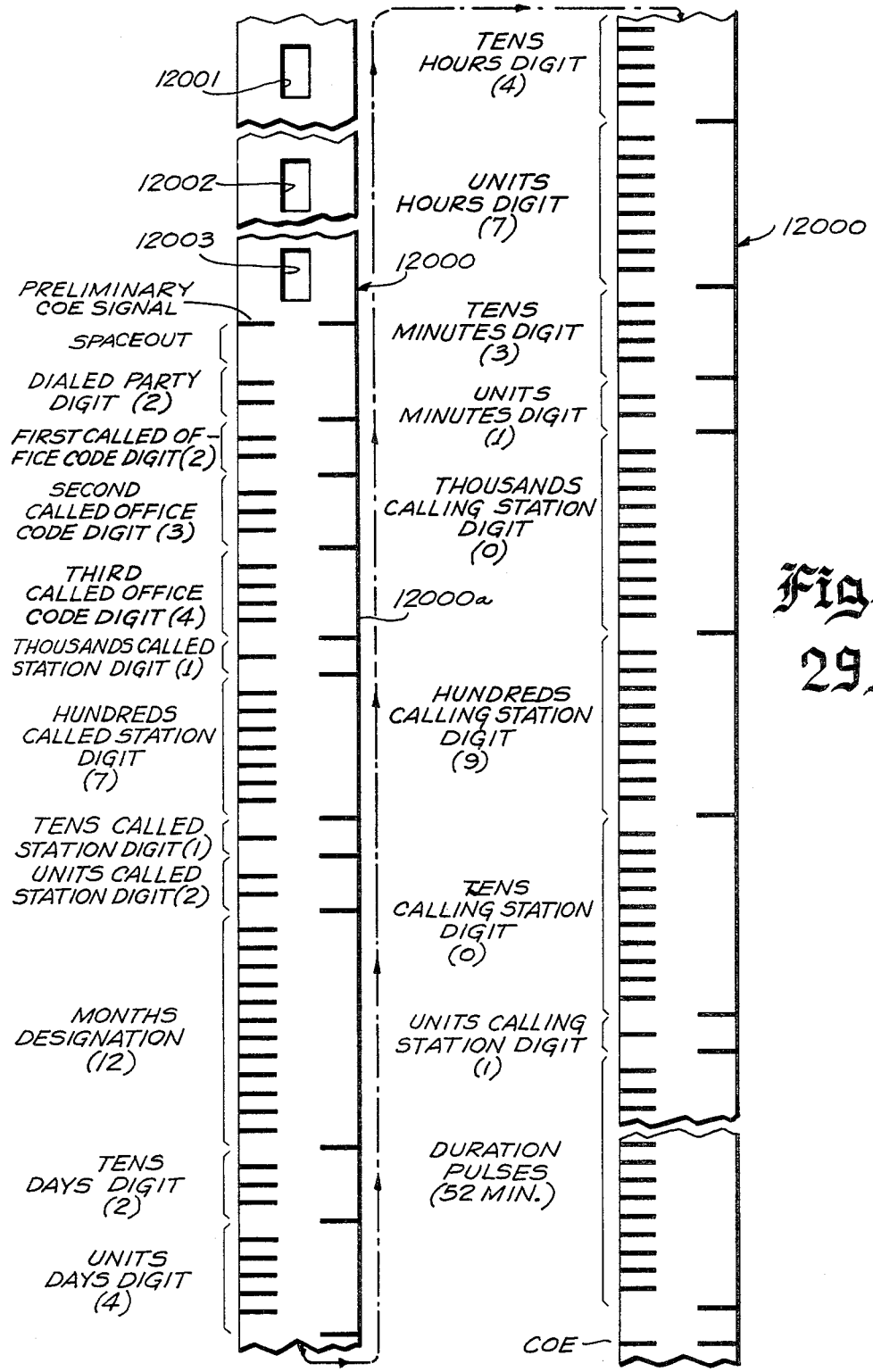

Jan. 4, 1966    F. A. MORRIS ETAL    3,227,808
LOCAL AND REMOTE TOLL TICKETING
Filed Sept. 26, 1955    29 Sheets-Sheet 29
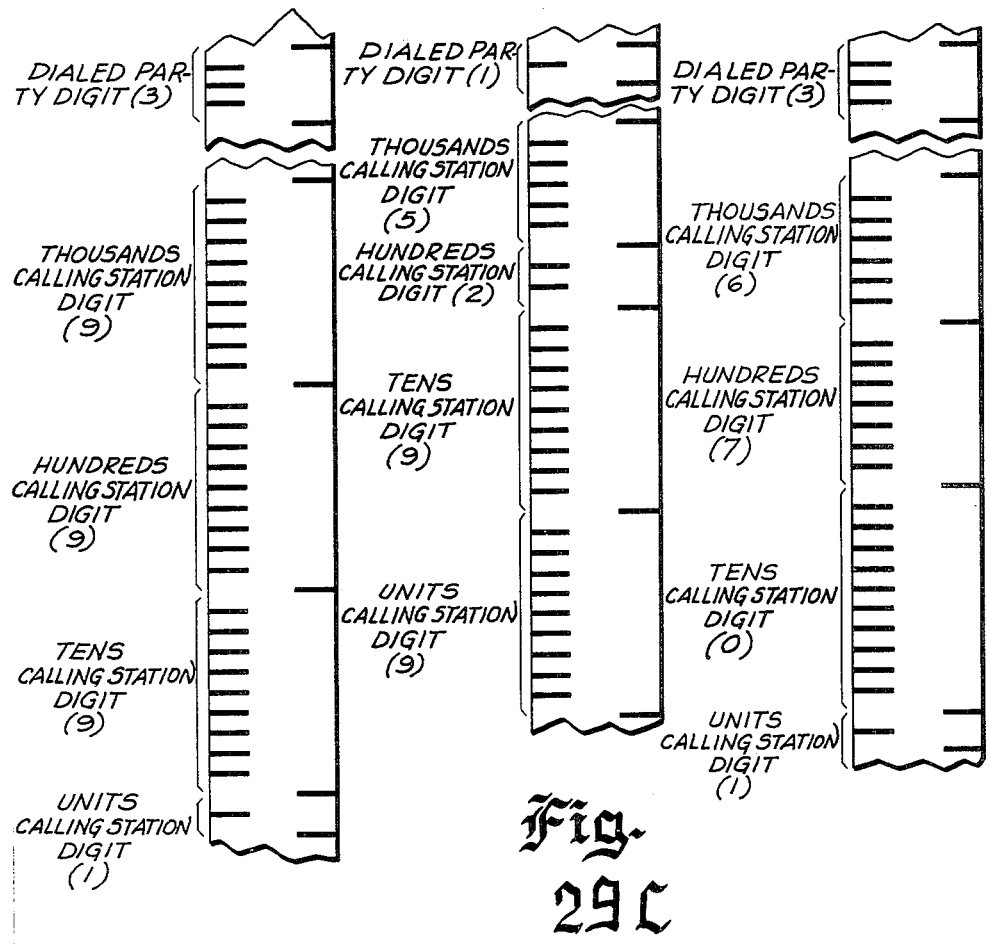

United States Patent Office 3,227,808
Patented Jan. 4, 1966

3,227,808
LOCAL AND REMOTE TOLL TICKETING
Frank A. Morris, Rochester, Howard L. Foote, Fairport, and Milton A. Clement and Ben A. Harris, Rochester, N.Y., assignors, by mesne assignments, to Stromberg-Carlson Corporation, Rochester, N.Y., a corporation of Delaware
Filed Sept. 26, 1955, Ser. No. 536,571
30 Claims. (Cl. 179—7.1)

This invention relates to a telephone system and, more particularly, to a system in which means are provided for automatic toll ticketing.

Most of the present systems in which data is automatically collected and subsequently utilized in the preparation of billing records on a call-by-call basis require the location of recording equipment in the same office or geographical location in which is located the information collecting equipment associated with conventional line extending means. These systems, in requiring read-out or recorder equipment in each of a plurality of offices having ticketing facilities, are costly both from the viewpoint of the physical space requirements and the amount of capital which is required to provide this type of service. Due to these factors, it often is not economically feasible to equip an office or exchange for automatic toll ticketing unless a fairly large volume of toll ticketing traffic is handled. In other present systems in which calls are ticketed on a call-by-call basis, one attempt has been made to obviate these difficulties by utilizing centralized recording or accounting equipment at a point such as a tandem office to which pertinent data is transmitted over the same lines utilized in extending the call to be ticketed, the data being transmitted either during the extension of or following the release of the connection. However, this is undesirable because of the increase in the holding time of the connection and because of the requirement inherent in this type of system that the toll connection must be extended through the tandem office in which is located the recording equipment.

Another proposed solution to this problem, in systems which ticket on a call-by-call basis, involves the provision of automatic switching means which are operated at the end of each call to seize a register filled with items of information pertaining to the preceding completed call and of further means for causing the transmission of the registered items pertaining to a single call to a central ticketing or accounting office which may be remote from the switching means used in extending the connection over which the ticketed call was placed. However, this system requires the provision of enough accounting office switching and recording equipment to handle all of the calls placed during the times of heaviest traffic and, further, inherently requires the provision of additional lines and switching means for handling nothing but the transmission of toll ticketing data from a collecting office to a recording office.

When the information pertaining to a plurality of calls is collected on a sensible medium which is used in separate collating and accounting equipment, the need to provide recording equipment at each office is obviated. In this type of system, the sensible medium is manually removed and placed in the separate recording and computing apparatus which may be located at any convenient point and which may handle the sensible mediums prepared at any number of information collecting offices. However, the advantages of automatic recording under the control of the information stored by the collecting apparatus is thereby lost, and the expense of operating the automatic toll ticketing facilities is increased due to the personnel required to remove and transport the sensible medium to the central accounting office.

Accordingly, an object of the present invention is to provide an automatic toll ticketing system in which information pertaining to a plurality of calls collected in a plurality of remotely located offices is automatically transferred to a central office to control the operation of recording means therein for preparing permanent records of the items of information pertaining to toll calls.

Another object involves the provision of a system in which data pertaining to a plurality of toll calls is collected in a plurality of remotely located points and is transferred to a central accounting office at selected intervals.

Another object is to provide an automatic toll ticketing system in which pertinent data is transmitted to a central office by means of selectively established carrier links.

A still further object involves the provision of an automatic toll ticketing system in which data pertaining to toll calls is collected in register means located in local and remote offices, and common recording apparatus in the local office seizes the registers to produce permanent records of the items of information stored therein.

Another object involves the provision of a continuously effective carrier link between a central accounting office and a remote data collecting office in an automatic toll ticketing system, which link is seized at selected intervals to relay the information from the data collecting office to control the recording of this data in a permanent form at the accounting office.

A still further object of this invention involves the provision of an improved carrier system.

Another object is to provide an automatic toll ticketing system wherein data stored on a sensible medium in a data collecting office is transmitted to a remote recording office under the control of means located in the recording office which selectively control the movement of the sensible medium in the data collecting office.

Other objects and advantages of the present invention will become apparent from the ensuing description of an illustrative embodiment thereof in the course of which reference is had to the accompanying drawings in which:

FIGS. 1 and 2 are a block diagram of an automatic toll ticketing system embodying the present invention which is shown in conjunction with a conventional automatic telephone system;

FIGS. 3 to 13, inclusive, illustrate the details of a read-out control circuit;

FIGS. 14 to 26, inclusive, illustrate the details of a carrier system for linking a local information collecting and recording office with a remote information collecting office which is schematically shown in FIG. 19;

FIG. 27 is a block diagram showing the manner in which FIGS. 3 to 26 are positioned adjacent each other to form a complete circuit diagram of the pertinent portions of an automatic toll ticketing system forming an embodiment of the present invention;

FIG. 28 is a block diagram disclosing the manner in which FIGS. 29A–D are schematic views of portions of a continuous magnetic tape on which are schematically indicated the items of information stored in conjunction with typical toll calls.

Figure 1:
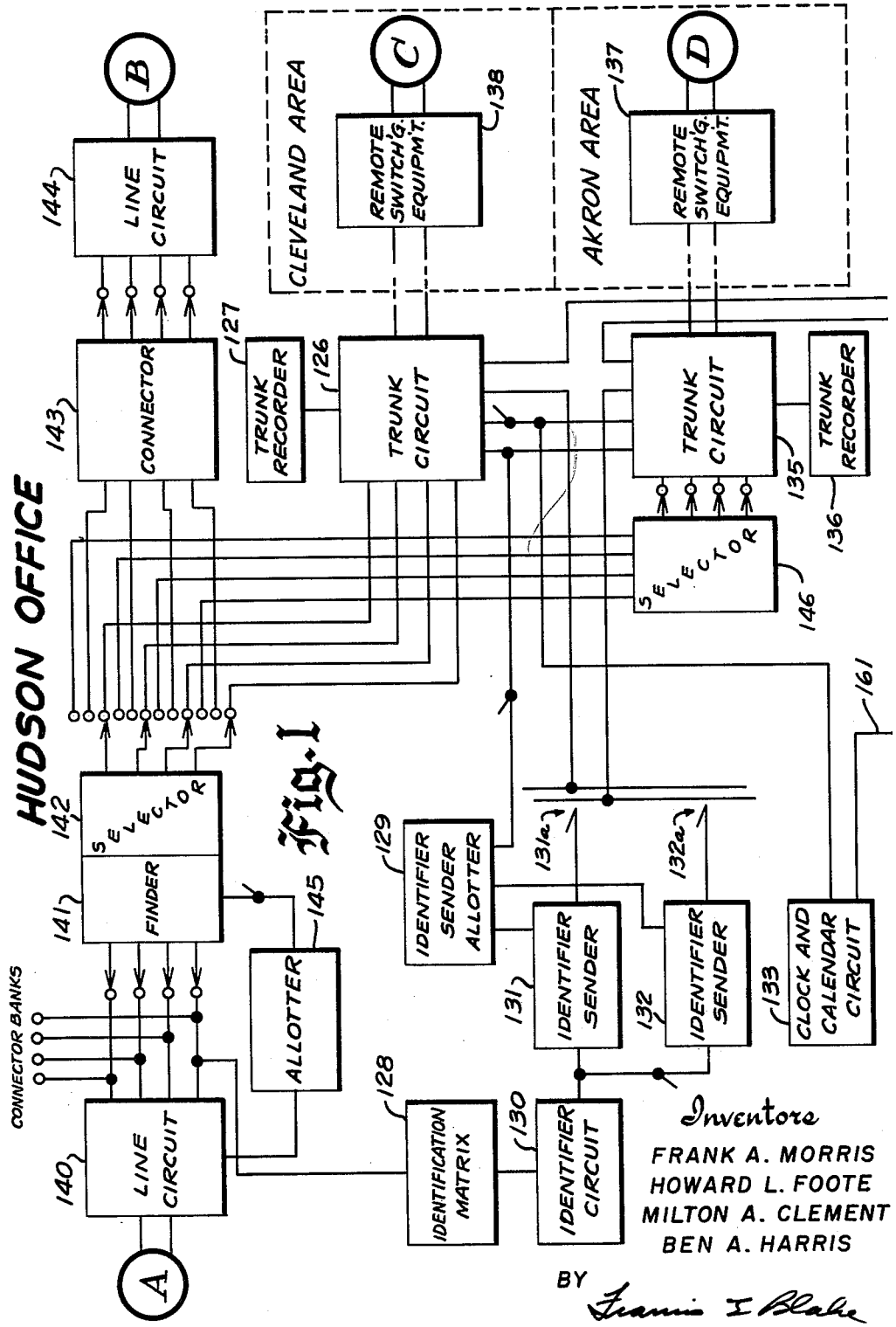
FIGS. 1 and 2 are positioned adjacent each other to form a complete schematic showing of the general components of this invention.

Reference is made to Patent 2,877,311, issued March 10, 1959, to Frank A. Morris and Milton A. Clement, on an application Serial Number 536,573, filed September 26, 1955, and assigned to the same assignee as the present application, which discloses in detail the entire automatic toll ticketing system shown in block diagram in FIGS. 1 and 2.

Since the present invention is concerned with only that portion of said automatic toll ticketing system shown in detail in FIGS. 57 to 67, inclusive, and FIGS. 104 to 116, inclusive, of said Patent 2,877,311, and the reference numeral plan utilized to identify various elements in the figures of said Patent 2,877,311 incorporates the figure number as a portion thereof, FIGS. 3–13, inclusive, herein are identical with FIGS. 57–67, inclusive, of said Patent 2,877,311, and FIGS. 14–26, inclusive, herein are identical with FIGS. 104–116, inclusive, of said Patent 2,877,311. Reference should be had to said Patent 2,877,311 to show the manner in which leads emanating from FIGS. 3–26, inclusive, herein are connected to the rest of the automatic toll ticketing system. In addition, FIGS. 29A–D are identical with FIGS. 120A–D of said Patent 2,877,311.

Figure 2:
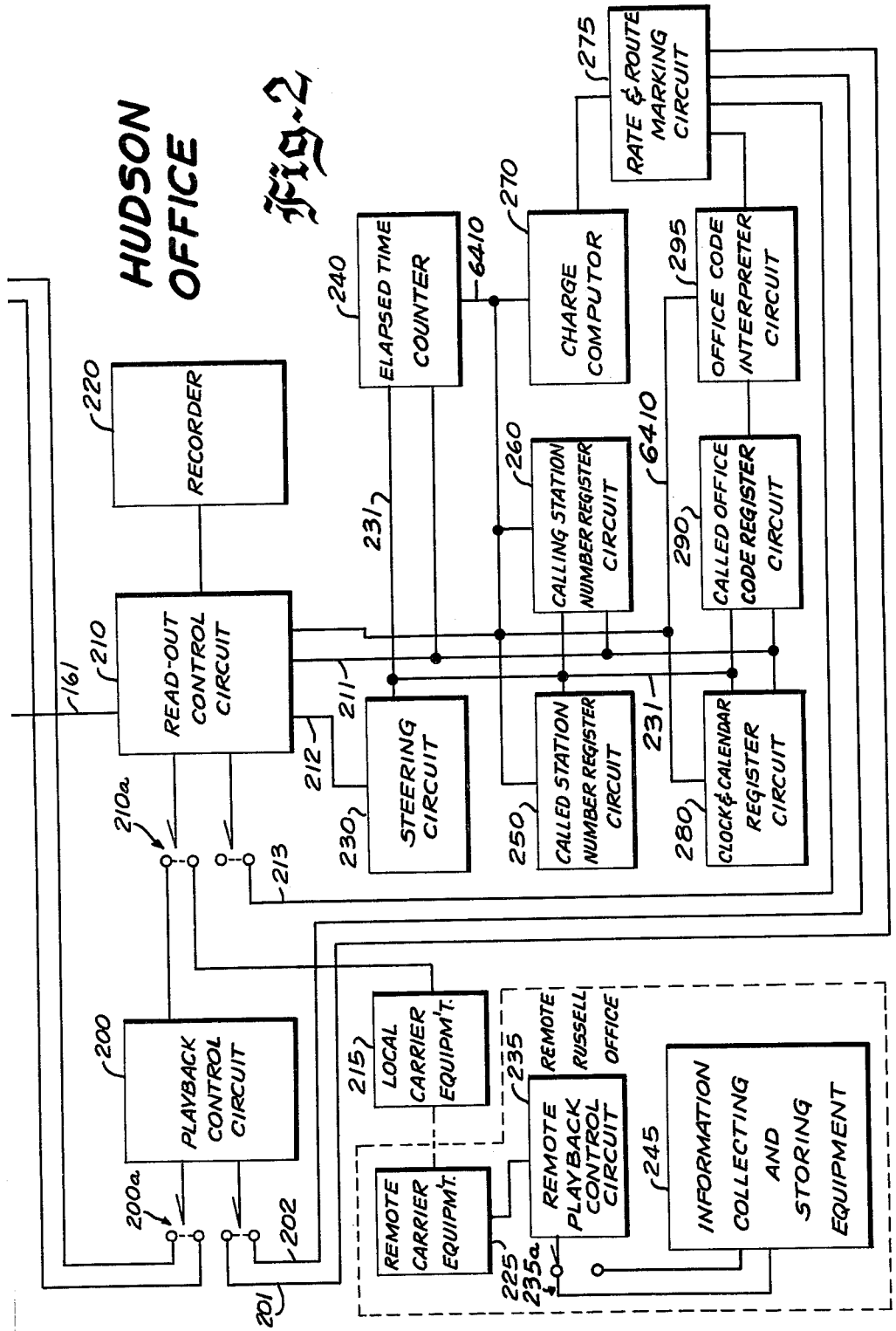
Figure 3:
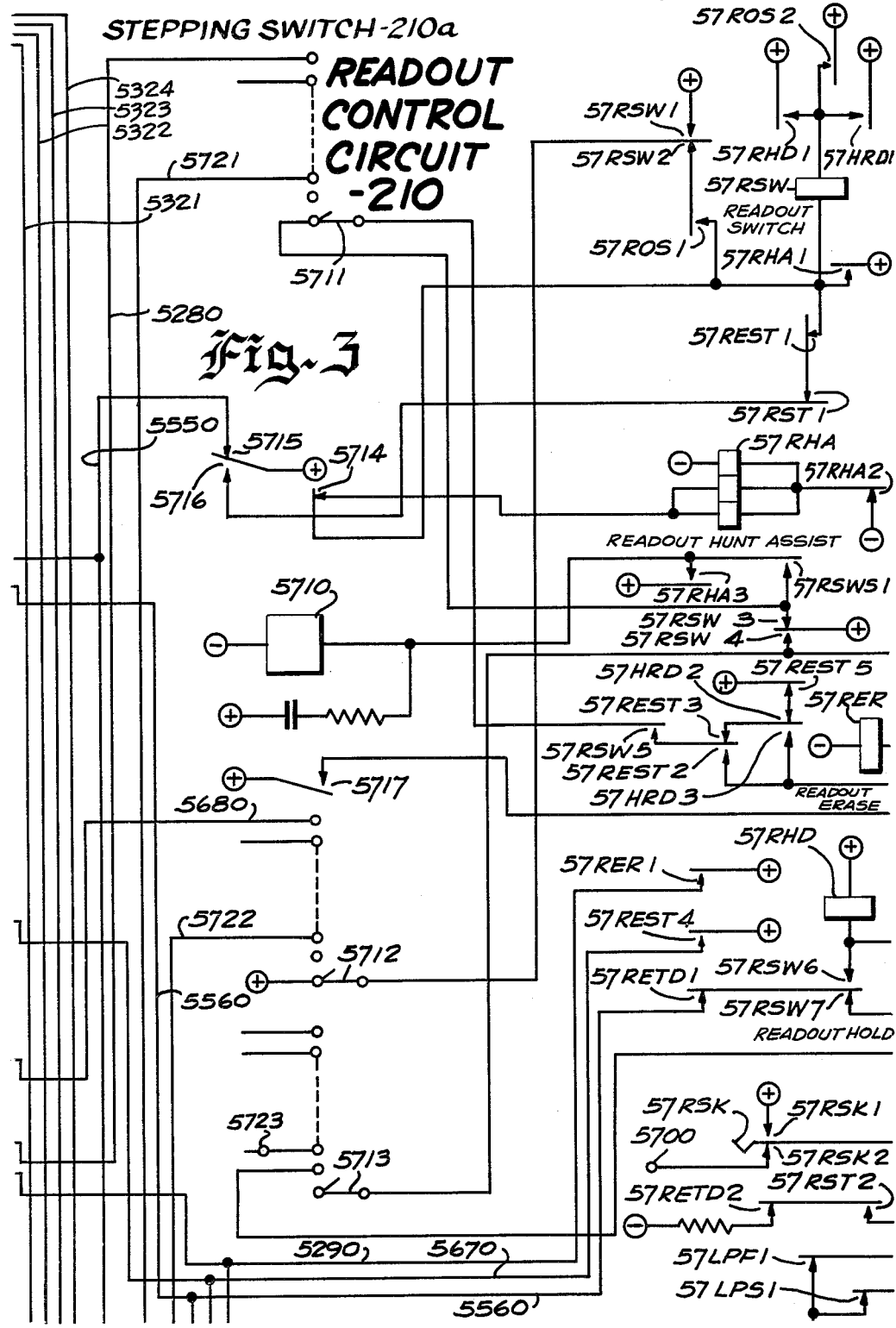
Figure 8:
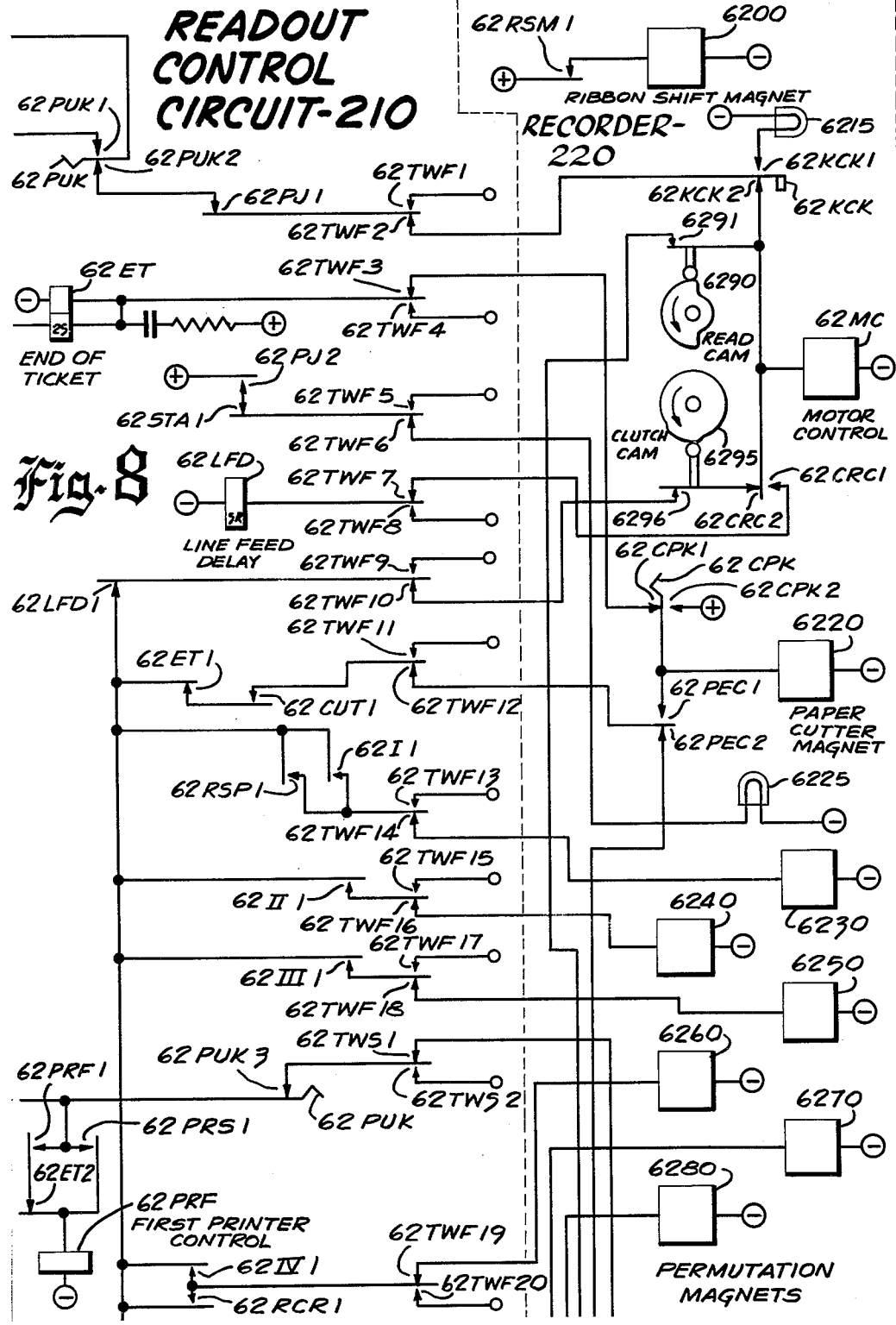
Figure 9:
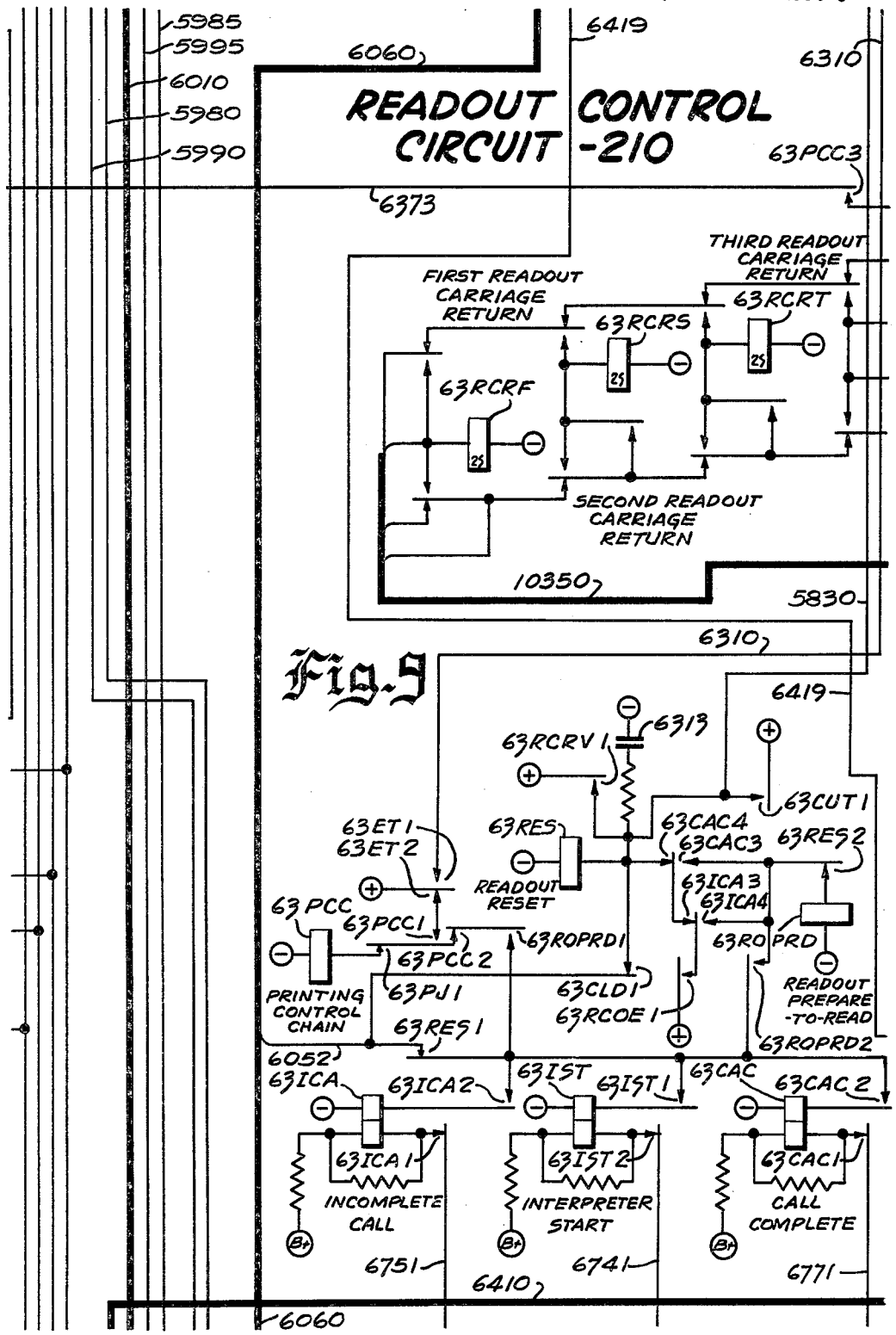
Figure 10:
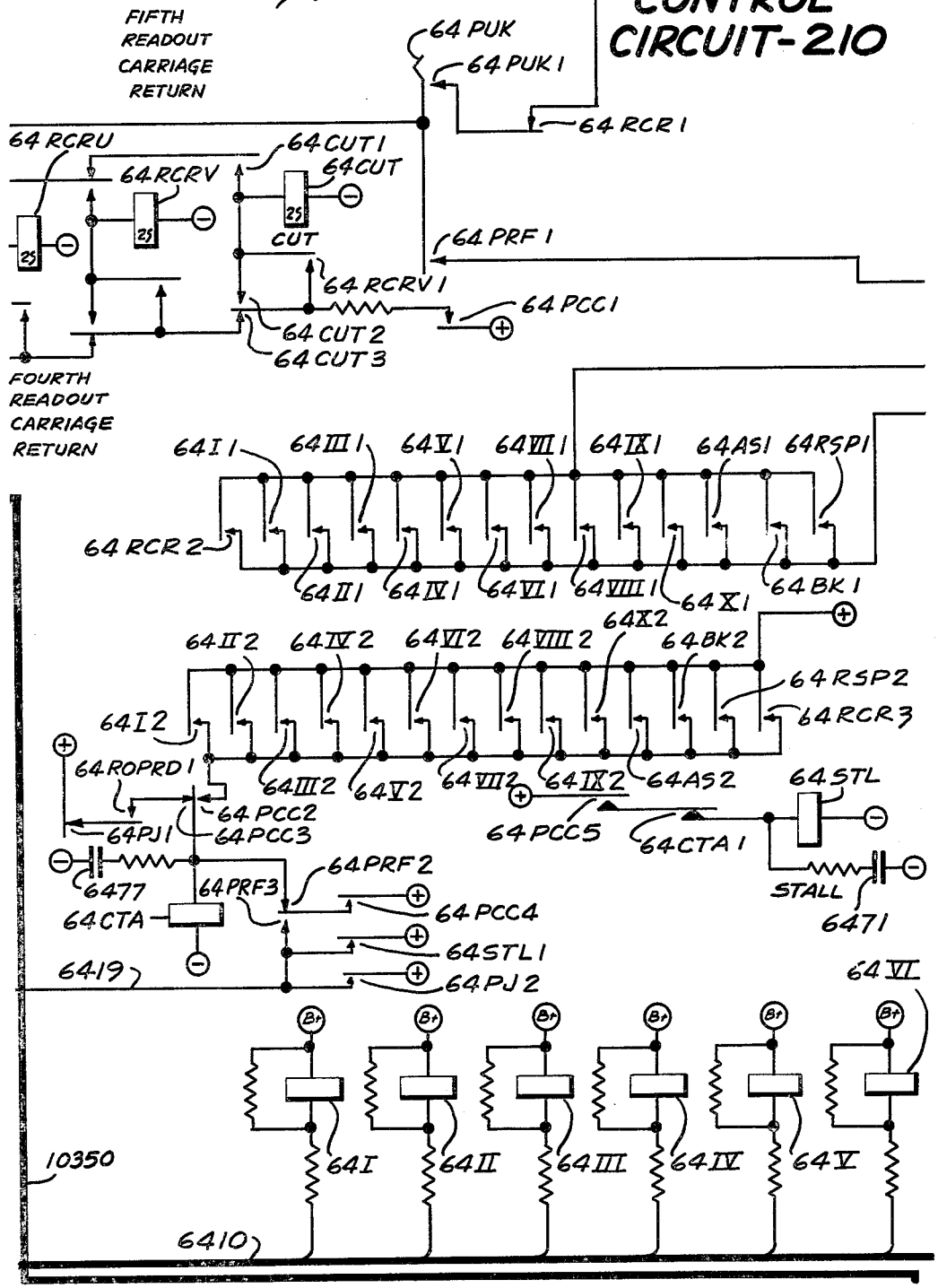
Figure 11:
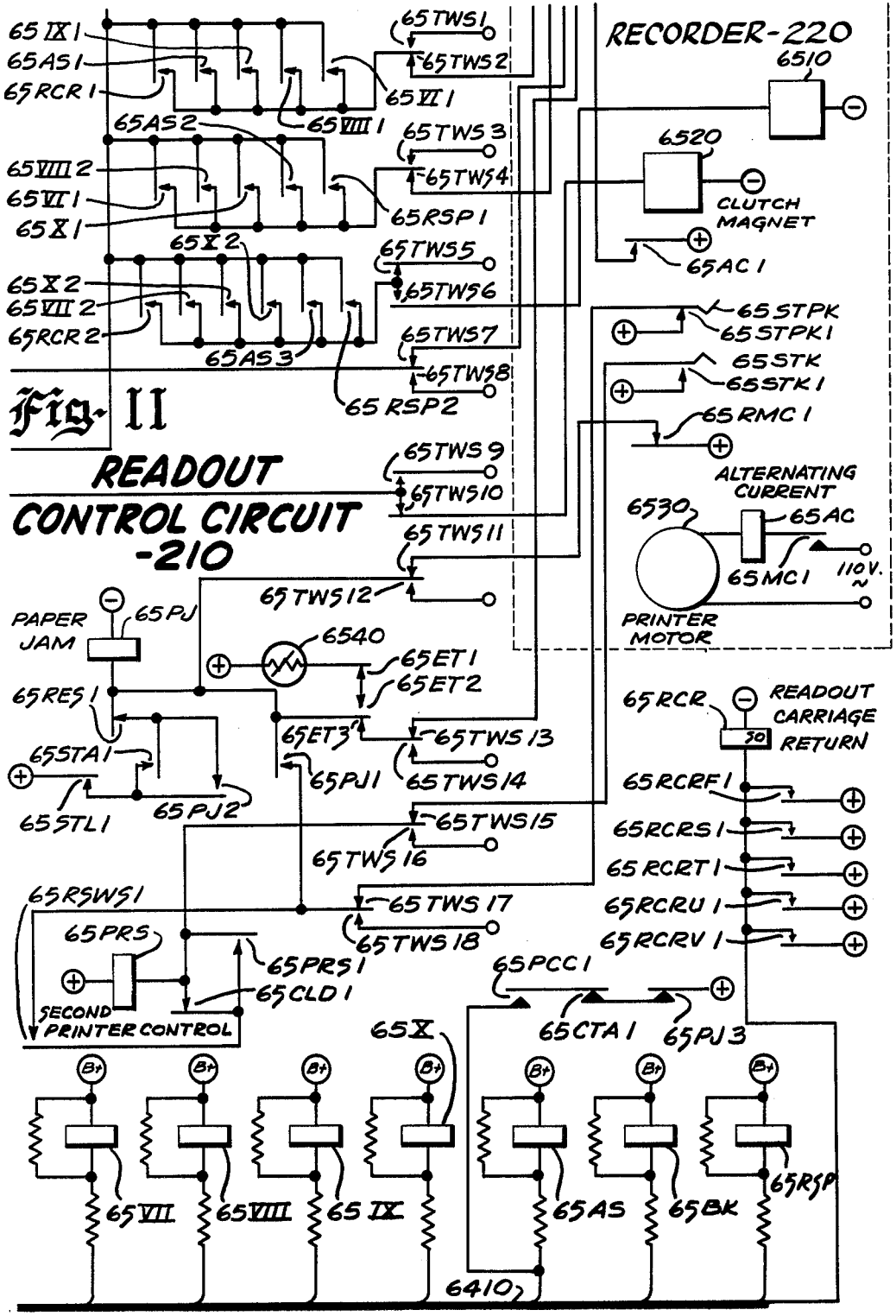
Figure 12:
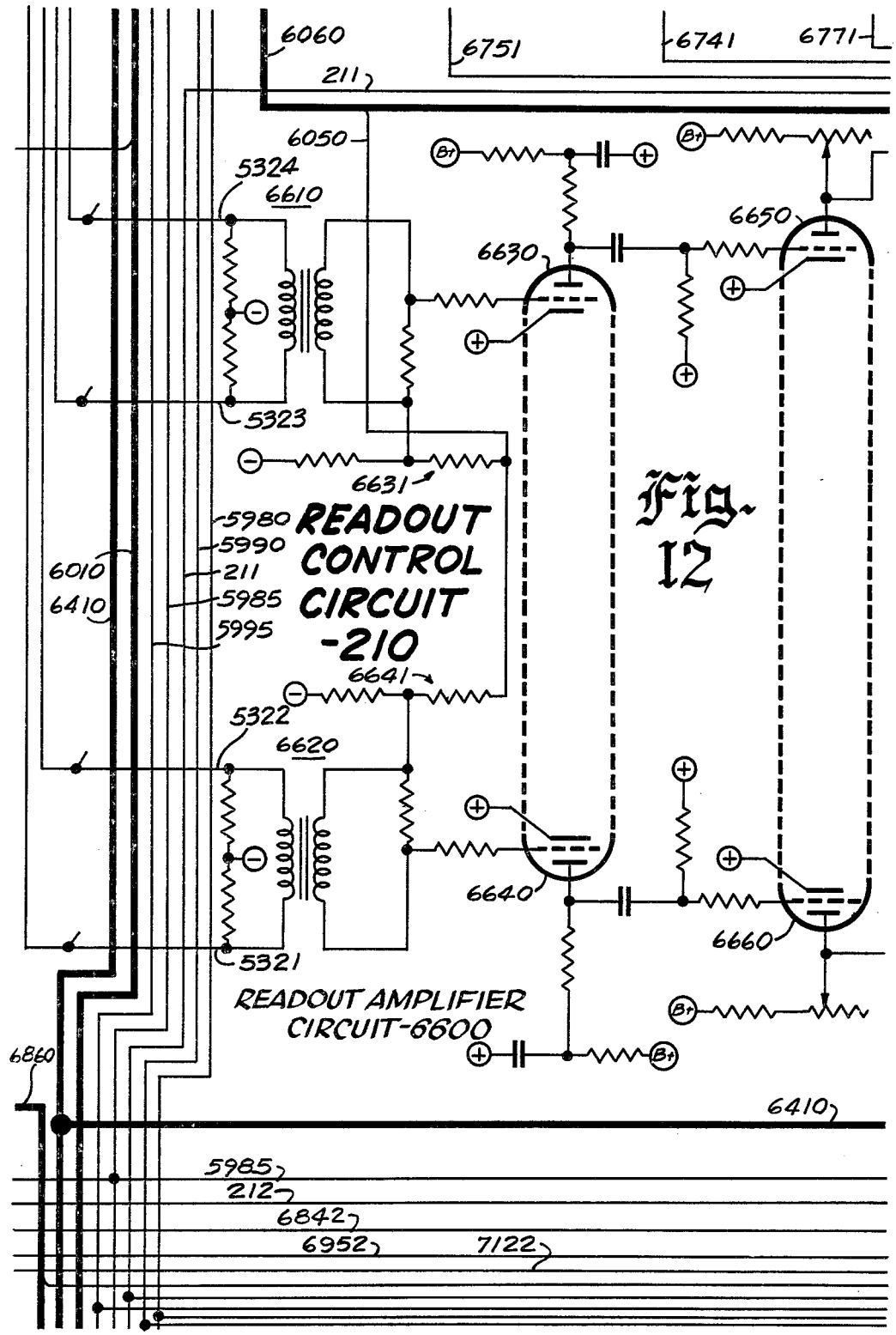
Figure 13:
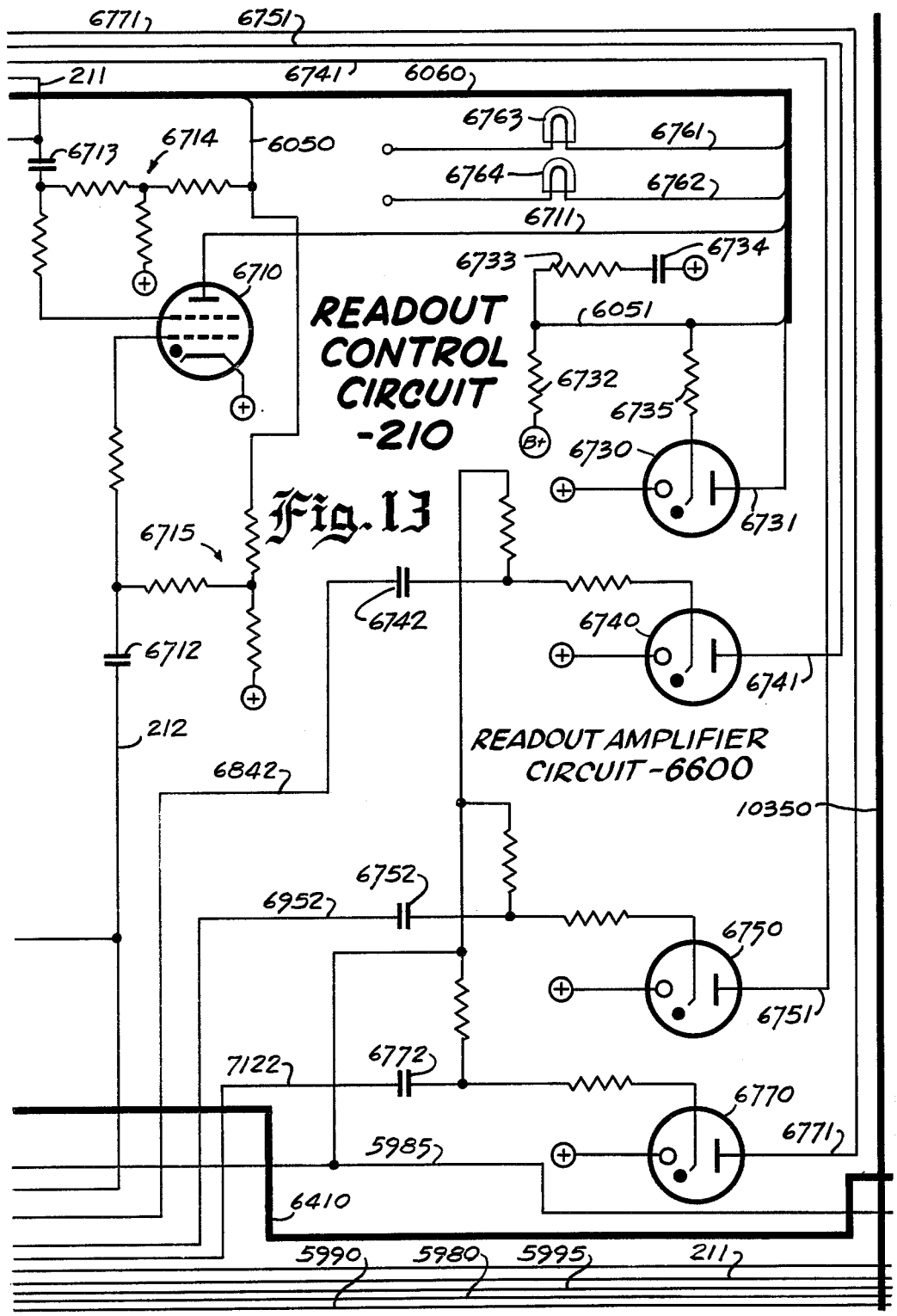
Figure 14:
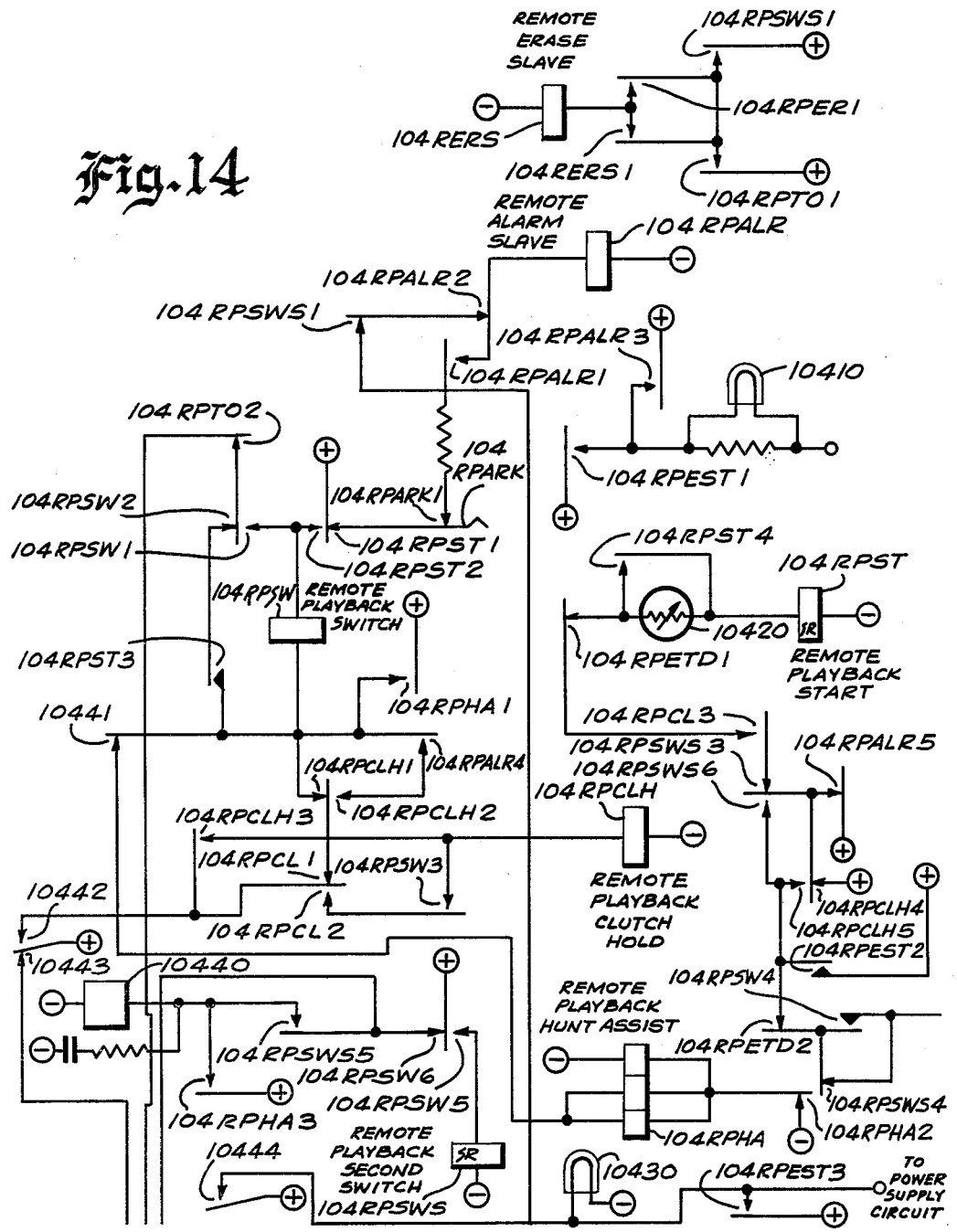
Figure 15:
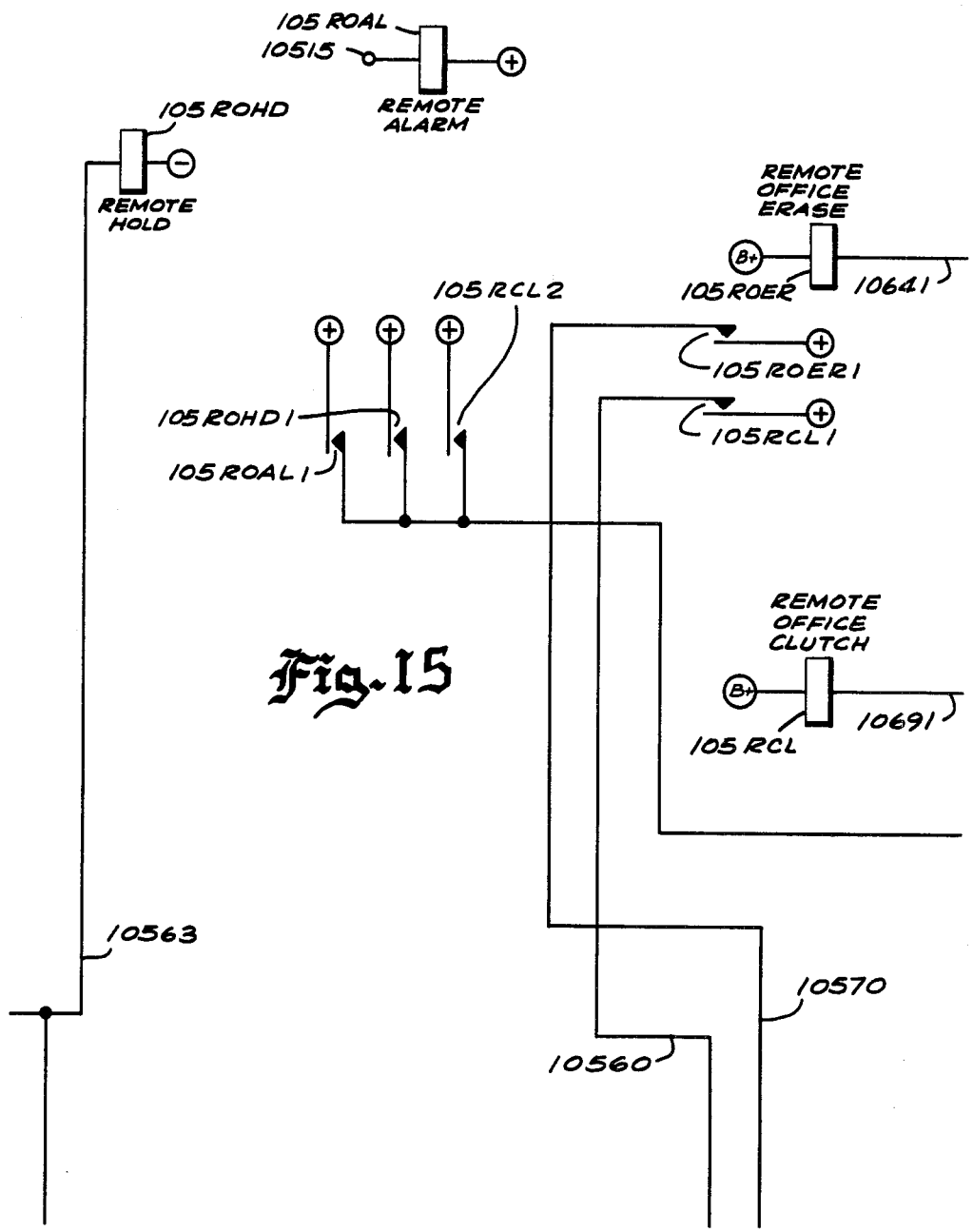
Figure 16:
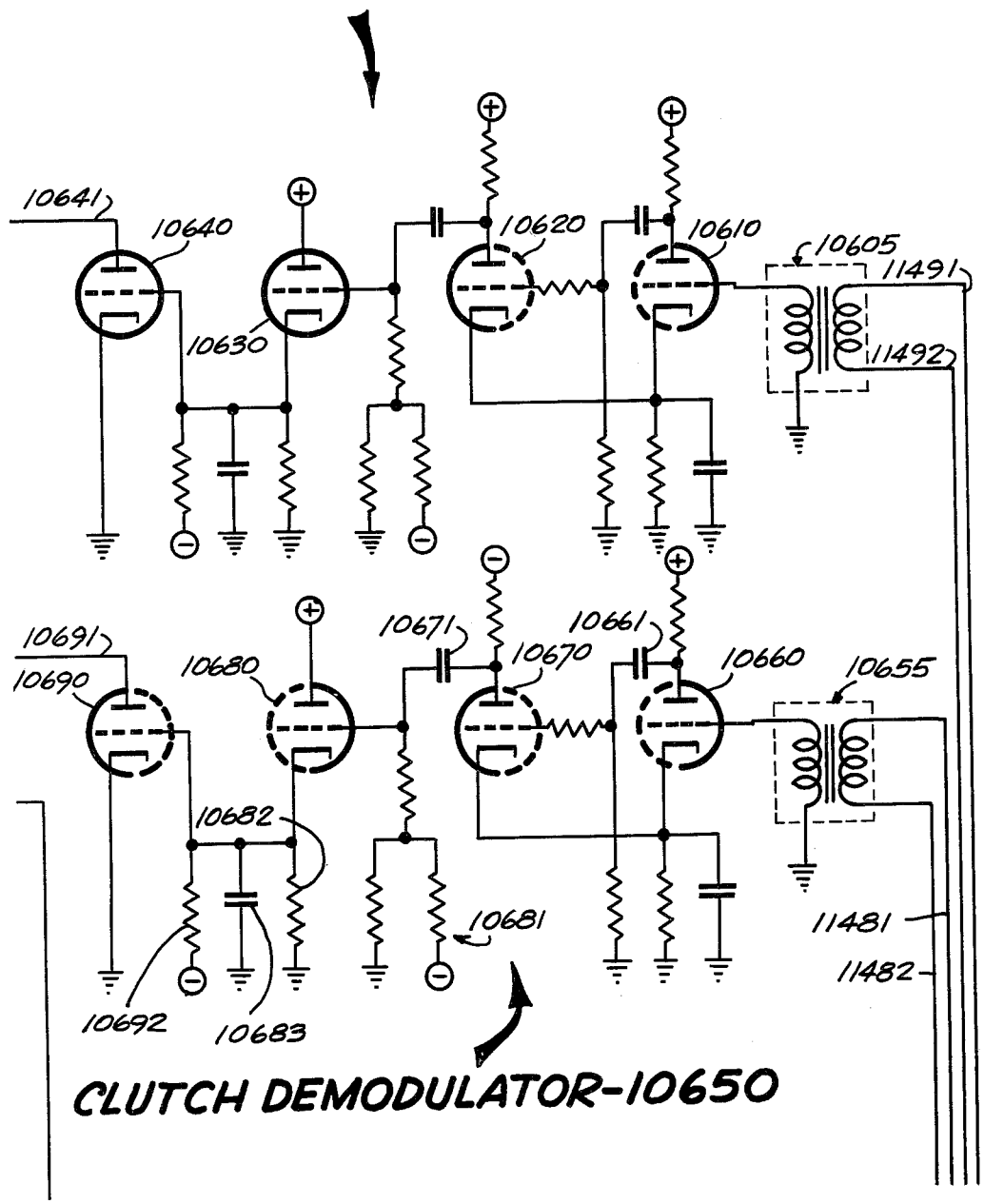
Figure 17:
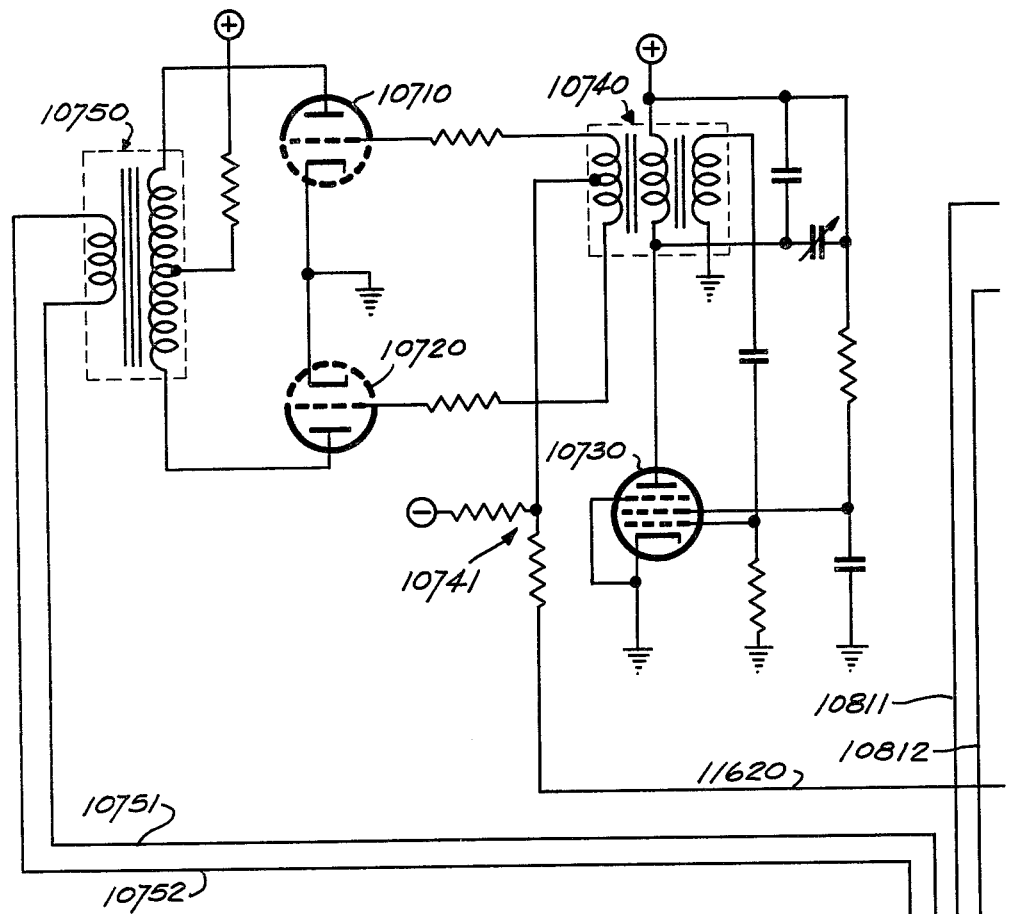

Referring now to FIGS. 1 and 2 of the drawings, the exchange network shown therein by way of example comprises a local Hudson office in which are terminated trunk circuits extending to geographically remote areas such as the Cleveland and Akron areas in which are located automatic switching equipment which is utilized in conjunction with equipment provided in the Hudson office for extending toll calls from the Hudson office to exchanges located in either the Cleveland or the Akron area. In addition, the local Hudson office includes conventional switching means for extending connections to local subscribers which are not ticketed. Further, the network includes a remote office, such as the remote Russell office (FIG. 2), which is also provided with conventional switching equipment for completing nonticketed calls to local subscribers and with trunks which extend to various geographically remote areas having exchanges to which calls to be ticketed are automatically extended from the Russell office.

Since both the Hudson and Russell offices are provided with automatic dial equipment capable of extending toll calls which are to be automatically ticketed, both of these offices are provided with information collecting and storing equipment which includes common means for determining and storing, in register means comprising a plurality of trunk recorders each individual to a trunk circuit, the identification of the called station and office, the identification of the calling station, the date and time at which the call was filed or placed, and the duration of the call. Since the Hudson and Russell offices are geographically remote from each other, the information collecting and registering means provided therein are entirely separate and independent in their operation to provide the above identified items of information. However, in view of the cost of the recording equipment and its associated control equipment, a common recording equipment is provided in the Hudson office which is capable of providing permanent records of the items of information stored in both the registering means in the Hudson office and those similar means which are provided in the remote Russell office. This recording equipment includes means for storing all of the items of information enumerated above, an office code translator for translating the called office digits into alphabetical characters, a rate and route marking circuit partially controlled by the office code translator or interpreter, a charge computer or calculator which utilizes information from the rate and route marking circuit and the duration of each call for determining the monetary charge to be assessed therefor, and a recording means in the form of either an automatically operated printer or perforator which provides permanent records individual to each toll call.

A playback operation, during which the individual tickets or permanent records are produced in accordance with the stored items of information at the various offices, is initiated at selected chronological intervals, manually, or in response to an emergency start condition caused by one of the registers becoming filled with stored information. In response to any of these starting conditions, a readout control circuit associated with the recording apparatus is rendered effective to seize one or more playback control circuits, each having access to a group of the local trunk recorders. These trunk recorders or registers are successively interconnected with the recording apparatus through the seized playback control circuits to control the production of printed or perforated tickets, each corresponding to one of the plurality of calls concerning which information has been recorded in the seized trunk recorder.

When it is desired to print tickets in accordance with items of information stored in the registers located at the remote Russell office, the readout control circuit seizes a remote playback control circuit located in the remote Russell office over a carrier link, communication between the Hudson and Russell offices over the carrier link being accomplished by a plurality of modulators and demodulators having both pulse transmitting and control functions. In this manner, the common recording equipment at the Hudson office is effective to produce printed or perforated toll tickets in accordance with the items of information stored either locally in the Hudson office or in the remote Russell office.

GENERAL OPERATION OF THE SYSTEM

Operation of the system on local calls

In order to place a nonticketed call from a subscriber at a substation A located in the Hudson office to another local subscriber at a substation B also located within the Hudson office, the call is initiated by the calling subscriber lifting the handset from its cradle to actuate the cradle switch at the substation A, thus closing a calling loop circuit over the line circuit 140 in the Hudson exchange. When this loop circuit is closed, the line circuit 140 applies start ground potential to the sleeve conductor of the line multiple terminating at this line circuit and thus marking the line against seizure on incoming calls. Also, incident to operation of the line circuit 140, the numerical identity of the calling line is marked in the bank contacts of the finders, including the finder 141, having access to this line, and start ground potential is applied to a common allotter start lead extending to an allotter 145. This allotter first functions to find an idle link in the group having access to the calling line and, following the seizure of an idle link comprising a finder and a selector, a finder, such as the finder 141, operates in conjunction with the allotter 145 to step the wipers thereof in two directions until the wipers are moved into engagement with the contacts terminating the line multiple individual to the line circuit 140. When the line finding operation is thus completed, the allotter 145 is dismissed, and the calling loop circuit is extended through the finder 141 to a selector 142 which forms the other portion of the link. In response to this operation, the selector 142 returns dial tone to the calling subscriber at the substation A to indicate that the dialing operation can be initiated.

The first digit dialed at the calling substation produces a response in the selector 142 which results in the wipers of this selector being positioned opposite the level of bank conductors in which are terminated trunks extending to the connectors of the group having access to the called substation B and which includes a connector similar to the connector 143. Also, in response to the impulses provided by the dialing of the first digit, the selector 142 terminates the transmission of the dial tone to the calling substation A. During the interdigit pause separating the first digit and the second digit which is to be dialed, the selector 142 tests the idle or busy condition of the connectors having seizure trunks terminated in the selected contact bank level and positions its wipers on the contacts thereof terminating the seizure trunk extending to the first idle connector, such as the connector 143, in the selected group. Thereafter, upon seizure, the calling loop circuit is extended to the connector 143 in preparation for receiving the impulses of the second and succeeding digits dialed at the calling substation A.

The connector 143 responds to the impulses of the second digit by moving its wipers in one direction to position the same opposite the associated group of bank contacts terminating the subgroup of ten lines including the called line extending to the subscriber at the substation B. During the interdigit pause separating the second and third digits, the connector 143 is conditioned to drive its wipers in a second direction to select the particular desired line. Accordingly, when this third digit is dialed, the connector 143 positions its wipers on the bank contacts terminating the line multiple of a line circuit 144 to which the called substation B is connected. Thus, the calling line is selected. The fourth and final digit dialed at the calling substation A conditions the connector 143 to transmit ringing current to the called substation B after the completion of a busy test operation. However, it should be understood that, depending upon the size of the Hudson office, it may be necessary to dial more than four digits to control the operation of interposed switching equipment such as the selector 142 and the connector 143 in order to extend a local connection from the calling substation A to the called substation B.

Assuming that the line extending to the substation B tests idle, the connector 143 automatically applies ground potential to the sleeve lead of the line multiple individual to the calling line circuit 144 to guard this line against subsequent seizure by other connectors having access thereto and, substantially coincident therewith, transmits ringing current to the called substation B. Concurrently with transmission of ringing to the called line, the usual ringback tone signal is transmitted over the calling loop circuit to inform the subscriber at the substation A that the called substation is being rung.

When the call is answered at the substation B, the connector 143 is automatically shifted to a talking position in which voice currents are transmitted in either direction between the substations A and B. When the desired connection is released, either upon release by the calling party or the last party, the connector 143 removes holding ground potential from the sleeve conductor of the extended connection, thereby permitting the circuit components 140, 141, 142, 143, and 144 to be restored to a normal condition.

*Operation of the system to collect and store items of information pertaining to toll calls*

A call to a remote exchange, such as an exchange located in the Cleveland area, which is to be automatically ticketed by the system of the present invention, is initiated at the substation A in the same manner described above in conjunction with a local call by the subscriber removing the handset from the cradle thus closing the cradle switch and extending the calling line loop to the line circuit 140. Thereafter, the allotter 145 is operated to cause the extension of the calling line loop through the finder 141 to the selector 142.

The first digit to be dialed by the calling subscriber in extending a toll call to a remote area or exchange is an access digit by which the selector 142 is operated to select a bank contact level in which are terminated trunk circuits extending to the desired area. Assuming that the call is to be extended from the substation A in the Hudson office to a substation C located in an exchange in the Cleveland area, an access digit "9" is dialed. The selector 142, in responding to these impulses, positions its wipers opposite the ninth level of bank contacts in which are terminated the seizure trunks extending to the trunk circuits which terminate the interoffice trunks extending to the Cleveland area. During the interdigit pause separating the first and second digits, the selector 142 automatically moves its wipers across the bank contacts of the selected level in order successively to test the trunk circuits to determine the idle or busy condition thereof and switches through to the first trunk circuit, such as a trunk circuit 126, which tests idle.

In seizing the idle trunk circuit 126 which terminates an interoffice trunk extending to remote switching equipment 138 located in the Cleveland area, the selector 142 switches the calling loop circuit through to the trunk circuit 126 and thus conditions this circuit for receiving the next dialed digit.

The next or party digit, which is dialed by the subscriber at the substation A, is the first entry recorded in a trunk recorder 127 individually associated with the trunk circuit 126 and is not utilized for extending the connection to the called substation C. This digit has significance only in determining the directory number of a calling subscriber on a multiparty line but, since it is desirable to provide an identical number of units of information in the trunk recorder 127 in conjunction with all toll calls, even private line subscribers are required to dial the party digit which has no significance insofar as both the toll tickets for these subscribers and the extension of the connections are concerned.

In the event that the calling substation is provided with a conventional dialing device and is on a line having multiparty service provided on a terminal per line basis, the party digit which is dialed corresponds to the units or ringing digit of the calling subscriber directory number. This party digit is stored in the trunk recorder 127 and is utilized in preparing the toll ticket inasmuch as the value of this digit indicates the position of the substation on the line and forms the units digit of the calling line identification. However, as set forth above, this digit is not utilized in controlling the extension of the connection.

If the calling substation is provided with a conventional dialing device and is on a line having multiparty service provided on a terminal per station basis, the assigned party digit does not form a part of the directory number of the calling subscriber but is utilized in the automatic identification equipment to aid in determining the entire directory number of the calling substation.

In addition, if the calling substation is provided with a modified dialing device of the type shown in either Morris Patent No. 2,691,070 or MacCheyne Patent No. 2,691,071 and is on a terminal per station multiparty line, the dialed party digit has an arbitrary value and is provided merely to insure a uniform number of items of information for calls placed from different types of substations. In modified dialing devices of the above type, additional contacts are provided which are selectively controlled during windup operations to transmit ground impulses to control the operation of the trunk circuit 126 during successive dialing operations, thereby to automatically provide an indication of the position of the calling subscriber on a multiparty line.

Returning now to the general operation of the system, following the dialing of the access digit or digits, the calling line loop circuit is extended to the trunk circuit 126 to prepare a circuit for operating a stepping switch therein in accordance with the value of the party digit, to perform a test to determine if the calling substation is provided with a conventional or a modified dialing device, and to prepare a circuit for recording dialed digits in a magnetic trunk recorder 127 individual to the seized trunk circuit 126. The construction and operation of the trunk recorder 127 is fully disclosed in the copending application of Howard S. Gleason, Serial No. 378,209, filed September 3, 1953. As set forth therein, the trunk recorder 127 comprises an endless loop of magnetic tape having mark and space pulse transducing heads disposed adjacent laterally spaced contiguous areas of the magnetic tape, thereby to provide two effective channels on the magnetic tape for receiving mark and space pulse information. The value of the digital information is recorded on the magnetic tape by providing a number of mark pulses on one of the channels of the tape which is representative thereof, and successive items of digital information are separated from each other by the interposition of a single space pulse in the other channel thereof. During recording operations, the magnetic tape is advanced step-by-step following the recording of each discrete pulse thereon.

Accordingly, the dialing of the assigned party digit by the subscriber at the calling substation A causes the trunk circuit 126 to provide a number of separate mark pulses on the magnetic tape in the trunk recorder 127 which is equal to the value of the party digit, and, thereafter, the trunk circuit 126 provides a space pulse in the space pulse channel thereof to separate the first item of information from successive items of information which are to be stored thereon. As set forth above, if the calling subscriber is on a private line, the party digit does not have any significance insofar as the identification of the calling party is concerned and, accordingly, may have any arbitrary value. The same is true if the calling substation includes a conventional or a modified dailing device and is on a line on which service is provided on a terminal per station basis. However, if the calling substation is on a line on which service is provided on a terminal per line basis, the number of pulses recorded in the magnetic trunk recorder 127 determines the value of the party or units digit of the calling subscriber directory number and is of significance in preparing a toll ticket. Accordingly, at this time the value of the dialed party digit which determines the units digit of the directory number of terminal per line subscribers is stored in the trunk recorder 127.

As indicated above, in addition to storing the party digit in the trunk recorder 127, the dialing of the party digit operates a stepping switch in the trunk circuit 126 to a position representing the value of the party digit. The wipers controlled by the stepping switch are selectively interconnected with a plurality of dialed party digit register relays so that the setting of the stepping switch selectively operates one or more of the dialed party digit register relays as an indication of the value of the dialed party digit. Since the value of the units digit of terminal per line multiparty subscribers is determined by the value of the party digit stored in the trunk recorder 127, the selective operation of the dialed party register relays on calls placed from terminal per line substations is not of any significance. However, with respect to substations on terminal per station multiparty lines in which the substation is provided with a conventional dialing device, the value of the dialed party digit, as determined by the selective operation of the dialed party register relays, partially controls the operation of the calling line identification equipment to determine the directory number of this type of subscriber. If the terminal per station multiparty subscribers are provided with modified dialing devices, the selective operation of the dialed party digit register relays is of no significance, and, as set forth above, the dialed party digit may have any arbitrary value.

The calling subscriber next dials the digits required to extend the connection to the called substation C which may comprise the seven digits forming a conventional 2–5 dialing code, i.e. three office code digits and four station number digits. The value of each of the dialed digits is directly recorded on the magnetic tape of the trunk recorder 127 in the form of seven groups of mark pulses, each including a number of pulses equal to the value of the digit in which the groups of mark pulses are separated by intervening space pulses. The stepping switch in the trunk circuit 126 is operated during the interdigit pauses separating the seven digits dialed to extend the connection to the called substation C, thereby to count the number of digits dialed. Following the counting of a selected number of digits, i.e. seven, the trunk circuit 126 prevents the recording of any additional digits on the tape of the trunk recorder 127.

As described above, when the calling loop circuit is extended to the trunk circuit 126, a test is made to determine the type of the dialing device provided at the calling substation, thereby to condition the trunk circuit 126 for different calling party identification operations. In the event that the calling substation A is provided with a modified dialing device of the type referred to above, grounded battery is applied to the trunk circuit 126 over the HS lead of the extended switch train to cause the operation of a relay in the trunk circuit 126 which conditions this circuit to count the party identification pulses automatically transmitted during the above described dialing of the conventional 2–5 dialing code. More particularly, the operation of this relay conditions a plurality of party identification relays in the trunk circuit 126 for sequential operation under the control of a party relay which is bridged across the tip and ring conductors of the extended calling loop circuit. The pulses transmitted during successive windup operations of the modified dialing device at the calling substation A intermittently operate the party relay so that after a selected number of dialing operations sufficient to provide a calling party identification, i.e. four dialing operations, a selected one of the counting relays is operated as an indication of the position of the calling substation on a multiparty line.

The stepping switch which, as described above, is successively advanced during the interdigit pauses separating the digits dialed to extend the connection to the called subscriber includes a wiper which, upon being advanced four steps, renders the party identification relays ineffective so that only the selected number of dialing operations are effective to control the setting of these relays. The pulses provided by the modified dialing device at the calling substation are only effective to control the operation of the party relay which is bridged across the tip and ring conductors and, accordingly, are not recorded on the magnetic tape of the trunk recorder 127. Accordingly, at the completion of the dialing of four of the seven digits required to extend the connection to the called subscriber, an identification of the position of the calling party on a multiparty line provided with modified dialing devices is provided by the selectively operated party identification relays in the trunk circuit 126.

Following the extension of the connection through the equipment 138 in response to the seven dialed digits, as described above, if the line of the called substation is engaged in a call or otherwise busy, busy tone is returned over the calling loop circuit to the substation A and the connection is released. However, if the called line circuit is idle and is seized, a supervisory relay in the trunk circuit 126 operates in response to the receipt of answer supervisory signals to initiate rotation of a timer cam individual to the circuit 126 to reset the stepping switch, and to connect the motor magnet thereof to a source of sixty i.p.m. signals so that the wipers thereof are stepped over the contacts associated therewith at one second intervals. Following a predetermined grace period during which the calling subscriber may release the connection without being charged for a toll call, a wiper of the stepping switch moves into engagement with a contact which is selectively strapped to the operating winding of an additional supervisory relay, thereby causing the operation of this relay.

The operation of the supervisory-assist relay associates the trunk circuit 126 and the trunk recorder 127 with a clock and calendar circuit 133, which is common to the plurality of trunk circuits located in the Hudson office. In the event that the clock and calendar circuit 133 is busy, the trunk circuit 126 holds until such time as the clock and calendar circuit is released and, following the release thereof, seizes this circuit so that a steering relay chain and a counting relay chain in the clock and calendar circuit 133 are rendered effective to sequentially transmit seven groups of mark pulses separated by space pulses to the trunk recorder 127 which represent the date and time at which the call is filed.

The clock and calendar circuit 133 includes separate units minutes, tens minutes, hours, day of week, date, and month register switches, all of which are sequentially operated under the control of one per minute impulses delivered from a timer cam and pulsing contact arrangement. In this manner the wipers of the plurality of stepping switches are continuously adjusted to marking positions representing the values of the tens and units minutes digits, the tens and units hours digits, the tens and units days digits, and a digital designation representing the month of the year. In order to distinguish calls placed during business hours from those placed during evening hours or on holidays, the circuit 133 increases the value of the tens hours digit which forms a portion of a twenty-four hour notation, i.e. "01" to "24," by an increment of "2" during business hours. In addition, the clock and calendar circuit 133 includes a calendar guard relay which prevents the seizure of the circuit 133 during either a manually initiated lamp display operation in which the settings of the circuit as visually checked or when the register switches are being advanced from a higher value digital registration to a lower value digital registration. The circuit associated with the calendar guard relay effectively stores an impulse which may be received from the cam controlled contacts during the guarded interval and subsequently utilizes this stored impulse to advance the register switches to a correct setting following the termination of either the display operation or a readout operation during which the circuit 133 transmits information to the trunk recorder.

In order to provide the series of mark and space pulses for transmission to the trunk recorder 127, the counting relay chain and the steering relay chain are provided, both of which are driven by an independent transistorized pulse generator. The steering relay chain renders the wipers associated with the plurality of register switches effective in a predetermined sequence to control different cyclic counting operations of the counting relay chain during which the mark and space impulses representing date and time information are transmitted to the trunk recorder 127.

Following the completion of the transmission of the date and time information to the trunk recorder 127, ground is applied from the trunk circuit 126 over a common allotter start lead extending to an identifier sender allotter circuit 129. The allotter circuit 129 is associated with a plurality of independent identifier sender-trunk finders, such as the elements 131 and 132, and, in response to the receipt of start ground on the allotter start lead, associates an idle one of the identifier senders, such as the identifier sender 131, with the trunk circuit by operating a trunk finder switch 131a to search for and seize the trunk circuit 126. In addition, the identifier sender allotter circuit 129 causes the operation of a cut-through relay individual to the seized identifier sender 131 to interconnect this circuit with an identifier circuit 130 which is common to all of the identifier sender-trunk finders.

Following the association of the seized identifier sender 131 with both the trunk circuit 126 and the identifier circuit 130, the allotter 129 operates an identification relay in the trunk circuit 126 to apply an identification tone back over the HS lead of the extended switch train to a terminal or lead individual to the calling line circuit. This lead or terminal is selectively interconnected with an identification matrix 128 in accordance with the digits forming the directory number of the calling substation.

The identification matrix 128 comprises ten individual party matrices and a terminal per line matrix. Each of the individual matrices comprises ten thousands, hundreds, tens, and units busses which are selectively interconnected with each of the individual line circuits through a plurality of resistors to provide passive element matrices. In response to the application of the alternating current identification potential to the HS terminal or lead individual to the calling line circuit 120, a voltage is applied over one each of the thousands hundreds, tens, and units conductors in accordance with the values of the digits forming the directory number of the calling subscriber.

If the calling substation is located on a line on which party service is provided on a terminal per station basis, the HS terminals of the calling line circuit are connected to one or more of the individual party matrices in accordance with the different directory numbers of the stations on the line. The connections to the busses in each of the party matrices is determined by the values of the four digits forming the directory numbers of the substations on the line.

If the calling substation is on a line on which multiparty service is provided on a terminal per line basis, the HS terminal of the calling line circuit is connected to the busses in the terminal per line matrix in accordance with the values of the common thousands, hundreds, and tens digits of the directory number of the substation. The value of the units digit is determined by the value of the party digit dialed by the subscriber and which is recorded on the tape of the trunk recorder 127 and, accordingly, the units resistor of the four element cluster individual to a multiparty terminal per line line circuit is connected to any arbitrary bus but preferably one representing a low value digit in order to reduce the number of the mark pulses which are subsequently stored in the trunk recorder and, accordingly, to reduce the length of the magnetic tape which is required to store this digit.

If the calling substation is located on a private line, the HS terminal of the line circuit is connected to a four element cluster in the terminal per line matrix so that single thousands, hundreds, tens, and units busses are energized in accordance with the values of the four digits forming the directory number of the calling substation.

As indicated above, a relay in the trunk circuit 126 is selectively operated upon extension of the calling line loop to this circuit to condition a counting relay chain therein for operation in accordance with station or party identification impulses transmitted by a substation having a modified dialing device. This relay is operated by a signal which is applied to the HS lead of the extended switch train by the identification matrix 128. More specifically, the HS terminals of calling line circuits having conventional dialing devices associated therewith are connected through resistors to ground in the matrix 128. On the other hand, grounded battery is connected to the HS terminals of the line circuits having modified dialing devices associated therewith. By this means, the trunk circuit 126 is provided with information indicating the type of the dialing device which is provided at the calling substation and, accordingly, conditions the trunk circuit 126 for different types of party identification operation.

Accordingly, the application of the alternating current identification potential to the HS terminal individual to the calling line circuit 140 causes the selective energization of single thousands, hundreds, tens, and units busses in accordance with the values of the digits forming the directory number of the calling substation. The common busses in the separate party matrices extend to the contacts of individually associated party matrix selection relays, and the busses in the terminal per line matrix extend directly to the input of the identifier circuit 130. Therefore, if the calling substation is located on a private line or on a line on which multiparty service is provided on a terminal per line basis, the input of the identifier circuit 130 is directly energized from the terminal per line matrix when the tone is applied thereto.

On the other hand, if the calling substation is provided with either a conventional or a modified dialing device and is on a multiparty line on which service is provided on a terminal per station basis, the selectively energized thousands, hundreds, tens, and units busses in the individual party matrices corresponding to the parties on the calling line are terminated in the contacts of the matrix selection relays individually associated therewith. One of the party matrix selection relays is selectively operated under the control of either the party digit register relays or the party identification relays in the trunk circuit 126. Therefore, since only a single one of the matrix selection relays is operated, only the energized busses in the selected party matrix are extended to the input of the identifier circuit 130. It should be noted that the dialing of an arbitrary digit by the calling subscriber when the calling substation is located on either a private line or a multi-party line on which service is provided on a terminal per line basis causes the operation of a matrix selection relay during an identification operation, but this does not provide false identifications at the input of the identifier circuit 130 inasmuch as the HS terminals of line circuits having these types of service are not connected to any of the party matrices but are connected only to the terminal per line matrix. Accordingly, the selective operation of a party matrix selection relay does not interconnect energized digit marking leads to the input of the identifier circuit 130 during the identification of other than terminal per station substations.

The identifier circuit 130 comprises four groups of ten amplifiers having thyratron tubes associated with the outputs thereof. Therefore, when the identifier circuit 130 is energized by the signals supplied over the common thousands, hundreds, tens, and units leads, a single digit manifesting thyratron tube is fired in each of the thousands, hundreds, tens, and units denominational groups of tubes, thereby causing the operation of correspondingly designated relays in the seized identifier sender circuit 131. Since the operation of these relays completes the determination of the calling line directory number, the operated identifier sender 131 signals the allotter circuit 129 to release both the common identifier circuit 130 and the identification matrix 128 so that these components are free to be associated with another identifier sender, such as the element 132, without waiting for the operated identifier sender 131 to complete the transmission of the information stored therein to the trunk recorder 127.

The identifier sender 131 includes four groups of ten register sender relays which are operated, as set forth above, to store the values of the four digits comprising the directory number of the calling subscriber. In addition to registering the values of these digits, the four groups of relays in the identifier sender provide pulsing or sending means for transmitting groups of mark pulses to the trunk recorder 127 of the seized trunk circuit 126 in accordance with the values of these stored digits. The identifier sender 131 includes a group of steering relays which sequentially permit each of the groups of relays to sequentialy restore and, in doing so, to transmit four groups of mark pulses to the trunk recorder 127 with space pulses interposed therebetween. Following the transmission of the mark pulses representing the thousands, hundreds, tens, and units digits of the directory number of the calling substation, the identifier sender-trunk finder 131 is released and disconnected from the trunk circuit 126.

In the event that an adequate calling subscriber identification is not transmitted to the identifier sender 131 during a calling line identification operation, a no-identification relay in the trunk circuit 126 is operated to cause group busy tone to be applied to the tip and ring conductors of the extended connection and to also cause the trunk circuit 126 to apply an end-of-call or COE signal comprising simultaneous mark and space impulses to the magnetic tape of the trunk recorder 127. The operation of the no-identification relay also releases the extended connection, and, accordingly, the subscriber must reinitiate the call, thereby preventing the establishment of calls which must be ticketed without the provision of adequate identification information on the tape of the trunk recorder 127.

Referring back to the operation of the trunk circuit 126, the operation of the supervisory and supervisory-assist relays therein, which initiate the storage of date and time and calling line identification information in the recorder 127, also operates the timer clutch forming a portion of a timing mechanism individual to the trunk circuit 126. This timer mechanism, which is fully disclosed in the copending application of Armistead Wharton, Serial No. 430,548, filed May 18, 1954, now Patent No. 2,814,683, comprises pulsing contacts which are selectively controlled by a cam of a predetermined configuration which provides a mark pulse after a time interval of slightly more than one minute and subsequent mark pulses occurring at one minute intervals. The increased length of the original pulse provided by the individual trunk timer in the trunk circuit 126 provides a grace period corresponding to the inherent release or disconnect time of the extended switch train to prevent charging a subscriber for the time elapsed between the termination of the call by the subscriber and the completion of the release of the equipment to interrupt the storing of duration impulses in the trunk recorder.

These one minute duration impulses are applied to the trunk recorder 127 until such time as supervisory signals are received by the trunk circuit 126 indicating that the connection has been terminated. At this time the trunk circuit 126 transmits a space signal and a COE signal to the trunk recorder 127 which are recorded on the magnetic tape. Following the recording of the COE signal, the trunk circuit 126 applies a series of advance pulses to the trunk recorder 127 to provide a short tape runout, thereby to physically separate the data relating to successive calls on the tape. The termination of the call releases the switching equipment including the finder 141 and the selector 142, and also releases the trunk circuit 126 to permit this equipment to be seized for use in extending and completing additional toll calls.

At the time the trunk circuit 126 is released, the magnetic tape in the trunk recorder 127 has the following items of information recorded thereon in the form of groups of mark pulses separated from each other by space pulses:

(1) A dialed party digit.
(2) The directory number of the called subscriber.
(3) The date and time of placing the toll call in the following order:
  (a) Tens and units digits of the months designation as one group of mark pulses.
  (b) Tens and units days.
  (c) Tens and units hours.
  (d) Tens and units minutes.
(4) The directory number of the calling subscriber.
(5) The duration of the toll call in the form of a single group of mark pulses each representing a one minute interval.
(6) A COE signal representing the end of the items of information pertaining to a single toll call and comprising simultaneous mark and space pulses.

Obviously, the above information representing the items pertaining to only a single toll call can be endlessly repeated on the magnetic tape of the trunk recorder 127 within the recording capacity thereof in response to additional seizures of the trunk circuit 126.

In the event that a connection is to be extended to a substation D located in the Akron area, the subscriber initiates the call, as described above, to cause the line finder 141 to seize the calling line circuit 140 and to condition the selector 142 for operation. Assuming that, in order to reach the remote switching equipment 137 located in the Akron area, it is necessary to dial two access digits, i.e. "18." The first digit "1" dialed by the subscriber causes the wipers of the selector 142 to advance to the first level and, during the interdigit pause, to search over the first level of contacts to seize an idle selector, such as a selector 146. The calling subscriber then dials the second access digit "8" in response to the impulses of which the selector 146 advances its wipers to the eighth level of contacts. In the interdigit pause following the second dialed digit, the wipers in the selctor 146 automatically test over the contacts in the eighth level to seize an idle trunk circuit, such as a trunk circuit 135, which terminates an interoffice trunk extending to the remote switching equipment 137 located in the Akron area and which has access to the line circuit of the called substation D. Incident to seizure of the trunk circuit 135, the calling loop is extended from the line circuit 140 to the trunk circuit 135 having individually associated therewith a magnetic trunk recorder 136.

Following the seizure of the trunk circuit 135, the subscriber at the substation A dials the conventional 2–5 dialing code to extend the connection through the remote switching equipment 137 to the called substation D. The trunk circuit 135 then controls the transmission of the items of information pertaining to the call to the trunk recorder 136, which items are established under the control of the clock and calendar circuit 133, the identification matrix 128, the identifier circuit 130, the identifier senders 131 and 132, and the identifier sender allotter 129, as set forth above.

Referring now to the remote Russell office shown schematically in FIG. 2 of the drawings, therein is located common information collecting and registering equipment 245 which is similar to that located in the Hudson office. More specifically, this common equipment includes an identifier circuit, a group of identifier sender-trunk finders, an identification matrix, an identifier sender allotter, a plurality of trunk circuits and associated trunk recorders, all of which operate in the manner set forth above in conjunction with the description of the similarly designated units of equipment in the Hudson office. The automatic dial equipment provided in the Russell office has access to interoffice trunks through these trunk circuits so that, in extending a call which is to be automatically ticketed, the same items of information are provided in the trunk recorders located in the Russell office as are provided in the trunk recorders 127 and 136 located in the Hudson office. Each of the trunk recorders is capable of storing items of information pertaining to a plurality of calls.

*Operation of the systems to record the stored information*

In order to provide a permanent record of the items of information stored in the Hudson and Russell offices, a common recording equipment (FIG. 2) is provided which may be located in the Hudson office. This common equipment sequentially seizes each of the individual trunk recorders such as the recorders 127 and 136 located in the Hudson office and causes the transmission of the registered information stored therein to control the operation of a recorder 220 which provides either a printed or a perforated record, each individual record containing the items of information pertaining to a single toll call. This recording equipment is also rendered effective over a carrier link extending to the Russell office to cause the transmission of the information stored in the remotely located trunk recorders in the Russell office to the Hudson office wherein individual records including the items of information stored in the trunk recorders in the Russell office are provided.

More specifically, in normal operation, a readout control circuit 210 is placed in operation under the control of a start ground signal provided by the clock and calendar circuit 133 over a start conductor 161 at a selected time, preferably in the early hours of the morning when traffic is at its lowest level. The application of start ground to the readout control circuit 210 initiates operation of a stepping switch 210a associated therewith to advance over a plurality of contacts associated therewith to which are connected a plurality of contacts associated therewith to which are connected a plurality of playback control circuits, such as the playback control circuit 200. Each of the playback control circuits has access to a plurality of trunk recorders, so that, in response to seizure of the playback control circuit 200, a stepping switch 200a is operated to search for and seize in sequence the plurality of trunk recorders to which it has access, including the recorders 127 and 136. In response to the seizure of the trunk recorder 127, the readout control circuit 210 causes a plurality of register circuits 240, 250, 260, 280, and 290, and a charge computer 270 to be reset to a normal condition to prevent an incorrect storage of information due to spurious operation of the registers by the transient voltages due to the switching operations during which the trunk recorder 127 is seized.

In addition, the playback control circuit 200, in seizing the trunk recorder 127, completes a path from the transducing heads in the trunk recorder 127 through amplifying means in the playback control circuit 200 and the readout control circuit 210 to a common mark pulse conductor 211 and a space pulse conductor 212, which latter conductor extends to a steering circuit 230. Further, as an incident to seizure, a clutch magnet in the trunk recorder 127 is energized to rapidly advance the magnetic tape therein past the transducing heads to generate mark and space pulses, and an erase head also forming a part of the trunk recorder 127 is energized to erase the magnetic tape as the stored mark and space pulse information is transmitted.

The steering circuit 230, which is energized by the space pulses applied to the conductor 212, comprises a gaseous tube counting chain which is advanced step-by-step in response to the receipt of each space pulse. Each of the tubes forming the steering chain is connected through a steering cable 231 to the input or drive tube in each of the plurality of digit registers in each of the following register groups:

(1) A clock and calendar register circuit 280;
(2) A calling station number register circuit 260;
(3) A called station number register circuit 250;
(4) A called office register circuit 290; and
(5) An elapsed time register circuit 240.

Since the items of information stored on the magnetic tape in the trunk recorder 127 are transmitted therefrom in the same order that they are recorded on this tape during an information collecting and registering operation, the interconnections between the steering circuit 230 and the plurality of register circuits are such that the groups of mark pulses representing the items of information are sequentially applied to the correct ones of the electronic registers. Accordingly, the steering circuit 230 causes the items of information pertaining to a single toll call to be sequentially applied to the corresponding register circuits provided therefor in the recording equipment.

Each of the register circuits, such as the clock and calendar register circuit 280, comprises a plurality of gaseous tube counting chains which are operated step-by-step in accordance with the number of mark pulses applied thereto. Since the number of mark pulses represents the value of the digit to be stored, the on condition of a selected tube in each of the digit counting chains represents the value of the digits stored on the magnetic tape of the seized trunk recorder 127.

Since the first item of information stored in conjunction with each toll call is the dialed units or party digit, this item is the first item to be stored in the electronic registers associated with the recording equipment located in the Hudson office. Accordingly, the input of the dialed party digit counting chain in the calling station number register circuit 260 is rendered effective by the steering circuit 230 to receive the first group of mark pulses representing the value of the dialed digit which, as set forth above, may either have an arbitrary value or may have a value representing the units digit of the directory number of a calling subscriber on a multiparty line on which multiparty service is provided on a terminal per line basis.

Following the storage of this item of information, the next three space pulses received by the steering circuit 230 sequentially render the inputs to three called office code digit counting chains forming the called office register circuit 290 responsive to the mark pulses on the common conductor 211. Accordingly, the next three groups of mark pulses operate the three sequentially conditioned digit counting chains in the called office register circuits so that the three dialed digits representing the designation of the called office are stored in the called office register circuit 290.

Since the digits identifying the called office are normally expressed as two alphabetical characters and a single numerical character, an office code interpreter circuit 295 is provided which is connected to the anode circuits of the tubes forming the counting chains in the called office register circuit 290. Following the storage of the three called office code digits, the readout control circuit 210 causes the office code interpreter circuit 295 to translate the digital information in the called office register circuit 290 into marking conditions representing two alphabetical characters and a single numerical character, which information is subsequently utilized to provide a permanent printed or perforated record of the called office designation. In addition, a portion of the information provided by the translation of the called office code digits by the office code interpreter 295 is applied to a rate and route marking circuit 275 to establish one portion of the information needed for establishing the rate at which the monetary charge is to be established for the call.

The rate and route marking circuit 275 is also provided, by either the playback control circuit 200 or by the readout control circuit 210, with an item of information designating the office in which the calling subscriber is located. This information is utilized by the rate and route marking circuit 275 in conjunction with the information relating to the called office provided by the office code interpreter circuit 295 to establish a rate structure which is transmitted to the cost computer 270 for use therein in establishing the monetary charge to be assessed for the toll call. In addition, the rate and route marking circuit 275 utilizes the information relating to the calling office to provide information relating to the calling office to provide information pertaining to the alphabetical and numerical designation of the calling office to the calling station number register circuit 260 so as to provide marking condition therein representing the two alphabetical characters and the single numerical character forming the designation of the calling office.

More specifically, the rate and route marking circuit is provided with information relating to the designation of local calling offices by the playback control circuit 200. When the stepping switch 200a associated with the playback control circuit 200 seizes a trunk recorder, such as the trunk recorder 127, this switch marks a contact similar to the contact connected to the conductor 201 which extends to the rate and route marking circuit 275. The marking condition on the conductor 201 is representative of the calling office inasmuch as each trunk recorder and its associated trunk circuit are used in extending calls from only a single office or exchange, such as the Hudson office. Accordingly, the seizure of the trunk recorder 127 by the playback control circuit 200 provides a marking condition on the conductor 201 indicating to the rate and route marking circuit 275 that the calling station is located in a particular office. In a similar manner, when the playback control circuit 200 seizes the trunk circuit 135 and its associated trunk recorder 136 for a playback operation, a marking condition is established on a conductor 202 which indicates to the rate and route marking circuit 275 that the calling subscriber is located within a designated office.

Simultaneously with the operation of the office code interpreter circuit 295 and the rate and route marking circuit 275, the steering circuit 230 sequentially renders a thousands digit counting chain, a hundreds digit counting chain, a tens digit counting chain, and a units digit counting chain forming the called station number register circuit 250 effective so that the next four groups of mark pulses transmitted from the seized trunk recorder 127 selectively operate these counting chains to manifest the values of the thousands, hundreds, tens and units digits forming the directory number of the called substation.

Thereafter, the steering circuit 230 sequentially renders a months counting ring and chain, a tens days counting chain, a units days counting chain, a tens hours counting chain, a units hours counting chain, a tens minutes counting chain, and a units minutes counting chain sequentially effective to receive the next seven groups of mark pulses transmitted from the seized trunk recorder 127 so that tubes are selectively fired in the clock and calendar register circuit 280 to manifest the values of the digits forming the date and time information.

The steering circuit 230 nest renders the elapsed time register circuit 240 effective, which circuit comprises a units minutes counting ring and a tens minutes counting chain. Accordingly, the series of mark pulses representing one minute intervals of elapsed time in the length of time that the connection was established are applied to the elapsed time register circuit 240 and are counted therein to provide an indication of the length of the toll call.

Simultaneously therewith, the mark pulses are transmitted from the elapsed time register circuit 240 to the cost computer 270. The cost computer 270 comprises a base time counting chain, a pair of binary counting stages forming a nickles or five cents counting arrangement, a ten cents or dimes counting chain, and a dollars counting chain. As set forth above, the rate and route marking circuit 275 provides the cost computer 270 with the rate structure at which the charge to be assessed for the call is to be established. This rate structure includes a minimum base time period for which a minimum charge is made, and the rate and route marking circuit 275 causes the counting means in the charge computer 270 to be primed with the predetermined minimum base charge which is to be charged for the base time interval. The rate structure also includes an overtime charge whereby a selected increment of cost is added to the basic charge for various overtime intervals.

In operation, the duration impulses supplied from the elapsed time register circuit 240 are applied to the base time counting chain so that, following the predetermined time established by the rate structure for which the minimum charge has been established, the duration impulses are applied directly to the counting chain so that these counting chains are sequentially operated in steps of varying monetary value to vary the basic charge in accordance with the length of the overtime interval to provide thereby a monetary charge which is to be assessed for the toll call, this charge being manifested by a plurality of selectively fired tubes.

Following the transmission of the elapsed time or duration information from the seized trunk recorder 127, a COE signal comprising simultaneous mark and space pulses is transmitted to the readout control circuit 210. The receipt of this signal causes the operation of a COE relay to arrest movement of the magnet tape in the trunk recorder 127, thereby to terminate the transmission of mark and space information from the trunk recorder 127 to the recording apparatus. In addition, the receipt of a COE signal together with the preceding operation of a call-complete relay, which indicates that the necessary amount of information has been received by the plurality of electronic registers, causes the operation of a plurality of prepare-to-read relays, the operation of these relays conditioning the plurality of tube registers for controlling the operation of the recorder 220.

In order to sequentially apply the stored items of information to the recorder 220, a readout relay counting chain is provided. The contacts of the counting chain relays sequentially interconnect the anode circuits of the tube registers with a common readout cable extending to a plurality of readout relays in the readout control circuit 210, which relays directly control the selective operation of permutation means for controlling the operation of either a conventional perforator or an automatic typewriter or printer. Therefore, as the readout relay chain is sequentially advanced, the various items of information forming a toll ticket are transmitted to the recorder 220 in accordance with the step-by-step operation of the relays forming the chain. Some of the relays do not include contacts which are interposed in the anode circuits of the tubes in the registers but include contacts which are selectively closed to ground combinations of conductors extending to the readout control circuit 210 which represent either control operations such as a carriage return or punctuation characters which are interposed between the various items of numerical and alphabetical information.

When the readout relay chain has reached the end of its cycle of operation, a plurality of relays are operated to cause successive carriage return operations of the recorder 220, thereby to space out the end of the paper web. Concurrently therewith, a reset relay in the readout control circuit 210 is operated to remove the registered items of information from the gaseous tube counting chains and rings forming the electronic register circuits. When the last relay in the counting chain is operated, a severing or cutting solenoid is energized, thereby to cause ticket severing means associated with the recorder to sever the spaced out end of the web to form a discrete ticket which is displaced by ejecting means into a receptacle adapted to receive a plurality of such tickets. The severing and ejecting means may be of the types disclosed in the copending applications of Howard S. Gleason, Serial No. 397,185, filed December 9, 1953, and of Armistead Wharton and Richard Dever, Serial No. 532,072, filed September 1, 1955, now Patent No. 2,780,288, both of which copending applications are assigned to the same assignee as the present application. Concurrently with the severing of the ticket and the resetting of the gaseous tube registers, movement of the magnetic tape in the seized trunk recorder 127 is reinitiated so that mark and space pulses are again transmitted to the electronic register circuits under the control of the steering circuit 230 to provide stored items of information for controlling the next cycle of operation of the recorder 220.

In this manner, all of the items of information relating to the toll calls recorded on the tape of the trunk recorder 127 are played back to the common recording apparatus in the Hudson office to cause the production of a plurality of discrete permanent records, each containing the items of information pertaining to a single toll call. However, in the event that any of the calls relate to incomplete calls concerning which inadequate information is stored in the gaseous tube registers, the readout control circuit 210 is provided with means for clearing the registers without causing the operation of the recorder 220.

Following playback of all of the items of information stored on the tape of the seized recorder 127, the seized playback control circuit 200 is rendered effective to sequentially seize the remaining trunk recorders, such as the trunk recorder 136, so that the items of information stored therein are recorded on permanent records under the control of the readout control circuit 210. Thereafter, following a time interval during which information is not transmitted to the readout control circuit, time responsive means therein operate to cause the stepping switch 210a to seize the next idle playback control circuit, similar to the playback control circuit 200. Thereafter, this seized playback control circuit causes the transmission of the items of information stored in the plurality of trunk recorders to which it has access, the tape in each recorder being erased following the transmission of the items of information to the recording apparatus.

In order to transmit the items of information stored in the collecting equipment 245 located in the remote Russell office, the stepping switch 210a seizes local carrier equipment 215. This equipment provides a seizure signal which is transmitted over an intervening link, such as a telephone line, to remote carrier equipment 225, which seizes the playback control circuit 235. More particularly, the local carrier equipment 215 includes an erase modulator, a clutch modulator, a local hold demodulator, a space pulse demodulator, an alarm demodulator, and a mark pulse demodulator which are coupled to the carrier link through band pass filters, there being four frequencies assigned for transmitting mark, space, clutch, and erase information between the Hudson and Russell offices. The four frequencies are selected in the audio frequency range so that they are satisfactorily transmitted over a telephone line between the Hudson and Russell offices without excessive attenuation and phase shift. Further the frequencies are so allocated in the frequency spectrum which is efficiently transmitted by a telephone line so as to leave a portion of the frequency spectrum available for use in transmitting conventional telephone signals over the line. Therefore, the conventional telephone equipment located in the Hudson and Russell offices is coupled to the line by a low pass filter which isolates the telephone signals from the carrier signals.

The Russell office is provided with a mark modulator, a space modulator, a clutch demodulator, and an erase demodulator. The mark and space modulators in the Russell office, following the seizure of a trunk recorder in the information collecting and storing equipment 245 by the playback control circuit 235, provide mark and space pulse modulated carrier signals which are demodulated by the space and mark pulse demodulators in the local carrier equipment 215 at the Hudson office, these demodulators providing mark and space pulses which control the operation of the steering circuit 230 and the electronic registers in the same manner as the mark and space pulses provided by the local trunk recorders 127 and 136. The clutch modulator in the local carrier equipment 215 is intermittently operated by the readout control circuit 210 to control the movement of the magnetic tape in the seized trunk recorder in the Russell office by transmitting a clutch carrier or tone signal to the remote carrier equipment 225 wherein it is demodulated by the clutch signal demodulator. The erase modulator in the local carrier equipment 215 transmits an erase carrier signal over the carrier link to cause the erase head associated with the seized trunk recorder to be selectively energized under the control of the erase demodulator to remove the transmitted information from the magnetic tape of the seized trunk recorder.

Following the playback of a seized trunk recorder in the equipment 245 in the Russell office, the remote playback control circuit 235 sequentially seizes the remaining trunk recorders located in the Russell office to cause the transmission of the stored information to the recorder 220 in the Hudson office. Following the playback of all of the items of information stored in the trunk recorders in the Russell office, the remote playback control circuit 235 is released by the readout control circuit 210, and the operation of the remote and local carrier equipment 225 and 215 is terminated.

As indicated above, the readout control circuit 210 provides the rate and route marking circuit 275 with information relating to the office in which the calling subscriber is located. More specifically, when the stepping switch 210a associated with the readout control circuit 210 is moved into engagement with the contacts to which is connected the local carrier equipment 215, an additional wiper of the stepping switch marks a conductor 213 which extends to the rate and route marking circuit 275. Since all of the information transmitted from the Russell office relates to toll calls placed from the remote Russell office, movement of the switch 210a into a position in which the local carrier equipment 215 is seized indicates to the rate and route circuit 275, by means of the conductor 213, that all of the data next to be stored in the electronic registers relates to calls placed from the Russell office. This information, as set forth above, is utilized not only to provide a portion of the rate structure which is supplied to the charge computer 270 but is also utilized to provide calling office designation information to the calling station number register circuit 260.

Following the playback of all of the stored items of information in both the Hudson and the Russell offices, operation of the readout control circuit 210 is terminated until such time as it is next initiated under the control of the clock and calendar circuit 133.

In order to prevent a trunk recorder, such as the recorder 127, from holding its associated trunk circuit, such as the circuit 126, out of service when the magnetic tape in the trunk recorder 127 becomes filled with items of information, operation of the readout control circuit 210 may be initiated in response to this emergency condition. In the case of the trunk recorders 127 and 136 which are located in the Hudson office, ground is applied to an emergency start lead by the filled trunk recorder which initiates operation of the readout control circuit 210 to seize only the playback control circuit having access to the filled recorder and operation of the seized playback control circuit to seize only the filled trunk recorder. Following the transmission of all of the items of information stored on the tape of the filled recorder, the readout control circuit 210 and the sized playback control circuit are returned to a normal condition. In a like mannner, the filled condition of a trunk recorder located in the Russell office is signified by a tone frequency or carrier signal which is transmitted over the carrier link by the remote carrier equipment 225 and demodulated by the local carrier equipment 215 to cause the application of an emergency start condition to the readout control circuit 210. This emergency start signal initiates a cycle of operation of the readout control circuit 210 during which the remote playback control circuit 235 is seized and the filled trunk recorder is seized and played back. Following the readout of the filled recorders, the system is returned to a normal condition.

For a more detailed description of the entire automatic toll ticketing system, reference should be made to said Patent 2,877,311.

To facilitate an easy understanding of the detached contact type of drawings utilized in the following description of an illustrative embodiment of the invention, a combined numerical and alphabetical designation has been utilized to identify many of the relay structures and manually operated keys forming the schematic circuit diagram of the automatic toll ticketing system. The windings of the relays are identified by one or more numeral digits indicating the figure of the drawings on which the relay winding is to be found followed by a group of alphabetical characters designating the relay. The contact pairs of the various relays in the schematic circuit diagram are also designated by a composite alphabetical and numerical designation in which one or more numerical characters identifying the figure of the drawings on which the contact pair is located is followed by a group of alphabetical characters indicating the relay of which the contacts form a part. One or more numerical characters are added to this designation to individually designate the different contacts of the same relay appearing in a single figure of the drawings.

INFORMATION COLLECTING AND STORING EQUIPMENT 245 LOCATED IN THE REMOTE RUSSELL OFFICE

As described above, the data storing, translating, and computing circuits 230, 250, 260, 290, 270, 295, 275, and 240, and the recorder 220, which are located in the Hudson office, are capable of being interconnected with the information collecting and storing equipment 245 which is located in the geographically remote Russell office by means of the local carrier equipment 215, the remote carrier equipment 225, and the remote playback control circuit 235. In this manner, the common data storing and recording facilities associated with the readout control circuit 210 are utilized to control the production of printed records including the items of information stored in the remote Russell office pertaining to toll calls placed therefrom. The information collecting and storing equipment 245 provided in the remote Russell office is identical to that provided in the Hudson office which is schematically indicated in FIG. 1 of the drawings.

Figure 19:
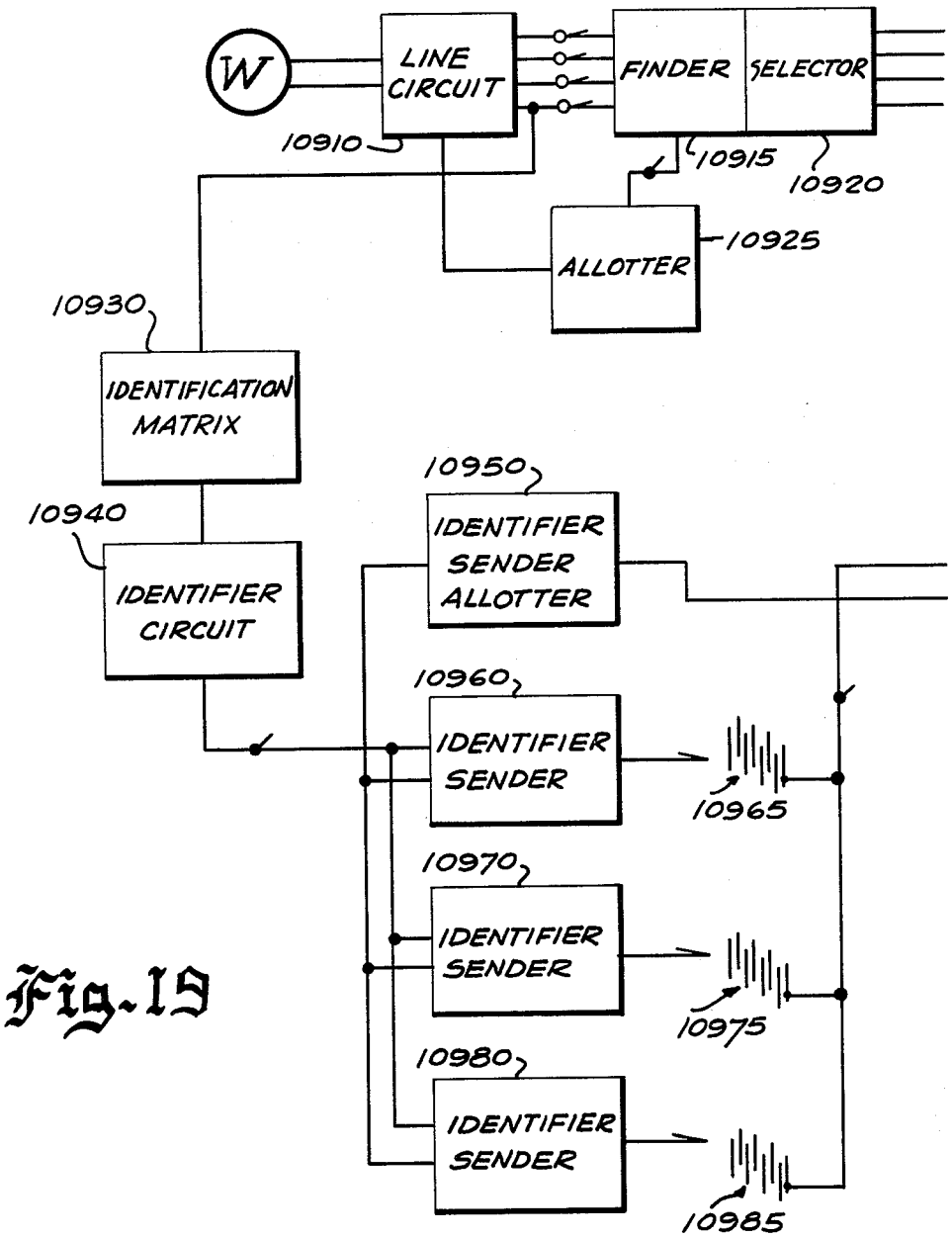
Figure 20:
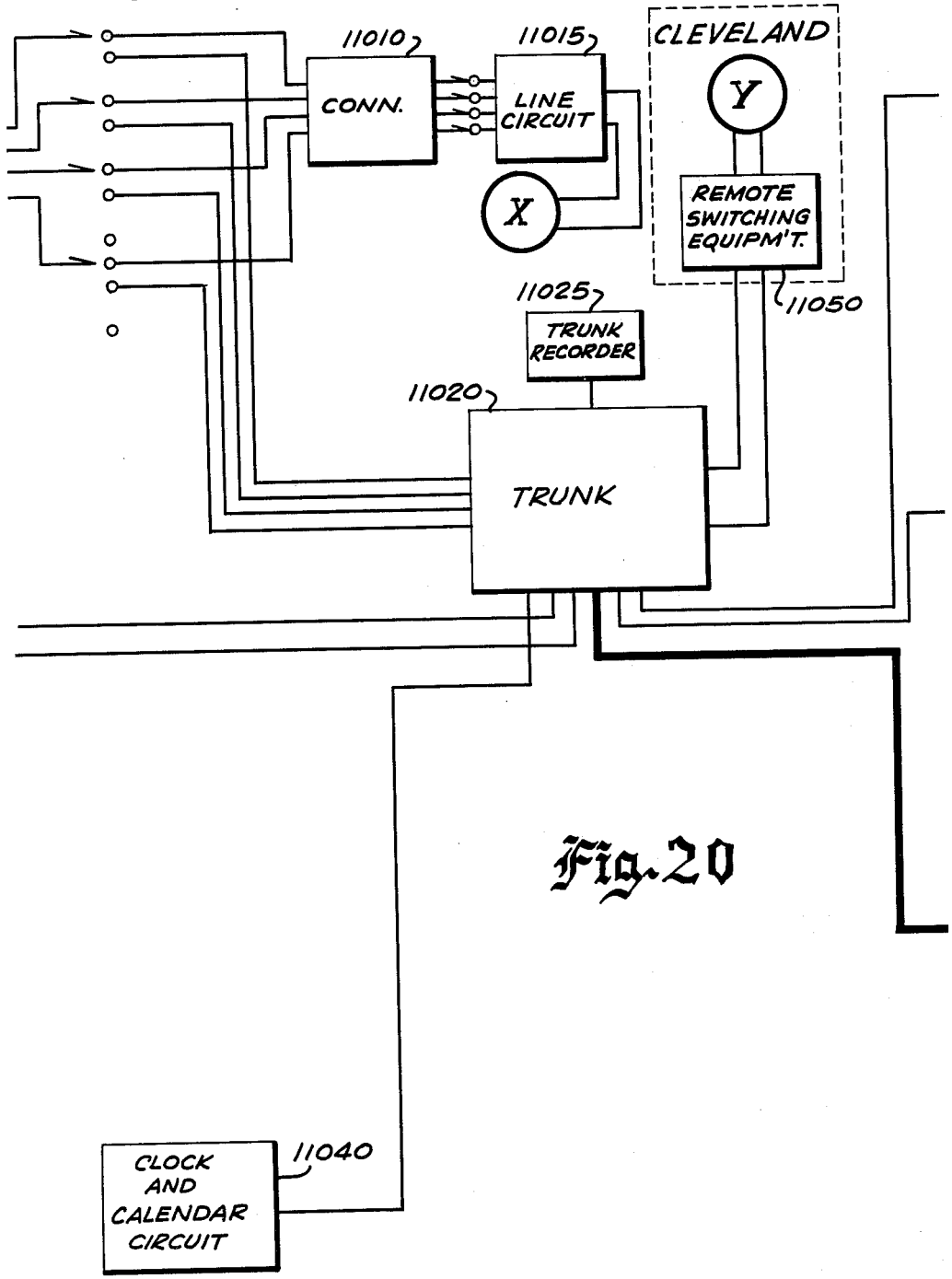
Figure 21:
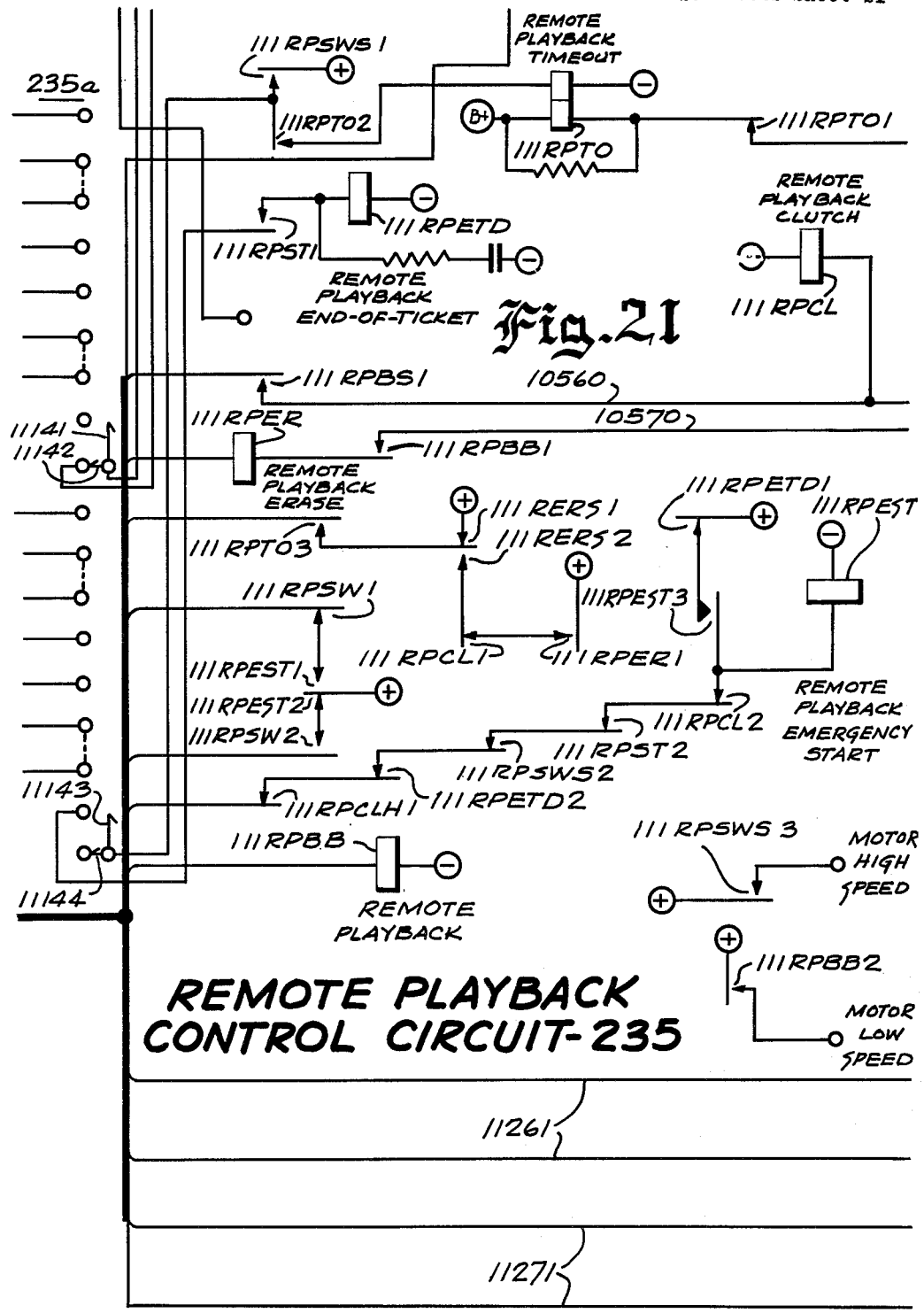
Figure 25:
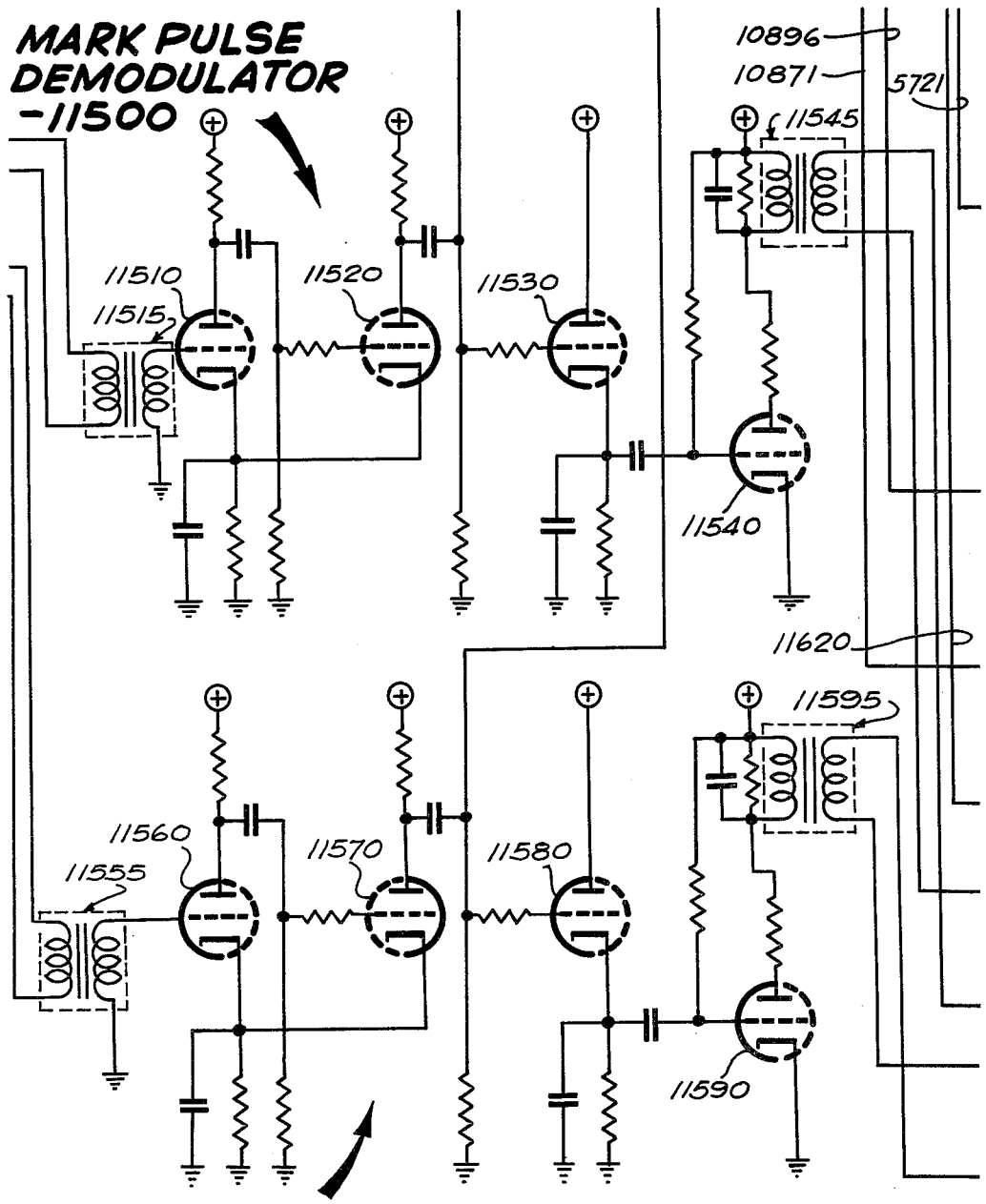
Figure 26:
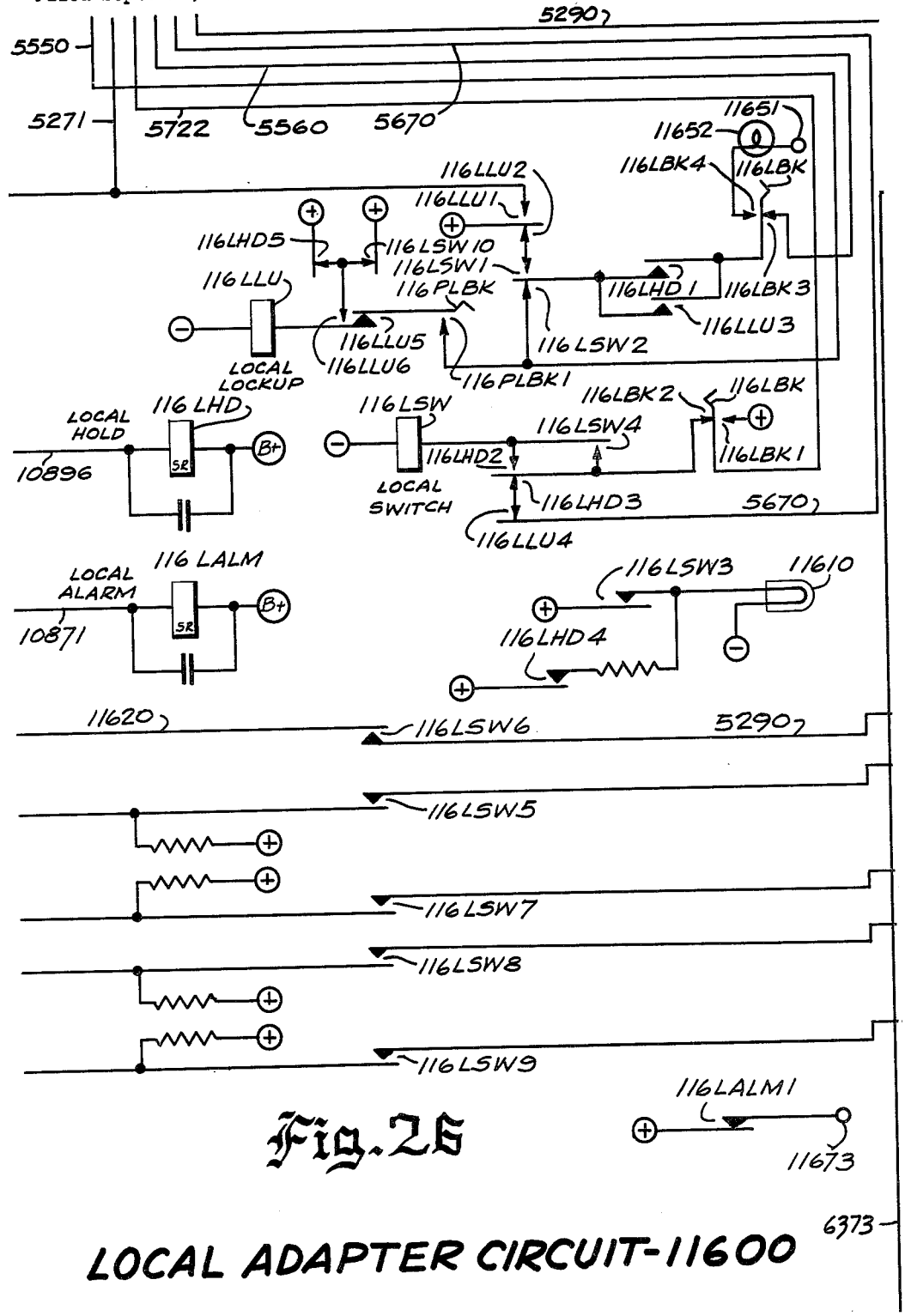

Referring more specifically to FIGS. 19 and 20 of the drawings, therein is schematically indicated the information collecting and storing equipment 245 which is provided in the Russell office, which office is assumed to include an exchange designated as Edgewood 4, A calling subscribed W located in the Russell office is shown in FIG. 19 as being on a private line terminating in a line circuit 10910. In response to the extension of a calling loop circuit to the line circuit 10910, an allotter 10925 is placed in operation to associate an idle link, such as one including a finder 10915 and a selector 10920, with the line circuit 10910. In the extension of local calls, such as to a local substation X, the selector 10920, following the association of the finder 10915 with the calling line circuit 10910, is operated under the control of dialed digits to extend the connection to one or more of a plurality of connectors, such as a connector 11010, which, in accordance with the size of the Edgewood 4 exchange, extends the connection to a line circuit 11015 with which is associated the called substation X.

In the event that the call is to be extended from the substation W in the Russell office to a substation, such as a substation Y located in the Cleveland area, the items of information pertaining to the call are to be stored to control the subsequent production of a toll ticket including the various stored items. Accordingly, to obtain access to switching equipment capable of extending the connection to a remote substation, such as the substation Y, the selector 10920 is operated in accordance with one or more access digits to seize a one way toll ticketing trunk circuit 11020, which circuit is identical in operation and circuit configuration to the trunk circuit 126, described in said Patent 2,877,311.

Following the seizure of the trunk circuit 11020, the subscriber at the calling substation W dials an assigned party digit, which may have either an arbitrary value or a value corresponding to the value of the units digit of the directory number of a terminal per line multiparty subscriber. This dialed party digit is stored in a trunk recorder 11025 individual to the trunk circuit 11020, the trunk recorder 11025 being identical to the trunk recorders 127 and 136.

Following the dialing of the assigned party digit, the subscriber at the calling substation W dials the three called office code digits representing the exchange in which the called substation Y is located, and, thereafter, dials the four digits forming the called station number. All seven of these digits are recorded in the trunk recorder 11025 under the control of the trunk circuit 11020, as set forth in said Patent 2,877,311 in conjunction with the description of the operation of the trunk circuit 126. Simultaneously with recording these digits, the pulse trains provided thereby are extended over an interoffice trunk to control the operation of remote switching equipment 11050, thereby to extend the connection to the called substation Y.

In response to the receipt of answering supervisory signals from the remote switching equipment 11050, the trunk circuit 11020 initiates the timing of the call, as described in said Patent 2,877,311, and renders a common clock and calendar circuit 11040 effective to transmit nine groups of mark pulses separated by space pulses to the trunk recorder 11025 to provide a record of the filing time of the call.

Following the storage of the date and time information in the trunk recorder 11025, the trunk circuit 11020 applies ground to a common identifier sender allotter start lead extending to an identifier sender allotter 10950 which is identical in configuration and operation with the identifier sender allotter 129, the operation of which is set forth in detail in said Patent 2,877,311. In being placed in operation, the allotter 10950 selects an idle one of a plurality of identifier senders 10960, 10970, or 10980, all of which are similar in operation and circuit configuration with the identifier sender 131 described in said Patent 2,877,311, so that one of a plurality of trunk finder switches 10965, 10975, or 10985 associated therewith search for and seize the trunk circuit 11020, thereby to associate an idle one of the identifier senders, such as the identifier sender 10960, with the trunk circuit 11020 through the trunk finder switch 10965.

In response to the association of the identifier sender 10960 with the trunk circuit 11020, ground is returned over the HS conductor of the extended switch train through the selector 10920 and the finder 10915 to an identification conductor which is individual to the line circuit 10910. As described in said Patent 2,877,311, the substation W associated with the line circuit 10910 is on a private line, and, accordingly, the identification conductor extends into a private line matrix in an identification matrix 10930, which is identical with the identification matrix 128 described in said Patent 2,877,311. In the event that the substation W is on a terminal per station multiparty line, the identification conductors associated with the various stations on the line extend to different party matrices in the matrix 10930, or, in the event that the calling substation W is on a terminal per line multiparty line, the identification conductor extends into the private line matrix.

Concurrently with establishing marking conditions in the identification matrix 10930 representing the digits forming the station number portion of the directory number of the calling substation W, the trunk circuit 11020 either in response to the dialing of a selected party digit or in storing the calling party information under the control of a modified dialing device, as described in said Patent 2,877,311, causes the operation of one of a plurality of party matrix selection relays, thereby to interconnect only one of the party matrices with an identifier circuit 10940, which is identical to the identifier circuit 130 described in detail in said Patent 2,877,311. In the event that the calling substation is on a private line or a terminal per line multiparty line, the selective operation of the party selection matrix relays performs no useful function, the private line matrix being directly connected to the input of the plurality of amplifier tubes forming the identifier circuit 10940.

Following the establishment of marking conditions in the identifier circuit 10940, this information is supplied to the seized identifier sender 10960, following which the identifier circuit 10940 and the identification matrix 10930 are released. Following the storage of the directory number of the calling substation W in the identifier sender 10960, this circuit operates to transmit four groups of mark pulses to the trunk recorder 11025 through the trunk circuit 11020, thereby to provide a record of the four digits forming the station number portion of the directory number of the calling substation W.

In response of the completion of the storage of the calling party information in the trunk recorder 11025, the trunk circuit 11020 renders the individual timer therein effective to supply pulses to the mark head of the trunk recorder 11025 at one minute intervals, thereby to provide a twentieth group of mark pulses including a number of pulses which is determined by the number of minutes forming the duration of the toll call. When the connection is released, the trunk circuit 11020 records a COE signal on the magnetic tape of the trunk recorder 11025 to indicate that all of the items of information pertaining to a single call have been completely stored therein.

In a similar manner, the trunk circuit 11020 and a plurality of additional trunk circuits similar thereto selectively control the storage of the items of information on their individually associated trunk recorders, such as the trunk recorder 11025, by controlling the information collecting and registering facilities 10930, 10940, 10950, 10960, 10970, 10980, and 11040 which are identical to the similarly designated components of the information collecting and registering equipment provided in the Hudson office, the detailed operation of which is set forth in said Patent 2,877,311. Accordingly, in this manner, the information collecting and storing equipment 245 provided in the Edgewood 4 exchange of the remote Russell office collects items of information in the plurality of trunk recorders, similar to the recorder 11025, so that at any given time the plurality of trunk recorders are provided with information in the form of mark and space pulses recorded on the magnetic tapes in a form which is identical to that indicated on the tape segment 12000a of the magnetic tape 12000 in the trunk recorder 127.

PRINTING THE INFORMATION STORED IN THE RUSSELL OFFICE

The items of information stored in the trunk recorders, similar to the trunk recorder 11025, in the Russell office are transmitted by the carrier equipment 215 and 225 from the Russell office to the Hudson office to control the operation of the printing recorder 220. The operation of the trunk recorders in transmitting the information from the Russell offiice to the Hudson office is controlled by signals transmitted from the Hudson office to the Russell office over the same carrier equipment. In this manner, the common information storing and recording facilities in the Hudson office are utilized for producing printing records of the items of information pertaining to calls placed in both the Hudson and Russell offices and, accordingly, obviates the need for providing recording equipment in the remote Russell office.

In initiating a readout or playback of the items of information stored in the trunk recorders in the Russell office, the stepping switch 210a of the readout control circuit 210 seizes a local adapter circuit 11600, forming a portion of the local carrier equipment 215, which together with the readout control circuit 210 transmits signals over the carrier link to cause the seizure of the remote playback control circuit 235. In response to seizure, the remote playback control circuit 235 searches for and seizes the first idle trunk recorder in the Russell office, during which erase and clutch signals are transmitted from the readout control circuit 210 through the remote playback control circuit to the seized trunk circuit and its associated trunk recorder. These signals are transmitted by an erase modulator 10700 and a clutch modulator 10800, both forming a portion of the local carrier equipment 215, and are received and detected by an erase demodulator 10600 and a clutch demodulator 10650, both forming a portion of the remote carrier equipment 225. A remote office adapter circuit 10500, also forming a part of the remote carrier equipment 225, controls the selective operation of the remote playback control circuit 235 in accordance with the signals transmitted through the carrier link.

In response to seizure of an idle trunk recorder, mark and space pulses are transmitted through the remote playback control circuit 235 to the registering means associated with the readout control circuit 210 by means of a space pulse modulator 11300 and a mark pulse modulator 11350, both forming a portion of the remote carrier equipment 225, and a mark pulse demodulator 11500 and a space pulse demodulator 11550, both forming a portion of the local carrier equipment 215. In addition, the carrier paths including the modulators 11300 and 11350 are controlled by the remote playback control circuit 235 and the remote office adapter circuit 10500 to provide control signals for operating a hold demodulator 10880 and an alarm demodulator 10850, both forming a portion of the local carrier equipment 215.

*Seizure of the trunk recorder 11025 in the remote Russell office*

As described in said Patent 2,877,311, the application of start ground to the terminal 5700 by the clock and calendar circuit 133 at a selected time initiates a routine readout operation of the readout control circuit 210, as described in said Patent 2,877,311 under the title Operation of the Readout Control Circuit 210 During a Routine Readout Operations, so that the stepping switch 210a sequentially seizes a plurality of playback control circuits, similar to the playback control circuit 200. Seizure of the playback control circuit permits the information stored in the plurality of trunk recorders to be transmitted to the data storing means associated with the readout control circuit 210 to control the intermittent operation of the recorder 220 to print a plurality of toll tickets, each including the items of information pertaining to a single toll call. This intermittent stepping operation of the switch 210a continues until such time as, following the playback of all of the information in the trunk recorders to which one of the playback control circuits has access, the plurality of wipers 5711, 5712, and 5713 are moved into engagement with the contacts which are individual to the local office adapter circuit 11600.

More specifically, when the wiper 5712 moves into engagement with the contacts to which are connected a conductor 5722, a test is performed to determine whether or not the playback facilities located in the Russell office are idle or busy. To this end, the conductor 5722 extends to an open circuit in the local office adapter circuit 11600 to indicate that the remote playback facilities are idle, the conductor 5722 normally being connected to the emergency start ground conductor 5670 of the readout control circuit 210 through a plurality of normally closed contacts 116LBK2, 116LHD3, and 116LLU4. The conductor 5670 is not provided with ground at this time inasmuch as a routine rather than an emergency readout operation has been initiated. As described in said Patent 2,877,311, the absence of ground on the wiper 5712 removes the ground shunt around the operating winding of the readout switch relay 57RSW so that this relay operates to perform the functions described in said Patent 2,877,311, and in closing the constacts 57RSW5 extends ground to the wiper 5711 of the stepping switch 210a.

This ground is extended over a conductor 5721 to cause the transmission of a clutch signal to the remote Russell office much in the same manner as the application of ground through the wiper 5711 forwards clutch ground to the seized playback control circuits in the local Hudson office, as described in said Patent 2,877,311. More specifically, the application of ground to the conductor 5721 reduces the negative bias supplied by a potentiometer 10831 to the control electrodes of a pair of tubes 10810 and 10820 forming a portion of the clutch modulator 10800, these control electrodes being normally supplied with a carrier potential from a transformer 10835 which forms a portion of the output circuit of a continuously operative carrier frequency generator circuit including a tube 10830. The clutch modulator 10800 is described in detail in the copending application of F. A. Morris, Serial No. 536,574, now Patent 2,850,700, filed September 26, 1955, which copending application is assigned to the same assignee as the present application, and is operative, in response to the reduction of the biasing potential supplied by the potentiometer 10831, to provide a carrier or tone frequency signal of approximately 4.3 kilocycles to an output transformer 10815. The secondary winding of the transformer 10815 is connected by a pair of conductors 10811 and 10812 to a clutch signal band pass filter 11420, the output of which is inductiviely coupled to a line 11446 extending to the Russell office.

In order to permit the telephone line 11446 to be simultaneously utilized for conventional voice frequency telephone communication between the Hudson and Russell offices, local telephone equipment 11449 located in the Hudson office is coupled to the line 11446 through a 3 kilocycle low pass filter 11445, the characteristics of the low pass filter 11445 and the band pass filter 11420 effectively separating the voice frequency signals from the frequency of the tone signal utilized in transmitting clutch information from the Hudson office to the Russell office.

The clutch tone signal received at the Russell office from the line 11446 is inductively coupled to the input of a clutch signal band pass filter 11480 and thence through a pair of conductors 11481 and 11482 to an input transformer 10655 of the clutch demodulator 10650. The secondary winding of the transformer 10655 is connected between ground and the control grid of a first amplifier tube 10660 in the clutch demodulator 10650. The output of the first amplifier tube 10660 is supplied through a coupling condenser 10661 to the control electrode of a second cascade connected amplifier tube 10670. The amplifier circuit including the tubes 10660 and 10670 is described in detail in the copending application of F. A. Morris, Serial No. 536,575, now patent 2,881,313, filed September 26, 1955, which copending application is assigned to the same assignee as the present application.

The output from the two stages of amplification is supplied through a coupling condenser 10671 to the control electrode of an infinite impedance detector tube 10680, the control electrode of which is also supplied with a negative bias of approximately ten volts by a potentiometer circuit 10681, this negative bias normally maintaining the tube 10680 in a cut off condition. When the amplified carrier or tone frequency signal supplied through the coupling condenser 10661 is applied to the tube 10680, the positive portions of the carrier frequency voltage render the tube 10680 conductive, thereby to rectify or detect the incoming clutch tone signal and, accordingly, to produce a positive potential drop across a cathode resistor 10682 and a parallel cathode capacitance 10683.

The cathode circuit of the tube 10680 is directly coupled to the control electrode of a direct current amplifier tube 10690, the anode of which is connected to a polarized operating voltage through the operating winding of a remote office clutch relay 105RCL by a conductor 10691. The control electrode of the tube 10690 is supplied with a negative potential sufficient to maintain this tube normally cut off from a voltage divider including the cathode resistor 10682 and a resistor 10692. However, when the infinite impedance detector tube 10680 is rendered conductive to provide a more positive potential across the cathode capacitor 10683, the tube 10690 is rendered conductive to operate the remote office clutch relay 105RCL.

The operation of this relay closes a plurality of contacts 105RCL1 and 105RCL2. The closure of the contacts 105RCL2 applies ground to one leg of a voltage divider 11341, which leg is normally connected to ground through a pair of normally closed contacts 105ROAL1 controlled by a remote alarm relay 105ROAL. This relay is normally maintained operated by the application of resistance battery to a terminal 10515 by a supervisory circuit associated with the toll ticketing equipment provided in the Russell office. Since the contacts 105ROAL1 are normally maintained closed, thereby to connect one leg of the voltage divider 11341 to ground, the negative potential applied to the control electrodes of a pair of modulator tubes 11310 and 11320 forming a portion of the mark pulse modulator 11300 is reduced so that a 6.64 kilocycle carrier or tone frequency signal supplied to a transformer arrangement 11335 by an oscillator tube 11330 is provided at an output transformer 11345. The construction and the operation of the mark pulse modulator 11300 is set forth in detail in the above referred to copending application of F. A. Morris, now patent 2,850,700, the modulator 11300 being substantially similar to the clutch modulator 10800.

This continuous application of the mark pulse tone carrier frequency signal to the carrier link extending to the Hudson office provides a check over the proper operation of the carrier equipment and, in particular, insures the absence of open circuits in the telephone line 11446. More specifically, the mark pulse tone signals supplied at the output transformer 11345 are applied through a mark pulse band pass filter 11470 having a characteristic adapted to pass the 6.64 kilocycle mark pulse carrier signal which is inductively coupled to the telephone line 11446. This signal is inductively coupled from the line 11446 to the input of a 6.64 kilocycle mark pulse band pass filter 11400 located in the Hudson office and is coupled therethrough to the primary winding of an input transformer 11515 forming a portion of the mark pulse demodulator 11550, which demodulator is of the type described in the above identified copending application of F. A. Morris, now Patent 2,881,313. The unmodulated carrier signal supplied at the input transformer 11515 is amplified by a pair of cascade coupled amplifier tubes 11510 and 11520 and is supplied to the input of the alarm demodulator 10850 which includes an infinite impedance detector tube 10860 and an overbiased direct current amplifier tube 10870. The demodulator 10850 operates in the manner set forth above in conjunction with the description of the similarly designated tubes 10680 and 10690 in the clutch demodulator 10650. Accordingly, the application of the mark pulse frequency carrier signal through the amplification stages provided in the mark pulse demodulator 11500 to the alarm demodulator 10850 renders the tube 10870 conductive so that a local alarm relay 116LALM is operated, the anode of the tube 10870 being connected with the operating winding of the relay 116LALM and a polarized operating potential through a conductor 10871.

Operation of the local alarm relay 116LALM opens a pair of contacts 116LALM1 to prevent the application of ground to a terminal 11673 which is connected to an emergency alarm in the supervisory circuit associated with the toll ticketing facilities in the local Hudson office. Accordingly, the continuous application of the mark pulse tone signal over the carrie link from the Russell office to the Hudson office results in maintaining the local alarm relay 116LALM normally operative to prevent the application of ground to the supervisory equipment in the Hudson office to indicate an alarm condition. Therefore, if for any reason the mark pulse carrier or tone signal disappears from the input to the alarm demodulator 10850, the local alarm relay 116LALM releases to provide an alarm indication. The local alarm relay 116LALM is also rendered slow-to-release so that this relay is not released in response to momentary absences of the mark pulse carrier signal.

In order to provide means for signaling an alarm condition in the remote Russell office, the removal of battery from the terminal 10515 under the control of the supervisory circuits in the Russell office permits the remote alarm relay 105ROAL to release, thereby opening the contacts 105ROAL1. Opening these contacts removes ground from one leg of the voltage divider 11341 to increase the negative potential applied to the control electrodes of the modulator tubes 11310 and 11320, thereby to terminate the transmission of the mark pulse carrier frequency signal to the Hudson office. The absence of these signals releases the local alarm relay 116LALM to indicate the existence of an alarm condition in the remote Russell office. However, the closure of the contacts 105RLC2 in response to operation of the remote office clutch relay 105RCL during the initiation of a readout or playback operation from the Russell office provides an alternative source of ground for the voltage divider 11341 to insure the operativeness of the mark pulse modulator 11300 during the readout or playback operation irrespective of the operated or released condition of the remote alarm relay 105ROAL.

Referring back to the preceding operation of the remote office clutch relay 105RCL, the closure of the contacts 105RCL1 applies ground to a conductor 10560 which forms the clutch conductor of the remote playback control circuit 235. The remote playback control circuit 235 operates in the manner set forth in said Patent 2,877,311 in conjunction with the description of the operation of the playback control circuit 200 which is located in the local Hudson office, and, accordingly, the application of ground to the conductor 10560 completes an operating circuit for a remote playback clutch relay 111RPCL. In operating, this relay closes a pair of contacts 104RPCL3 to complete an operating circuit for a slow-to-release remote playback start relay 104RPST which extends through a series thermistor 10420. In operating, the remote playback start relay 104RPST closes a pair of contacts 104RPST3 to complete an operating circuit for a remote playback hunt assist relay 104RPHA, the operation of which completes an energizing circuit for a motor magnet 10440 of a switch 235a. Energization of the motor magnet 10440 opens a pair of interrupter contacts 10441 controlled thereby to interrupt the operating circuit for the remote playback hunt assist relay 104RPHA so that this relay releases to interrupt the energizing circuit for the motor magnet 10440. The release of the motor magnet 10440 advances a plurality of wipers 11141, 11142, 11143, and 11144 controlled thereby into engagement with the contacts forming the first stepping position of the switch 235a. In addition, movement of these wipers opens a pair of off-normal contacts 10443 and closes a plurality of off-normal contacts 10442 and 10444.

Assuming that the trunk circuit 11020 and the trunk recorder 11025 individual thereto are connected to the contacts of the switch 235a forming the first stepping position thereof, if the trunk circuit 11020 is busy, ground is forwarded over one of the wipers 11141 or 11142 to provide a ground shunt for preventing operation of a remote playback switch relay 104RPSW and for again causing operation of the remote playback hunt assist relay 104RPHA to step the switch 235a to the next position. However, assuming that the trunk circuit 11020 is idle, the open circuit condition encountered by one of the wipers 11141 or 11142 removes the ground shunt around the operating winding of the remote playback switch relay 104RPSW so that this relay operates.

In operating, the relay 104RPSW closes a pair of contacts 111RPSW2 to apply ground to and advance conductor extending to the trunk circuit 11020, thereby to cause the magnetic tape in the trunk recorder associated with the next succeeding trunk circuit to which the switch 235a has access to be advanced to its normal home position. The closure of the contacts 104RPSW3 completes an operating circuit for a remote playback clutch hold relay 104RPCLH, thereby causing the operation of the relay.

The closure of the contacts 104RPSW5, in response to operation of the relay 104RPSW, completes an obvious operating circuit for a remote playback second switch relay 104RPSWS which, in operating, closes a pair of contacts 111RPSWS1 to apply ground to the wipers 11143 and 11144, thereby to cause the application of ground to the operating winding of the clutch switch relay in the trunk circuit 11020 to initiate movement of the magnetic tape in the trunk recorder 11025 towards its home position. The operation of this relay also closes a pair of contacts 104RPSWS6 and opens a pair of contacts 104RPSWS3, the opening of these contacts interrrupting the operating circuit of the remote playback start relay 104RPST so that this relay releases. The closure of the contacts 104RPSWS6 applies ground to a remote playback hold conductor 10563.

The application of ground to the conductor 10563 completes an obvious operating circuit for a remote hold relay 105ROHD so that this relay operates to close a pair of contacts 105ROHD1, thereby to provide another source of ground for maintaining a reduced negative bias on the control electrodes of the modulator tubes 11310 and 11320 in the mark pulse modulator 11300. In addition, the application of ground to the conductor 10563 connects one leg of a potentiometer 11391 to ground, thereby reducing the negative bias applied to the control electrodes of a pair of modulator tubes 11360 and 11370 forming a portion of the space pulse modulator 11350. This modulator, which is substantially identical to the mark pulse modulator 11300, includes an oscillator tube 11380, an oscillator transformer 11385, and an output transformer 11365 which, in response to the decrease in the negative potential supplied to the control electrodes of the tubes 11360 and 11370, is provided with a space pulse tone or carrier frequency signal of approximately 5.87 kilocycles. This tone signal is coupled to the telephone line 11446 through a 5.87 kilocycle space pulse band pass filter 11460. The space pulse tone signals on the line 11446 are inductively coupled to the input of a space pulse band pass filter 11410 located in the Hudson office to be applied therethrough to an input transformer 11555 forming a portion of the space pulse demodulator 11550. The input signals applied to the transformer 11555 are successively amplified by a pair of amplifier tubes 11560 and 11570 to be applied to the input to an infinite impedance detector tube 10890 forming a portion of the local hold demodulator 10880. The space pulse demodulator 11550 and amplifier stages including the tubes 11560 and 11570 are described in the above identified copending application of F. A. Morris, now Patent 2,881,313.

The local hold demodulator 10880 operates in the manner set forth above in the description of the operation of the clutch demodulator 10650 so that an overbiased direct coupled amplifier tube 10895 is rendered conductive to provide a conductive path to ground on a conductor 10896 which extends to the operating winding of a slow-to-release local hold relay 116LHD, the other side of the operating winding of which is connected to a B+ operating potential. The operation of the local hold relay 116LHD closes a plurality of contacts 116LHD1, 116LHD2, and 116LHD4 and opens a plurality of contacts 116LHD3 and 116LHD5.

The closure of the contacts 116LHD4 provides resistance ground to a lamp 11610 to cause the dim illumination thereof as an indication that hold supervisory signals have been received in the Hudson office from the Russell office to represent that the remote playback control circuit 235 has seized an idle trunk recorder, such as the recorder 11025. The opening of the contacts 116LHD5 interrupts one point in a holding circuit for a local lockup relay 116LLU, and the closure of the contacts 116LHD1 prepares a path for applying ground to the common hold conductor 5560 extending to the readout control circuit 210. The opening of the contacts 116LHD3 opens the connection between a conductor 5722 and the common emergency start ground conductor 5670, and the concurrent closure of the contacts 116LHD2 completes an operating circuit for a local switch relay 116LSW. This circuit extends from the closed and grounded contacts 57RSW1, which are closed in response to the operation of the readout switch relay 57RSW upon seizure of the local adapter circuit 11600, through the wiper 5712, the conductor 5722, and the closed contacts 116LBK2 and 116LHD2.

The operation of the local switch relay 116 LSW opens a plurality of contacts 116 LSW 2 and 116 LSW 10 and closes a plurality of contacts 116 LSW 1 and 116 LSW 3 to 116 LSW 9, inclusive. The closure of the contacts 116 LSW 4 provides a holding circuit for the local switch relay 116 LSW in parallel wtih the circuit provided by the closed contacts 116 LHD 2. The closure of the contacts 116 LSW 3 provides direct ground to the lamp 11610 to cause bright illumination thereof as an indication that the local switch relay 116 LSW has been operated.

The closure of the contacts 116 LSW 5, 116 LSW 7, 116 LSW 8, and 116 LSW 9 interconnects the mark and space input leads extending to the input transformers 6610 and 6620 of the readout amplifier circuit 6600 with the mark pulse demodulator 10500 and the space pulse demodulator 11550, thereby to complete a path for transmitting mark and space pulse information from the seized trunk recorder in the Russell office to the readout amplifier circuit in the Hudson office. The opening of the contacts 116 LSW 10 interrupts an addional point in a holding circuit for the local lockup relay 116 LLU, the opening of the contacts 116 LSW 2 performing no useful function at this time.

The closure of the contacts 116 LSW 1 completes a circuit for operating the readout hold relay 57 RHD in the readout control circuit 210 which, as described in said Patent 2,877,311, is operated in response to the receipt of information indicating that a trunk recorder has been seized by the selected playback control circuit. More specifically, this circuit extends from the normally closed and grounded contacts 116 LU 2 through the closed contacts 116 LSW 1, 116 LHD 1 and 116 LBK 3 to the common hold conductor 5560, this conductor being connected to the operating winding of the read out hold relay through the closed contacts 57 RETD 1 and 57 RSW 6. The operation of the readout hold relay performs the operations set forth in said Patent 2,877,311 in the description of the operation of the readout control circuit 210 during a routine readout operation and, in opening the contacts 57 HRD 2, removes ground from the wiper 5711 and the clutch conductor 5721. The removal of ground from the conductor 5721 and, accordingly, from one leg of the potentiometer 10831 increases the negative bias on the control grids of the modulator tubes 10810 and 10820 so that the clutch frequency tone signal is no longer transmitted over the carrier link to the clutch demodulator 10650, thereby resulting in the release of the remote office clutch relay 105 RCL. In releasing to open the contacts 105 RCL 1, ground is removed from the clutch conductor in the remote playback control circuit 235, thereby releasing the remote playback clutch relay 111 RPCL. The release of the relay performs the same functions as set forth in said Patent 2,877,311 in the description of the operation of the playback control circuit 200. However, the concurrent closure of the contacts 57 HRD 3 in response to operation of the readout hold relay 57 RHD transfers the control over the application of ground to the wiper 5711 to a path including the contacts 58 RCOE 3 and 58 CLD 1 controlled by the readout COE relay 60 RCOE and the clutch delay relay 60 CLD. In the event that the clutch delay interval has expired, thereby resulting in the operation of the clutch delay relay 60 CLD, the contacts 58 CLD 1 are closed to apply ground to the wiper 5711, and, accordingly, clutch tone or carrier frequency signals are again transmitted to the remote office adapter circuit 10500, thereby to maintain the remote office cutch relay 105 RCL operated.

The closure of the contacts 116 LSW 6 interconnects the common erase conductor 5290 with a conductor 11620 which extends to a potentiometer 10741 forming a portion of the erase modulator 10700, thereby preparing a path for transmitting erase frequency tone signals to the remote Russell office. However, the common erase conductor 5290 extends to an open circuit and, accordingly, the closure of the contacts 116 LSW 6 does not render the erase modulator 10700 effective.

Returning now to the operation of the remote playback control circuit 235, when the magnetic tape in the trunk recorder 11025 has been returned to its normal home position and the circuits in the trunk circuit 11020 are prepared to transmit mark and space pulse information from the trunk recorder through the remote playback control circuit 235 and the carrier link to the recording facilities in the Hudson office, ground is applied to the conductor extending to the operating winding of the remote playback relay 111 RPBB, as described above, to operate this relay. In operating, the remote playback relay completes, at a pair of contacts 112 RPBB 1, an obvious operating circuit extending through a thermistor 11280 to the operating winding of a remote playback start relay 112 RPBS, the operation of which closes a pair of contacts 1111 RPBS 1 to interconnect the clutch conductor 10560 in the remote playback control circuit 235 with the clutch magnet forming a portion of the trunk recorder 11025 so that effective control over the energization of the clutch magnet in the trunk recorder 11025 is transferred to the above described path in the readout control circuit 210 in the Hudson office. If the clutch delay relay 60 CLD in the readout control circuit 210 has been operated thereby to continue the transmission of clutch frequency tone signals to the remote Russell office, ground is applied from the closed contacts 105 RCL 1 to the conductor 10560 to initiate movement of the magnetic tape in the trunk recorder 11025.

Since the first item of information recorded on this tape, shown in FIG. 29A, is the preliminary COE signal comprising simultaneous mark and space pulse signals, movement of the magnetic tape past the transducing heads associated therewith applies simultaneous mark and space pulses to a pair of mark pulse conductors 11261 and to a pair of space pulse conductors 11271, these conductors terminating in the primary windings of a pair of input transformers 11262 and 11272, respectively. The input transformer 11262 provides an input voltage to a mark pulse amplifier or preamplifier 11260, which is similar to the preamplifier circuit shown in conjuction with the playback control circuit 200, described in said Patent 2,-877,311 so that the mark pulse forming a portion of the preliminary COE signal is amplified and transmitted through an output transformer 11263 to the primary winding of an input transformer 11340 of the mark pulse modualtor 11300. Since the voltage divider 11341 is connected to ground through the plurality of closed contacts 105 ROHD 1, 105 ROAL 1, and 105 RCL 2, an operating potential is supplied to the control electrodes of the modulating tubes 11310 and 11320 so that the mark pulse applied to the input transformer 11340 is coupled through the secondary winding thereof to modulate the continuously transmitted mark pulse carrier frequency waves with a single mark pulse. This pulse is transmitted over the carrier link, as described above, to be received at the input transformer 11515 of the mark pulse demodulator 11500, this signal being subsequently amplified in the two stages of amplification provided by the tubes 11510 and 11520. This amplified signal is applied to the control electrode of an overdriven cathode follower tube 11530 and therethrough to a zero bias triode 11540. As described in the above identified copending Morris application, now Patent 2,881,313, these two tubes provide a detected mark pulse which is transmitted through an output transformer 11545 and the closed contacts 116 LSW 5 and 116 LSW 7 to the input to the mark pulse channel in the readout amplifier circuit 6600.

In a similar manner, the space pulse applied to the input transformer 11272 is supplied through a space pulse amplifier 11270 and an output transformer 11273 to an input transformer 11390 forming a portion of the space pulse modulator 11350. The control electrodes of the modulator tubes 11360 and 11370 forming a portion of the modulator 11350 are provided with an operating potential inasmuch as the voltage divider 11391 is connected to ground through the closed contacts 104 RPALR 5. Accordingly, the continuously transmitted space pulse tone or carrier frequency signal provided by the modulator 11350 is modulated with a single space pulse, the modulated signal being transmitted through the output transformer 11365 and over the carrier link to be applied to the input transformer 11565 of the space pulse demodulator 11550. This signal is subsequently amplified in the tubes 11560 and 11570 and applied to the control electrode of an overbiased cathode follower tube 11580 which, together with a zero bias triode 11590, detects the space pulse to provide a single space pulse in the form of a sharp spike which is transmitted through an output transformer 11595 and the closed contacts 116 LSW 8 and 116 LSW 9 to the input transformer to the space pulse channel in the readout amplifier circuit 6600.

The concurrent application of mark and space pulses to the mark and space pulse channels in the readout amplifier circuit 6600 renders the COE tube 6710 in the readout amplifier circuit 6600 conductive to operate the readout COE relay 60 RCOE. In operating, this relay opens the contacts 58 RCOE 3 to remove ground from the wiper 5711 and, accordingly, from the clutch conductor 5721 extending to the voltage divider 10831 in the clutch modulator 10800. Interruption of the clutch carrier signal releases the remote office clutch relay 105 RCL to open the contacts 105 RCL 1, thereby removing ground from the clutch conductor 10560 in the remote playback control circuit 235. The removal of ground from the conductor 10560 terminates movement of the magnetic tape in the seized trunk recorder 11025.

Referring back to the preceding operation of the readout COE relay 60 RCOE, the closure of the contacts 58 RCOE 2 completes an obvious operating circuit for the readout erase relay 57 RER so that this relay operates to perform the functions described above, included in which is the closure of the contacts 57 RER 1 to apply ground to the common erase conductor 5290. The ground applied to the common erase conductor 5290 is extended through the closed contacts 116 LSW 6 to ground one leg of a voltage divider 10741, thereby to provide an operating potential on the control electrodes of a pair of modulator tubes 10710 and 10720 forming a portion of the erase modulator 10700. These control electrodes are normally supplied by a transformer arrangement 10740 with an erase pulse tone or carrier frequency signal of approximately 3.75 kilocycles from an oscillator circuit including a pentode tube 10730. Accordingly, when the negative potential applied to these control electrodes is reduced, an erase signal of 3.75 kilocycles is applied through an output transformer 10750 and a pair of conductors 10751 and 10752 to a 3.75 kilocycle erase signal band pass filter 11430, the output of which is inductively coupled to the telephone line 11446.

The erase tone signal is received in the Russell office and is transmitted through a 3.75 kilocycle erase signal band pass filter 11490 and a pair of conductors 11491 and 11492 to the primary winding of an input transformer 10605 forming a portion of the erase demodulator 10600, which demodulator operates in the same manner as and includes the same circuit components as the clutch demodulator 10650, the operation of which is set forth in detail above. The erase signal supplied to the input transformer 10605 is coupled through successive amplifier tubes 10610 and 10620 to be applied to an infinite impedance detector tube 10630 which renders an overbiased direct current amplifier tube 10640 conductive. Rendering this tube conductive provides a flow of current in a conductor 10641 to operate a remote office erase relay 105 ROER. The operation of this relay closes a pair of contacts 105 ROER 1 to apply ground to an erase conductor 10570 forming a portion of the remote playback control circuit 235. Since the remote playback relay 111 RPBB has been previously operated, as described above, to close a pair of contacts 111 RPBB 1, the application of ground to the conductor 10570 causes the operation of a remote playback erase relay 111 RPER and also causes the selective energization of the erase head in the trunk recorder 11025.

Figure 27:
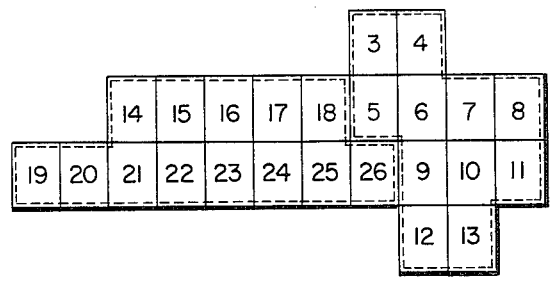
Figure 28:

Following the completion of the resetting of the data storing means in the Hudson office, as indicated by the release of the readout reset relay 63 RES, ground is again applied to the conductor 5721 to render the clutch modulator 10800 effective to transmit the clutch frequency carrier signal from the Hudson office to the remote Russell office, thereby resulting in the reoperation of the remote office clutch relay 105 RCL to close the contacts 105 RCL 1. This again applies ground to the clutch conductor 10560 in the remote playback control circuit 235 to initiate movement of the magnetic tape in the seized trunk recorder 11025. Movement of the magnetic tape transmits the mark and space pulse information, such as shown in FIG. 27A, through the above described carrier facilities from the remote Russell office to the local Hudson office to control the storage of items of information pertaining to successive toll calls in the data storing facilities. These transmitted and stored items are recorded by the printing recorder 220, as described in said Patent 2,877,311, to provide toll tickets of the items of information pertaining to the toll calls stored in the trunk recorder 11025.

*Release of the trunk recorder 11025 and seizure of the next subsequent idle trunk recorder in the remote Russell office*

As described above in the subtitle 3 Release of a Seized Trunk Recorder, in said Patent 2,877,311, following the transmission of the items of information pertaining to the last call stored in a trunk recorder, the readout pulse generator relay 58 RPG is rendered effective to pulse ground on the wiper 5711, thereby intermittently rendering the clutch modulator 10800 effective and ineffective to transmit clutch tone frequency carrier signals to the clutch demodulator 10650. This causes the intermittent operation and release of the remote office clutch relay 105 RCL to pulse the remote playback clutch relay 111 RPCL so that, in the same manner described in said Patent 2,877,311, a remote playback timeout tube 11210 is rendered conductive to operate a remote playback timeout relay 111 RPTO. The operation of this relay, in opening a pair of contacts 104 RPTO 2, permits the remote playback switch relay 104 RPSW to release due to the interruption in the holding ground path therefor extending to the trunk circuit 11020. The release of the relay 104 RPSW, in closing a pair of contacts 104 RPSW 6, completes an operating circuit for the motor magnet 10440 and, in opening the contacts 104 RPSW 5 releases the relay 104 RPSWS. The release of this relay opens a pair of contacts 104 RPSWS 5 to release the motor magnet 10440 to move the wipers 11141–11144 into engagement with the contacts forming the next stepping position. In the event that the trunk circuit associated with the contacts forming the next stepping position is busy, the switch 235a steps until an idle trunk circuit is seized following which the relay 104 RPSW operates, as described above, to cut through the trunk recorder associated with the seized trunk circuit with the readout amplifier circuit 6600 associated with the readout control circuit 210.

In addition, following the release of the relay 104 RPSW to open the contacts 104 RPSW 4 and prior to the release of the second switch relay 104 RPSWS to close a pair of contacts 104 RSWS 4, ground is removed from the hold conductor 10563, thereby resulting in the release of the remote hold relay 105 ROHD to open the contacts 105 ROHD 1. In addition, the removal of ground from the remote hold conductor 10563 removes ground from the voltage divider 11391 so that the transmission of the space pulse tone signal to the local hold demodulator 10880 is terminated, thereby releasing the local hold relay 116 LHD.

The release of this relay opens the contacts 116 LHD 1, 116 LHD 2, and 116 LHD 4 and closes the contacts 116 LHD 3 and 116 LHD 5. The closure of the contacts 116 LHD 5 and 116 LHD 3 and the opening of the contacts 116 LHD 2 perform no useful function at this time, the relay 116 LSW being maintained operated over the holding circuit including the closed contacts 116 LSW 4. The opening of the contacts 116 LHD 4 removes resistance ground from the monitor lamp 11610, but this lamp remains brightly illuminated due to direct ground provided through the closed contacts 116 LSW 3.

The opening of the contacts 116 LHD 1 removes ground from the common hold conductor 5560 to interrupt the above described operating circuit for the readout hold relay, thereby permitting this relay to release to operate the hold shunt relay 58 HSH. The operation of this relay in opening the contacts 58 HSH 1, interrupts the holding circuit for the readout erase relay 57 RER so that this relay releases. The release of the relay 57 RER, in opening the contacts 57 RER 1, removes ground from the common erase conductor 5290 and, accordingly, from the voltage divider 10741 forming a portion of the erase modulator 10700. The removal of ground from the divider 10741 provides a sufficiently negative bias on the control electrodes of the modulator tubes 10710 and 10720 so that transmission of the erase frequency carrier signal to the erase demodulator 10600 in the remote Russell office is terminated, resulting in the release of the remote office erase relay 105 ROER. The operation of the relay 58 HSH also terminates the application of pulsing ground to the clutch modulator 10800.

The release of the relay 105 ROER to open the contacts 105 ROER 1 removes ground from the erase conductor 10570 in the remote playback control circuit 235, thereby removing the energization from the erase head in the seized trunk recorder and permitting the remote playback erase relay 111 RPER in addition to the remote erase slave relay 104 RERS to release. Therefore, each time the stepping switch 235a in the remote playback control circuit 235 is advanced to release one trunk recorder and to seize an additional trunk recorder, the removal of ground from the hold conductor 10563 in the remote playback control circuit 235 causes the release of the local hold relay 116 LHD in the local adapter circuit 11600 in the Hudson office and the release of the readout erase relay 57 RER and the readout hold relay 57 RHD in the readout control circuit 210. Accordingly, when each trunk circuit is seized, the above described test for determining the adequacy of the transmission link between the seized trunk recorder and the readout control circuit 6600, and also the test for the successful completion of the seizure of a trunk recorder by the remote playback control circuit 235 is performed as desecribed above.

In this manner, the remote playback control circuit 235 operates as set forth above in conjunction with the description of the operation of the playback control circuit 200 so that all of the idle trunk circuits and their associated trunk recorders to which the switch 235a has access are sequentially interconnected with the date storing and recording facilities in the Hudson office. The information stored in the trunk recorders in the form of mark and space pulses is transmitted over the carrier link under the control of the mark pulse modulator 11300, the space pulse modulator 11350, the mark pulse demodulator 11500, and the space pulse demodulator 11550 to control the operation of the common recorder 220.

*Release of the remote playback control circuit 235 by the readout control circuit 210*

As set forth above in the description of the operation of the playback control circuit 200 in the subtitle 3 Re-Release of the Playback Control Circuit 200, in said Patent 2,877,311, following the playback of all of the idle trunk recorders to which the switch 235a has access, the wipers 11143 and 11144 are moved into engagement with the terminal forming the next to last position of the switch 235a, which terminal is connected to the operating winding of a remote playback end-of-ticket relay 111 RPETD. This relay is operated in response to the closure of a pair of contacts 111 RPST 1 upon operation of the relay 104 PRST. The operation of the remote playback end-of-ticket relay signifies that all of the trunk recorders to which the control circuit 235 has access has been completely played back, and accordingly, the operation of this relay opens a pair of contacts 104 RPETD 2 to remove ground from the hold conductor 10563, thereby resulting in the release of the remote hold relay 105 ROHD, as described above. Further, the termination of the transmission of space pulse frequency tone or carrier signals to the local hold demodulator 10880 in the Hudson office releases the local hold relay 116 LHD.

The release of the local hold relay 116 LHD performs the functions described above and, in opening the contacts 116 LHD 1, removes ground from the common hold conductor 5560, thereby to permit the readout hold relay 57 RHD to release. In releasing, this relay completes the operating circuit for the hold shunt relay 58 HSH which, in operating, opens the holding circuit for the readout erase relay 57 RER so that this relay releases to remove ground from the common erase conductor 5290. As described above, the removal of ground from the conductor 5290 increases the negative bias on the erase modulator 10700 so that the transmission of the erase signal from the Hudson office to the Russell office is terminated, thereby resulting in the release of the remote office erase relay 105 ROER to open the contacts 105 ROER 1 and to remove ground from the erase conductor 10570. The release of the readout erase relay 57 RER, in closing the contacts 58 RER 3, also completes an operating circuit for the readout release relay 58 RRLS which, in operating to open the contacts 58 RRLS 1, terminates the application of pulsing ground to the clutch conductor 5721 and substitutes continuous ground therefor which causes the transmission of clutch frequency carrier signals from the modulator 10800 to the clutch demodulator 10650, thereby maintaining the remote office clutch relay 105 RCL operated to close the contacts 105 RCL 1. The closure of these contacts provides steady ground on the clutch conductor 10560 which, in completing an operating circuit for the remote playback clutch relay 111 RPCL, simulates a starting condition in the remote playback control circuit 235. However, the provision of the thermistor 10420 in the operating circuit for the remote playback start relay 104 RPST prevents the operation of this relay to initiate an additional playback cycle operation of the remote playback control circuit 235 for a long enough interval of time that the readout control circuit 210 can advance the stepping switch 210a to seize the next idle playback control circuit.

As described above, the operation of the remote playback end-of-ticket relay 111 RPETD, in opening the contacts 104 RPED 2, removes ground from the hold conductor 10563 for a longer interval than is provided when the remote playback control circuit 235 is merely stepped from one idle trunk recorder to the next and, accordingly, due to this increased time interval and as set forth above in conjunction with the description of the operation of the readout control circuit 210, the hold release delay relay 58 HRD is released to remove the last source of holding ground for the operating winding of the readout switch relay 57 RSW. This permits the relay 57 RSW and, after a suitable time delay, the second readout switch relay 58 RSWS to release to actuate the stepping switch 210a to its next stepping position. As shown in FIG. 57 of the drawings, the next stepping position of the switch 210a causes the operation of the readout end-of-ticketing relay 58 RETD, operation of which restores the readout control circuit 210 to a normal condition. However, it is obvious that the local office adapter circuit 11600 could be connected to contacts other than those forming the last effective stepping position of the switch 210a, in which case, the release of the carrier facilities would operate the readout control circuit 210 to seize an additional playback control circuit, similar to the circuit 200.

In addition to stepping the switch 210a, the release of the readout switch relay 57 RSW, to open the contacts 57 RSW 1, removes ground from the conductor 5722 to open the holding circuit for the local switch relay 116 LSW so that this relay releases to open the contacts 116 LSW 1 and 116 LSW 3 to 116 LSW 9, inclusive, and to close the contacts 116 LSW 2 and 116 LSW 10. The opening of the contacts 116 LSW 5–116 LSW 9 opens the connections between the erase modulator 10700, the mark pulse demodulator 11500, and the space pulse demodulator 11550 and the readout control circuit 210 and the readout amplifier circuit 6600. The opening of the contacts 116 LSW 3 terminates bright illumination of the lamp 11610 to indicate that the local office adapter circuit 11600 has been released. The opening of the contacts 116 LSW 4 interrupts the above described holding path for the local switch relay 1116 LSW, and the closure of the contacts 116 LSW 10 prepares a portion of a holding circuit for the local lockup relay 116 LLU. The opening of the contacts 116 LSW 1 and the concurrent closure of the contacts 116 LSW 2 interrupts, at an additional point, the above described circuit for applying ground to the common hold conductor 5560 and prepares a portion of an operating path for the local lockup relay 116 LLU.

Accordingly, the release of the local office adapter circuit 11600 together with the release of the remote office adapter circuit 10500 and the remote playback control circuit 235 restores the carrier equipment to a normal condition in which the mark pulse modulator 11300 is continuously effective to transmit mark pulse carrier frequency signals to the alarm demodulator 10850 to maintain the local alarm relay 116 LALM continuously operative as an indication that the carrier link is in an operative condition.

*Playback of a filled trunk recorder in the remote Russell office under emergency playback conditions*

In a similar manner to that described in said Patent 2,877,311 in conjunction with the description of the operation of the trunk circuit 126 and the playback control circuit 200, in response to the magnetic tape in one of the trunk recorders such as the trunk recorder 11025 becoming filled with items of information pertaining to toll calls, ground is applied by the trunk circuit 11020 to an emergency start conductor which extends to the operating winding of a remote playback emergency start relay 111 RPEST through a plurality of contacts 111 RPCHL 1, 104 RPETD 2, 111 RPSWS 2, 111 RPST 2 and 111 RPCL 2. The operation of this relay closes a pair of contacts 111 RPEST 3 to complete a holding circuit for the relay 111 RPEST and closes a pair of contacts 104 RPEST 2 to apply ground through the closed contacts 104 RPETD 2 and 104 RPSWS 4 to the hold conductor 10563, thereby causing the operation of the remote hold relay 105 ROHD to close the contacts 105 ROHD 1 and reducing the negative potential supplied to the control electrodes of the tubes 11360 and 11370 in the space pulse modulator 11350. The reduction in the negative potential supplied by the voltage divider 11391 initiates the transmission of a space pulse tone or carrier frequency signal to the Hudson office to operate the local hold relay 116 LHD in response to energization of the local hold demodulator 10880.

The operation of the local hold relay 116 LHD, in closing the contacts 116 LHD 4, applies resistance ground to the lamp 11610 to indicate that the local office adapter circuit 11600 is to be seized and, in closing the contacts 116 LHD 2, prepares an operating path for the local switch relay 116 LSW. The opening of the contacts 116 LLU 4 disconnects the common emergency start ground conductor 5670 from the test conductor 5722 to mark the local office adapter circuit 11600 as the unit which is to be seized by the switch 210a of the readout control circuit 210. The closure of the contacts 116 LHD 1 interconnects the common hold conductor 5560 with the common conductor 5550 which extends to ground through the normally closed off-normal contacts 5715.

Accordingly, the closure of the contacts 116 LHD 1 completes an operating circuit for the readout emergency start relay 58 REST which extends to ground through the closed contacts 58 RST 1, 58 RSS 1, 58 REST 2, 57 RSW 7, 57 RETD 1, 116 LHD 1, 116 LSW 2, and 5715. Operation of the readout emergency start relay 58 REST places the readout control circuit 210 in operation, as described in said Patent 2,877,311 under the title, Operation of the Readout Control Circuit 210 During an Emergency Readout Operation. In this operation, the stepping switch 210a is intermittently operated to advance the wipers 5711, 5712, and 5713 over the contacts associated therewith to search for the circuit component having access to the filled trunk recorder, the test being performed by the wiper 51712. Since the contacts 57 REST 4 are closed in response to the operation of the readout emergency start relay 58 REST to apply ground to the conductor 5670, busy ground is applied to all of the contacts to which the wiper 5712 has access with the exception of the contact to which is connected the conductor 5722. This conductor is disconnected from the source of busy ground supplied on the conductor 5670 by the prior opening of the contacts 116 LHD 3.

Accordingly, the stepping switch 210a operates until such time as the wipers 5711, 5712, and 5713 are moved into engagement with the contacts individual to the local office adapter circuit 11600, following which the readout switch relay 57 RSW operates to close the contents 57 RSW 1, among others, to apply ground to the wiper 5712 and to the conductor 5722. The application of ground to the conductor 5722 completes the operating path described above which extends to the now closed contacts 116 LHD 2 for operating the local switch relay 116 LSW whereby the modulator 10700, the mark pulse demodulator 11500, and the space pulse demodulator 11550 are interconnected with the readout control circuit 210 and the readout amplifier 6600. The closure of the contacts 116 LSW 3 provides bright illumination of the lamp 11610 to indicate that the local office adapter circuit 11600 has been seized.

Incident to movement of the switch 210 to an off-normal position, the contacts 5715 are opened to remove ground from the emergency start ground conductor 5550 to interrupt the operating circuit for the readout emergency start relay 58 REST which relay, however, remains operated over the holding circuit provided therefor extending to the closed contacts 58 REST 1. The operation of the readout switch relay 57 RSW prepares an operating circuit for the readout hold relay 57 RHD which is completed by the operation of the local switch relay 116 LSW to close the contacts 116 LSW 1 and, in closing the contacts 57 RSW 5, applies ground through the wiper 5711 to the conductor 5721. As described above, the application of ground to the conductor 5721 operates the clutch modulator 10800 to transmit the clutch frequency tone or carrier signal over the carrier link to the clutch demodulator 10650, the operation of which operates the remote office clutch relay 105 RCL to apply ground to the clutch conductor 10560 upon closure of the contacts 105 RCL 1. The application of ground to the clutch conductor 11560 completes the operating circuit for the remote playback clutch relay 111 RPCL so that the remote playback control circuit 235 searches for and seizes the filled trunk recorder, as described in said Patent 2,877,311 in detail in conjunction with the description of the operation of the playback control circuit 200 under the title, Operation of the Playback Control Circuit 200 During an Emergency Playback Operation.

Incident to seizure of the filled trunk recorder, the preliminary COE signal is transmitted to the readout amplifier circuit 6600 to operate the readout earse relay 57 RER. The operation of this relay renders the erase modulator 10700 effective to transmit erase frequency carrier signals to the erase demodulator 10600 in the Russell office to operate the remote office erase relay 105 ROER to close the contacts 105 ROER 1, thereby to complete a circuit for energizing the erase head in the filled trunk recorder and for operating the remote playback erase relay 111 RPER.

Following seizure of the filled trunk recorder, the mark and space pulse information stored therein is transmitted over the carrier link to the Hudson office under the control of the mark pulse modulator 11300 and the space pulse modulator 11350, intermittent ground potential being supplied to the clutch magnet of the filled trunk recorder under the control of the clutch modulator 10800 and the clutch demodulator 10650. In this manner, all the items of information stored on the magnetic tape in the filled trunk recorder are transmitted from the Russell office to control the operation of the printing recorder 220 in the local Hudson office in the manner described in detail above.

Following the completing of the playback of the items of information stored in the filled recorder, the remote playback control circuit 235 is restored to its normal position, incident to which the remote playback end-of-ticket relay 111 RPETD is operated to advance the stepping switch 210a to its normal home position. The application of busy ground to the contacts engaged by the wiper 5712 by the closed contacts 57 REST 4 prevents seizure of any additional circuit components during movement of the switch 210a to its normal position. In response to reaching its home position, the readout end-of-ticketing relay 58 RETD is operated to restore the readout control circuit 210 to a normal condition, the release of the local office adapter circuit 11600 by the switch 210 restoring this circuit to a normal condition, as described above, in which only the local alarm relay 116 LALM is retained operated under the control of the alarm demodulator 10850 and the mark pulse modulator 11300 in the remote Russell office.

In this manner, in response to one of the trunk recorders to which the remote playback control circuit 235 has access becoming filled with items of information, the remote playback control circuit 235 places the readout control circuit 210 in operation by applying an emergency start seizure signal through the channel provided by the space pulse modulator 11350 and the local hold demodulator 10880. Following seizure of the readout control circuit, this circuit seizes the remote playback control circuit 235 to operate this circuit to seize the filled trunk recorder and, thereafter, the items of information in the filled recorder are sequentially transmitted to control the operation of the printing recorder 220, whereby individual toll tickets, each including the items of information pertaining to one of the calls stored on the magnetic tape of the filled trunk recorder, are provided.

Alarm facilities in the carrier link between the Hudson and Russell offices

As described above, in order to provide a means for testing the continuous operating condition of the carrier link interconnecting the Hudson and Russell offices, the mark pulse modulator 11300 is rendered continuously effective to supply the mark pulse tone or carrier frequency signal to the carrier link, the voltage divider 11341 being normally connected to ground through the normally closed contacts 105 ROAL 1 of the remote alarm relay 105 ROAL. The continuous application of mark frequency carrier signals to the alarm demodulator 10850 retains the local alarm relay 116 LALM in an operative condition, thereby to maintain the contacts 116 LALM 1 open. In the event that for one reason or another, such as an open circuit in the telephone line 11446 over which the carrier signals are transmitted, the local alarm relay 116 LALM is released to close the contacts 116 LALM 1, ground is supplied to the terminal 11673 which is connected to a supervisory circuit. Application of ground to the terminal 11673 establishes an alarm condition to indicate the failure in the operative condition of the carrier link.

Further, the terminal 10515, which is connected to the operating winding of the remote alarm relay 105 ROAL, is connected to the supervisory circuit associated with the toll ticketing facilities located in the Hudson office. If for any reason an alarm condition exists which requires immediate maintenance attention, the supervisory circuit removes battery from the terminal 10515 to release the remote alarm relay 105 ROAL. However, if data is being transmitted to the Hudson office at this time, the release of this relay does not establish the alarm condition until the relays 105 ROHD and 105 RCL release to open the contacts 105 ROHD 1 and 105 RCL 2. At this time, the opening of the contacts 105 ROAL 1 removes ground from the voltage divider 11341 to disable the mark pulse modulator 11300 so that mark frequency carrier or tone signals are not transmitted to the Hudson office. This releases the local alarm relay 116 LALM to provide an alarm indication in the Hudson office.

In order to provide the same alarm facilities in the remote playback control circuit 235 which are provided in the local playback control circuits, such as the playback control circuit 200, the facilities described in said Patent 2,877,311 under the title, Alarm Facilities in the Playback Control Circuit 200 are provided in the remote control circuit 235. More specifically, these facilities include the remote playback timeout tube 11210 which is rendered conductive in normal operation in response to pulsing ground on the clutch conductor 10560 to indicate the end of the playback of the items of information stored in one of the trunk recorders to which the circuit 235 has access. However, this tube together with the timing circuit therefor provided by a pair of condensers 11213 and 11214 and a plurality of charging resistors 11215, 11216, 11211, 11219, 11218, and 11217 provides a means for indicating the failure of the remote playback control circuit 235 to successfully seize a trunk recorder to which it has access, to indicate the failure of the transmission of the preliminary COE signal from the Russel office to the Hudson office and the failure to receive an erase signal from the Hudson office within a selected time interval, and finally to indicate a failure in the erase signal supplied to the conductor 10570 at any time during the playback of information from the trunk recorders in the Russell office.

The time delay circuit associated with the tube 11210 is controlled by the contacts operated by the relays 112 RPCL, 112 RERS, 112 RPERS, 112 RPBS, and 112 RPBB in the manner described above so that, in response to the establishment of one of these alarm conditions, the remote playback timeout relay 111 RPTO is operated to supply an alarm indication to the associated trunk recorder. Further, as described in said Patent 2,877,311, in the event that two of the trunk recorders and their associated trunk circuits to which the remote playback control circuit 235 has access are placed in an alarm condition, a remote playback alarm relay 104 RPALR is operated to provide an alarm indication. The alarm relay 104 RPALR is locked up to ground through the closed contacts of a remote playback alarm release key 104 RPARK 1 so that the alarm relay can only be released in response to manual operation of the key 104 RPARK. In closing a pair of contacts 104 RPALR 3, an alarm lamp 10410 is energized to indicate the alarm condition. Further, as an incident to the establishment of an alarm condition in one of the trunk circuits, such as the circuit 11020, the operation of the remote playback timeout relay 111 RPTO steps the switch 235a to seize the next idle trunk circuit, as described above.

Auxiliary control circuits associated with the carrier link between the Hudson and Russell offices To manually initiate a playback of the information from the remote Russell office, a playback key 116 PLBK is operated to close a pair of contacts 116 PLBK 1. The closure of these contacts completes an operating circuit for the local lockup relay 116 LLU in the event that the readout control circuit 210 is in a normal condition, as evidenced by the closed condition of the off-normal contacts 5715. If these contacts are closed, ground is applied to the emergency start ground conductor 5550 which extends through the closed contacts 116 PLBK 1 and 116 LLU 5 to the operating winding of the local lockup relay 116 LLU. The operation of this relay closes a plurality of contacts 116 LLU 1, 116 LLU 3, and 116 LLU 6 and opens a plurality of contacts 116 LLU 2, 116 LLU 4, and 116 LLU 5. The operations of the contacts 116 LLU 6 and 116 LLU 5, which form a make-before-break contact arrangement, complete a holding circuit for the relay 116 LLU extending to ground through either of the normally closed contacts 116 LHD 5 and 116 LSW 10 so that when the nonlocking key 116 PLBK is released to open the contacts 116 PLBK 1, the local lockup relay 116 LLU remains operated.

The opening of the contacts 116 LLU 4 disconnects the conductor 5670 from the test conductor 5722 individual to the local office adapter circuit 11600, thereby to mark this circuit as the circuit which is to be seized by the switch 210a of the readout control circuit 210. The closure of the contacts 116 LLU 3 supplies the ground provided at the closed contacts 5715 to the hold conductor 5560 to operate the readout emergency start relay 58 REST so that the readout control circuit 210 initiates a cycle of operation, as described above, during which the local office adapter circuit 11600 is seized by the stepping switch 210a, all of the other circuit components to which this switch has access being marked by busy ground from the contacts 57 REST 4 which are closed, in response to the operation of the readout emergency start relay 58 REST. The circuit 11600 is marked as idle due to the opening of the contacts 116 LLU 4.

The opening of the contacts 116 LLU 2 interrupts the above described circuit for applying ground to the hold conductor 5560, and the concurrent closure of the contacts 116 LLU 1 applies ground to the conductor 5721 to render the clutch modulator 10800 effective to transmit clutch frequency tone or carrier signals over the carrier link to operate the remote office clutch relay 105 RCL. The operation of this relay closes the contacts 105 RCL 1 to provide a seizure signal for the remote playback control circuit 235 so that this circuit operates, as described above, to search for and seize the first idle trunk circuit and trunk recorder to which the switch 235a has access.

In response to seizure of a trunk circuit by the remote playback control circuit 235, the space pulse modulator 11350 is rendered effective to transmit space frequency tone signals over the carrier link to operate the local hold demodulator 10880 and the local relay 116 LHD. In addition to performing the functions described above, the operation of the local hold relay 116 LHD closes the contacts 116 LHD 2, thereby to prepare an operating path for the local switch relay 116 LSW so that this relay is operated in response to seizure of the local office adapter circuit 11600 by the application of ground to the wiper 5712 and the conductor 5722.

The operation of the local switch relay 116 LSW switches the mark and space pulse paths through to the readout amplifier circuit 6600 and interconnects the erase modulator 10700 with the readout control circuit 210. The sequential operation of the local hold relay 116 LHD and the local switch relay 116 LSW, signifying the completion of the interconnection of the recording facilities with the remote playback control circuit 235 in the Russell office, opens the contacts 116 LHD 5 and 116 LSW 10 to interrupt the holding circuit for the local lockup relay 116 LLU. The release of this relay opens the contacts 116 LLU 1, 116 LLU 3, and 116 LLU 6 and closes the contacts 116 LLU 5, 116 LLU 2, and 116 LLU 4. The operation of the contacts 116 LLU 3–116 LLU 6 merely aids in restoring the local office adapted circuit 11600 to a normal condition. The opening of the contacts 116 LLU 1 removes the source of continuous ground from the voltage divider 10831 to permit the selective control thereof to be transferred to the readout control circuit 210, as described above. The closure of the contacts 116 LLU 2 applies ground through the contacts 116 LSW 1, 116 LHD 1 and 116 LBK 2 to the hold conductor 5560 to operate the readout hold relay, as described above.

Following the completion of the seizure of the readout control circuit 235 and its interconnection with the recording facilities in the Hudson office, the playback of the items of information stored in the trunk recorders in the Russell office continues, as described above, until such time as, following completion of the playback, the carrier facilities including the local and remote equipment 215 and 225, the remote playback control circuit 235, and the readout control circuit 210, together with their associated circuits, are restored to a normal condition.

To provide means for manually busying out the local office adapted circuit 11600 and, accordingly, also the carrier link extending to the remote Russell office, a busy key 116 LDK is provided. In response to operation of this key, a plurality of contacts 116 LBK 4 and 116 LBK 1 are closed and the contacts 116 LBK 3 and 116 LBK 2 are opened. The closure of the contacts 116 LBK 1 applies ground to the test conductor 5722 to indicate to the readout control circuit 210 that the local office adapter circuit 11600 is busy and cannot be seized for a readout operation. The concurrent opening of the contacts 116 LBK 2 interrupts, at an additional point, the operating circuit for the local switch relay 116 LSW and also prevents the application of ground to the conductor 5722 from the emergency start ground conductor 5670.

The opening of the contacts 116 LBK 3 interrupts the above described circuit for applying ground to the common hold conductor 5560, and the concurrent closure of the contacts 116 LBK 4 prepares an operating path for an emergency playback alarm lamp 11652, the other side of this lamp being connected to a terminal 11651 which is selectively applied with battery from the supervisory circuit associated with the toll ticketing facilities in the Hudson office. Accordingly, if during the interval that the busy key 116 LBK is operated, the local hold relay 116 LHD is operated as an indication that the Russell office requires an emergency playback operation, the closure of the contacts 116 LHD 1 interconnects the conductor 5550, which is grounded at the closed off-normal contacts 5715 in the readout control circuit 210, through the closed contacts 116 LSW 2, 116 LHD 1, and 116 LBK 4 to the lamp 11652 providing a visible indication that the local office adapter circuit 11600 should be restored to a normal condition to permit the initiation of an emergency playback operation.

In summary, therefore, the local carrier equipment 215 and the remote carrier equipment 225 permit the common printing recorder 220 together with its associated control circuits located in the Hudson office to be utilized for producing permanent records of the items of information stored not only in the trunk recorders provided in the local Hudson office but also the trunk recorders situated in the geographically remote Russell office. The association of the trunk recorders, such as the recorder 11025 and the recorder 220, are controlled by alternating current signals transmitted between the Hudson and Russell offices corresponding to the direct current signals utilized for controlling the association of the local trunk recorder and the recorder 220. The overall flexibility of the system is further improved by supplying the items of information in the trunk recorders in both of these areas in identical forms. The carrier system makes use of existing telephone facilities existing between the Hudson and Russell offices and permits the concurrent use of the line for conventional voice or telephone communication.

By the selection of the frequencies indicated above in which the erase, clutch, space, and mark pulse tone or carrier frequency signals are assigned the values 3.75, 4.30, 5.87, and 6.64 kilocycles, respectively, the entire frequency spectrum required for the toll ticketing carrier system is less than that normally provided for a single telephone path in conventional carrier telephonic practice. In addition, by the selection of the frequencies assigned to provide the various types of information transmitted between the Hudson and Russell offices, the frequencies which are switched most frequently or modulated are furthest removed in the frequency spectrum from the frequency channel assigned to voice communication. More specifically, the mark pulses recur at the greatest frequency and the mark pulse tone frequency is assigned at 6.64 kilocycles which is the furthest removed from the 3 kilocycle and lower band pass assigned for conventional voice communication. In a like manner, the space frequency signals occur at the next greatest frequency and, accordingly, in being assigned the carrier frequency of 5.87 kilocycles, are slightly closer to the frequency band utilized for voice communication. The erase signal, which is switched on only once during the playback of each trunk recorder, and the clutch frequency signal, which switched at the end of each call, are assigned the frequencies closest to the voice frequency range, i.e., 4.30 kilocycles and 3.75 kilocycles.

By the provision of two direct current control paths from the Hudson office to the remote Russell office and, by the further provision of two direct current control paths, one of which is an alarm interlock path, and a pair of alternating current or modulation paths from the Russell office to the recording Hudson office, the readout control circuit 210 in the Hudson office is capable of controlling the playback and readout operations of the trunk recorders in the Russell office in the same manner as the control over the trunk recorders in the Hudson office is achieved, thereby reducing to a minimum the modifications in design made necessary by the use of a carrier link extending to a remote office.

Although only a preferred embodiment of the invention has been described here, it is not intended that the invention be restricted thereto, but that it be limited only by the true spirit and scope of the appended claims.

What is claimed and desired to be secured by Letters Patent of the United States is:

1. An automatic toll ticketing system comprising a register for storing the items of information pertaining to a toll call, first detecting means, a recorder for producing a permanent record of the items stored in the register, first signal transmitting means, a carrier signaling link extending between said register and said recorder, means for operating said first transmitting means to transmit a signal over said signaling link to said first detecting means, second signal transmitting means controlled by the register and operable to transmit signals over said signaling link representing the stored items, means responsive to operation of said first detecting means under the control of the signal transmittted by said first transmitting means for rendering said second transmitting means responsive to said stored items in said register, and second detecting means responsive to the signals transmitted over said signaling link by said second transmitting means for operating the recorder in accordanace with the stored items.

2. An automatic toll ticketing system comprising a common recording means, first register means for storing the items of information pertaining to a toll call, switching means individual to said common recording means and having access to said first register means, second register means remote from said recording means for storing the items of information pertaining to a toll call, a signaling link including signal detecting means and signal transmitting means responsive to the items stored in said second register means, and means for operating said switching means to directly connect said recording means to said first register means and for indirectly connecting said recording means to said second register means through said signaling link.

3. An automatic toll ticketing system comprisinig a register having a magnetic tape on which can be recorded the items of information pertaining to a toll call, said register having means for erasing said tape, a recorder remote from said register, a signaling link including signal transmitting and signal detecting means for interconnecting said register and said recorder, means operable over said signaling link for operating said register to transmit the recorded items of information to the recorder to control the operation thereof, and means operable over said signaling link for rendering said erasing means effective to erase said tape following the transmission of the stored items to the recorder.

4. In a telephone system, a plurality of register means for collecting and storing the items of information pertaining to the toll calls, a recording office remote from said register means and including a recorder, means in said recording office for establishing a signaling path between said plurality of register means and said recorder, said signaling path including signal transmitting and signal detecting means, and means operative following the completion of said path for sequentially connecting each of said register means to said signaling path to operate said recorder in accordance with the stored items of information.

5. An automatic toll ticketing system comprising a register having a magnetic tape for storing the items of information pertaining to a toll call, said register also including tape erasing and tape driving means, a recorder remote from said register, a signaling link including signal transmitting and signal detecting means interconnecting said register with said recorder, means for transmitting signals over said link from said recorder to said register for operating said tape driving means to advance the magnetic tape so that the items stored thereon are transmitted over the link to the recorder to control the operation thereof, and other means for transmittting signals over said link from said recorder to said register to energize said tape erasing means during movement of said tape.

6. An automatic toll ticketing system comprising a register for storing the items of information pertaining to a toll call, a recorder remote from said register for recording the stored items in permanent form, a signaling link including signal transmitting and signal detecting means for interconecting said register with said recorder, means for transmitting a control signal over said link from said recorder to said register to connect said register to the link, and means for transmitting a fixed frequency signal over said link from said register to said recorder to indicate that said register has been connected to said link.

7. The system defined by claim 6 in which the register includes means for modulating said fixed frequency signal in accordance with the stored items to transmit said items to said recorder to control the operation thereof.

8. A telephone system comprising a first office, a second office geographically remote from said first office, register means located in each of said offices for storing items of information relating to connections extended therefrom, recording means at a recording location remote from at least one of said offices for producing a permanent record of said registered items, and means at said recording location for establishing direct current control paths for rendering the register means local to said recording means effective to control said recording means and for establishing alternating current control paths for rendering the register means remote from said recording means effective to control said recording means, thereby to operate said recording means in accordance with the stored items of information.

9. An automatic toll ticketing system comprising a local office including first register means for storing data pertaining to a toll call extended from said local office, a remote office including second register means for storing data pertaining to a toll call extended from said remote office, a recorder in said local office for producing records of the data stored in said first and second register means, first control means responsive to direct current control signals for connecting said first register means to said recorder and for operating said first register means to transmit the data stored therein to the recorder, second control means responsive to alternating current control signals for connecting said second register means to said recorder and for operating said second register means to transmit the data stored therein to said recorder, and means in said local office for providing either direct current or alternating current control signals to selectively operate either said first control means or said second control means, thereby to cause the selective transmission of the stored data from the first and second register means to control the operation of said recorder.

10. An automatic toll ticketing system comprising a register for storing the items of information pertaining to a toll call, a recorder remote from said register for producing a permanent record of the stored items, a signaling path interconnecting said register and said recorder, transmitting means controlled by the stored items in the register for sending selected frequency signals over said path to said recorder to control the operation thereof, means for transmitting a signal over said path to said register having a fixed frequency other than said selected frequency signals for rendering said transmitting means effective to transmit the stored items over said path, and means responsive to said selected frequency signals for interrupting the transmission of said fixed frequency signal.

11. An automatic toll ticketing system comprising a register having a sensible medium for storing the data pertaining to a toll call and having means for driving said medium, a recorder remote from said register, a signaling link for interconnecting said recorder and said register, switching means for connecting said register to said link, a source of oscillatory voltage, means for applying said voltage to said link to operate said switching means to connect said register to said link, and other means for applying said voltage to said link to operate said driving means to move said sensible medium so that the stored data is transmitted to said recorder.

12. An automatic toll ticketing system comprising a register having a sensible medium for storing the data pertaining to a toll call, said register also including means for driving said medium and means for erasing said medium, a recorder remote from said register, a signaling link for interconnecting said register and said recorder, switching means for connecting said register to one end of said link, a first source of oscillatory voltage of a first frequency, a second source of oscillatory voltage of a second frequency, first detecting means responsive to voltage of said first frequency for operating said switching means to connect said register with said one end of said link, and for operating said driving means, second detecting means responsive to said second frequency voltage for operating said erasing means, and means for applying said first and second frequency voltages over said link to said first and second detecting means to render said register means effective to transmit the stored data over the link to the recorder and to erase the transmitted data from the medium.

13. The system set forth in claim 12 in which the sensible medium is adapted to store data pertaining to each of a plurality of toll calls, and the applying means includes means for momentarily removing said first frequency voltage from said link at the end of the transmission of the data pertaining to each of the toll calls.

14. The system set forth in claim 12 in which the applying means includes time responsive means for removing the first frequency voltage from the link at the end of the transmission of the data pertaining to the toll call thereby to release the register.

15. An automatic toll ticketing system comprising a first office including a plurality of registers for storing the data pertaining to toll calls, a second office remote from said first office and including a recorder for producing permanent records of the data stored in the first office, signal transmitting and signal detecting means in said first office and in said second office to provide a signaling link between said offices, switching means in said first office for seizing said registers and for rendering the seized register effective to control the signal transmitting means in said first office, means in said second office for operating the signal transmitting means therein to transmit a signal over said link to the detecting means in said first office to operate said switching means so that one of said registers is seized and rendered effective to control the signal transmitting means in said first office, said seized register being effective to control the operation of said transmitting means in said first office to transmit signals in accordance with the stored data, means in said first office responsive to rendering one of said registers effective to control the signal transmitting means in the first office for transmitting a signal over said link to the detecting means in said second office to render said recorder responsive to the signals transmitted over said link in accordance with the data stored in said seized register.

16. The system set forth in claim 15 in which the second office includes means responsive to the completion of the transmission of the data stored in said seized register to the second office for operating the signal transmitting means in the second office to transmit a signal over said link for operating said switching means to release said seized register and to seize another one of said registers.

17. The system set forth in claim 15 in which the second office includes means responsive to the completion of the transmission of the stored data from the first office to the second office for terminating the operation of the switching means to seize said registers.

18. An automatic toll ticketing system comprising a first office including a register for storing data pertaining to toll calls, a second office remote from said first office and including a recorder for producing permanent records of the data stored in said register, a signaling link including signal transmitting and signal detecting means for interconnecting said first and second offices, means in said first office controlled by said register for transmitting a signal over said link to signal detecting means in said second office, means in said second office responsive to said transmitted signal for rendering the recorder effective to receive signals from said first office, and means in said second office operated in response to rendering the recorder effective for transmitting a signal over said link to signal detecting means in said first office to render said register effective to transmit the signals over said link to said recorder in accordance with the data stored in said register thereby to control the production of permanent records of said stored data.

19. The system set forth in claim 18 in which the register is capable of storing a predetermined quantity of data and in which the means in the first office controlled by the register includes means operated following the storage of said predetermined quantity of data for transmitting a signal over the link.

20. In a telephone system, a magnetic register, means for operating said magnetic register in accordance with the items of information pertaining to a plurality of toll calls placed over established connections, a recording office remote from said magnetic register and including a recorder, means for establishing a carrier link between said recording office and said remote magnetic register, means controlled by said magnetic register for applying alternating current signals to said carrier link in accordance with the items of information stored in said magnetic register, and means located in said recording office and energized by said carrier link for converting said alternating current signals into signals for controlling the operation of the recorder thereby to produce permanent records of the items of information stored in the magnetic register.

21. In a telephone system, register means for storing items of information pertaining to a telephone call, recording means for producing a permanent record of the items of information stored in said register means, a source of oscillatory voltage, means controlled by said register means for modulating said oscillatory voltage in accordance with the items of information stored in said register means, a transmission path interconnecting said modulating means with said recorder, and detecting means associated with said recorder and with said transmission means for selectively operating said recorder in accordance with the detected modulated signals for producing a permanent record of the items of information stored in said register means.

22. In a telephone system, an information storing office including a plurality of register means for storing items of information pertaining to a plurality of telephone calls, each of said register means being adapted to store the items of information pertaining to a plurality of calls, a remote recording office including a recorder, control means in said recording office for extending a signaling path from the recording office to the information storing office, control means in said information storing office for sequentially associating each of said register means with said signaling path to cause the items of information stored in said register means to be transmitted to the recorder, said recorder providing a permanent record of the items of information pertaining to each of the toll calls in accordance with the items of information transmitted from the seized register, and time responsive means in the control means at the recording office to release the signaling path extending to the information storing office if items of information pertaining to toll calls are not received in the recording office within a predetermined time interval.

23. In a telephone system, a first office, register means in said first office for storing items of information pertaining to telephone calls, a second office remote from said first office, register means in said second office for storing items of inforamtion pertaining to toll calls, a recorder located in said first office, first sequencing means for conditioning the register means in said first office for transmitting the stored items to the recorder, and second sequencing means in said first office to seize the first sequencing means to cause the operation thereof to sequentially prepare the registers in the first office for transmitting said stored items of information to the recorder, said second sequencing means also being operative to complete a signaling path to the second office to cause the register means therein to transmit the items of information stored therein to the recorder whereby the recorder provides permanent records of the items of information stored in the sequentially seized register means.

24. An automatic toll ticketing system comprising a first office, a plurality of registers in said first office adapted to store the items of information pertaining to toll calls extended from said first office, a second office geographically remote from said first office, recording means in said second office, timing means, and means operated at selected chronological intervals under the control of said timing means for extending a carrier signaling link from said second office to said first office to associate the recording means with the plurality of registers so that permanent records of the items stored therein are produced by the recording means.

25. In a telephone system, an office including register means for storing items of information pertaining to a toll call, a recorder at a recording location remote from said office for providing a record of the stored items, a carrier signaling link connecting said office and said recording location, switching means in said office controllable over said signaling link from said recording location for seizing said register means and for connecting said seized register means to said recorder over said signaling link, and means in said office controlled by the storage of a predetermined amount of information in said register means for transmitting a signal over said signaling link to said recording location to place said switching means in operation.

26. The telephone system set forth in claim 25 including means at said recording location for placing said switching means in operation at selected chronological intervals.

27. A data handling system comprising a magnetic register in a data storing location for storing data, said register including magnetic erasing means for removing stored data from said register, a data receiving unit at a receiving location geographically remote from said data storing location, a signaling link extending between said data storing and data receiving locations for connecting said magnetic register and said data receiving unit for data transmission, said signaling link including data transmitting means controlled by said register and signal detecting means for controlling said data receiving unit, and control means in said receiving location for transmitting a signal over said signaling link to said data storing location for operating said erasing means.

28. The system set forth in claim 27 in which the control means transmits a continuous signal over said link during the interval in which the erasing means is to be operated so that an interruption of said link prevents the removal of stored data from said magnetic register.

29. In a telecommunication system, a first exchange, a second exchange, a signaling line extending from said first exchange to said second exchange, a first magnetic storage device at said first exchange, means for recording information on said first storage device, means at said first exchange for generating a carrier current of voice frequency, means at said first exchange for modulating said carrier current in accordance with said stored information, means for transmitting said modulated carrier current over said signaling line, means at said second exchange for responding to said modulated carrier current, a second storage device at said second exchange, and means controlled by said responding means for storing said received information in said second storage device.

30. In a telecommunication system, a first exchange, a magnetic storage device at said first exchange including a surface of magnetic material, means for moving said surface of magnetic material, a transducing head cooperating with said surface to define a circumferential track thereon, means including said transducing head for recording information in said track, a second exchange, a line extending from said first exchange to said second exchange, means at said first exchange for generating a carrier current of voice frequency, means at said first exchange for modulating said carrier current in accordance with the information recorded on said track and for transmitting said modulated current over said line to said second exchange, and a register device in said second exchange for responding to said modulated current.

References Cited by the Examiner

UNITED STATES PATENTS

| | | | |
|---|---|---|---|
| 1,927,556 | 9/1933 | Nelson | 179—7.1 |
| 2,265,339 | 12/1941 | Blanton et al. | 178—2 X |
| 2,594,495 | 4/1952 | Retallack | 179—7.1 |
| 2,668,875 | 2/1954 | Shepherd | 179—7.1 |
| 2,767,246 | 10/1956 | Retallack | 179—7.1 |
| 2,782,257 | 2/1957 | Blashfield et al. | 179—7.1 |

ROBERT H. ROSE, *Primary Examiner.*

L. MILLER ANDRUS, EVERETT R. REYNOLDS,
*Examiners.*